United States Patent
Lush et al.

(10) Patent No.: US 10,234,290 B2
(45) Date of Patent: Mar. 19, 2019

(54) MULTI-ACTIVITY PLATFORM AND INTERFACE

(71) Applicant: NIKE, Inc., Beaverton, OR (US)

(72) Inventors: Karyn Lush, Portland, OR (US); Kristen L. White, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/910,210

(22) Filed: Jun. 5, 2013

(65) Prior Publication Data

US 2013/0345978 A1    Dec. 26, 2013

Related U.S. Application Data

(60) Provisional application No. 61/655,578, filed on Jun. 5, 2012.

(51) Int. Cl.
| | |
|---|---|
| *G01C 21/00* | (2006.01) |
| *G01S 5/02* | (2010.01) |
| *G01C 21/36* | (2006.01) |
| *G01C 21/34* | (2006.01) |
| *G06F 3/0484* | (2013.01) |

(52) U.S. Cl.
CPC ......... *G01C 21/00* (2013.01); *G01C 21/3484* (2013.01); *G01C 21/3697* (2013.01); *G01S 5/02* (2013.01); *G06F 3/0484* (2013.01)

(58) Field of Classification Search
CPC ............. G01C 21/00; G01C 21/3697; G01C 21/3484; G01S 5/02; G06F 3/0484
See application file for complete search history.

(56) References Cited

U.S. PATENT DOCUMENTS

| | | | |
|---|---|---|---|
| 7,805,149 B2 | 9/2010 | Werner et al. | |
| 7,840,346 B2* | 11/2010 | Huhtala et al. | ............... 701/439 |
| 8,562,489 B2 | 10/2013 | Burton et al. | |
| 2004/0209600 A1 | 10/2004 | Werner et al. | |
| 2005/0107216 A1* | 5/2005 | Lee et al. | .......................... 482/8 |

(Continued)

FOREIGN PATENT DOCUMENTS

| | | |
|---|---|---|
| EP | 1619475 A2 | 1/2006 |
| GB | 2447647 A | 9/2008 |

(Continued)

OTHER PUBLICATIONS

Mokey. http://www.digitaltrends.com/watch-reviews/nike-plus-sportwatch-gps-review/2/ . Digitaltrends.com. Archive.org: Apr. 25, 2011. Accessed Jan. 16, 2014.*

(Continued)

*Primary Examiner* — Jeffrey C Boomer
(74) *Attorney, Agent, or Firm* — Banner & Witcoff, Ltd.

(57) ABSTRACT

Activity monitoring may include tracking of a route or location where the activity was performed. In some examples, the route may be displayed against a heat map identifying areas of higher activity or popularity. Alternatively or additionally, routes may be automatically generated by a system based on various specifications such as an amount of time, a preferred location (a start and an end), a level of popularity or activity level, and the like and/or combinations thereof. A user's workout information may further be stored in association with a particular location or route.

20 Claims, 55 Drawing Sheets

(56) References Cited

U.S. PATENT DOCUMENTS

| | | |
|---|---|---|
| 2006/0136173 A1* | 6/2006 | Case et al. .................. 702/182 |
| 2008/0082254 A1* | 4/2008 | Huhtala ............... G01C 21/00 701/533 |
| 2008/0200312 A1* | 8/2008 | Tagliabue ........................ 482/9 |
| 2008/0214360 A1 | 9/2008 | Stirling et al. |
| 2008/0250337 A1* | 10/2008 | Lemmela et al. ........... 715/764 |
| 2008/0288200 A1 | 11/2008 | Noble |
| 2009/0258710 A1* | 10/2009 | Quatrochi et al. ............. 463/43 |
| 2009/0262088 A1* | 10/2009 | Moll-Carrillo et al. ...... 345/173 |
| 2010/0198626 A1 | 8/2010 | Cho et al. |
| 2010/0273610 A1* | 10/2010 | Johnson ........................ 482/9 |
| 2010/0287178 A1 | 11/2010 | Lambert et al. |
| 2010/0305480 A1 | 12/2010 | Fu et al. |
| 2010/0331145 A1 | 12/2010 | Lakovic et al. |
| 2011/0003665 A1* | 1/2011 | Burton et al. ................... 482/9 |
| 2011/0007468 A1 | 1/2011 | Burton et al. |
| 2011/0032105 A1 | 2/2011 | Hoffman et al. |
| 2011/0082636 A1* | 4/2011 | Barker et al. ................. 701/118 |
| 2011/0098928 A1* | 4/2011 | Hoffman et al. ................ 702/5 |
| 2011/0196603 A1* | 8/2011 | Graham et al. .............. 701/200 |
| 2012/0015778 A1* | 1/2012 | Lee et al. ........................ 482/8 |
| 2012/0015779 A1* | 1/2012 | Powch et al. .................... 482/9 |
| 2012/0100850 A1 | 4/2012 | Huang |
| 2012/0116550 A1* | 5/2012 | Hoffman et al. ............... 700/91 |
| 2012/0253485 A1 | 10/2012 | Weast et al. |
| 2012/0254934 A1 | 10/2012 | McBrearty et al. |

FOREIGN PATENT DOCUMENTS

| | | | |
|---|---|---|---|
| JP | 2010088886 A | 4/2010 | |
| JP | 2010517725 A | 5/2010 | |
| JP | 2011505202 A | 2/2011 | |
| JP | 2012035071 A | 2/2012 | |
| JP | 2012526329 A | 10/2012 | |
| KR | 20120023657 A | 3/2012 | |
| WO | WO 2009065637 A1 * | 5/2009 | |
| WO | 2010129221 A1 | 11/2010 | |
| WO | WO-2011028386 A1 * | 3/2011 | ........... A61B 5/6831 |

OTHER PUBLICATIONS

Ross. www.runtheline.com/1552/nike-sportswatch-gps-running-watch-review#. Runtheline.com. Archive.org: May 19, 2011. Accessed Jan. 14, 2014.*

Kurashima, Takeshi; Iwata, Tomoharu; Irie, Go; Fujimura, Ko. Tavel Route Recommendation Using Geotags in Photo Sharing Sites. CIKM'10, Oct. 26-30, 2010. p. 579-588.*

Mar. 26, 2014 14—(WO) ISR and WO—App. No. PCT/US13/44214.

Mokey. http://www.digitaltrends.com/watch-reviews/nike-pius-sportwatch-gps-review/2/. Digitaltrends.com. Archive.org: Apr. 25, 2011. Accessed Jan. 16, 2014.

* cited by examiner

Hello there.

Congrats on your new Nike+ FuelBand

How does it work?
As you move, the motion sensor in your Nike+ FuelBand measures your activity and translates it to NikeFuel. It also tracks each step and calorie burned, displaying it all at the press of a button.

You start with a goal
Set a target for how active you want to be. Your Nike+ FuelBand will help you keep track of how you're doing, lighting up from red to green throughout the day. Once the display goes to green you've hit your Daily Goal.

Let's get started
Get the latest Nike+ Connect Software to personalize your Nike+ FuelBand and get going.

DOWNLOAD NIKE+ CONNECT

| 1. Get Software | 2. Make It Yours | 3. Set Your Goal | 4. Join Nike+ | 5. Charge |

MULTI-ACTIVITY PLATFORM AND INTERFACE

CROSS-REFERENCE TO RELATED APPLICATION

This application claims priority to U.S. Application No. 61/655,578 filed Jun. 5, 2012, entitled "Multi-Activity Platform and Interface," which is incorporated herein in its entirety.

BACKGROUND

Exercise and fitness have become increasingly popular and the benefits from such activities are well known. Various types of technology have been incorporated into fitness and other athletic activities. For example, a wide variety of portable electronic devices are available for use in fitness activities, such as MP3 or other audio players, radios, portable televisions, DVD players, or other video playing devices, watches, GPS systems, pedometers, mobile telephones, pagers, beepers, etc. Many fitness enthusiasts or athletes use one or more of these devices when exercising or training to keep them entertained, record and provide performance data or to keep them in contact with others, etc.

SUMMARY

The following presents a general summary of aspects of the disclosure in order to provide a basic understanding of at least some of its aspects. This summary is not an extensive overview. It is not intended to identify key or critical elements or to delineate the scope. The following summary merely presents some concepts of the invention in a general form as a prelude to the more detailed description provided below.

Aspects described herein provide activity data recording, on-line communities and interfaces between activity monitoring and tracking devices and systems supporting multiple different types of activities. Additionally or alternatively, the various aspects described herein provide for distinguishing activity data and information based on a type of device through which the activity data was recorded. Still further, activity data from multiple types of activity types, devices and device types and activity sessions may be aggregated toward a single goal. In this manner, goals providing motivation to perform activities (including fitness programs, sports, and other types of physical activity and athletic activity) might no longer limit users to a single activity or device for a particular goal.

Other aspects and features are described throughout the disclosure.

BRIEF DESCRIPTION OF THE DRAWINGS

The present disclosure is illustrated by way of example and not limited in the accompanying figures in which like reference numerals indicate similar elements and in which:

FIGS. 5A-5I illustrate example interfaces for a device setup and configuration application.

FIGS. 9A and 9B illustrate different interfaces that may be generated and displayed depending on the type of activity data that is to be viewed.

FIGS. 10A-10G illustrate example activity tracking and monitoring interfaces that may be used to track multiple types of activities and activities recorded using multiple types of monitoring devices.

FIGS. 16A and 16B illustrate example notifications that may be displayed to a user through an on-line activity tracking site.

DETAILED DESCRIPTION

In the following description of various example embodiments, reference is made to the accompanying drawings, which form a part hereof, and in which are shown by way of illustration various example devices, systems, and environments in which aspects may be practiced. It is to be understood that other specific arrangements of parts, example devices, systems, and environments may be utilized and structural and functional modifications may be made without departing from the scope of the present disclosure.

Overview

Figure 1:
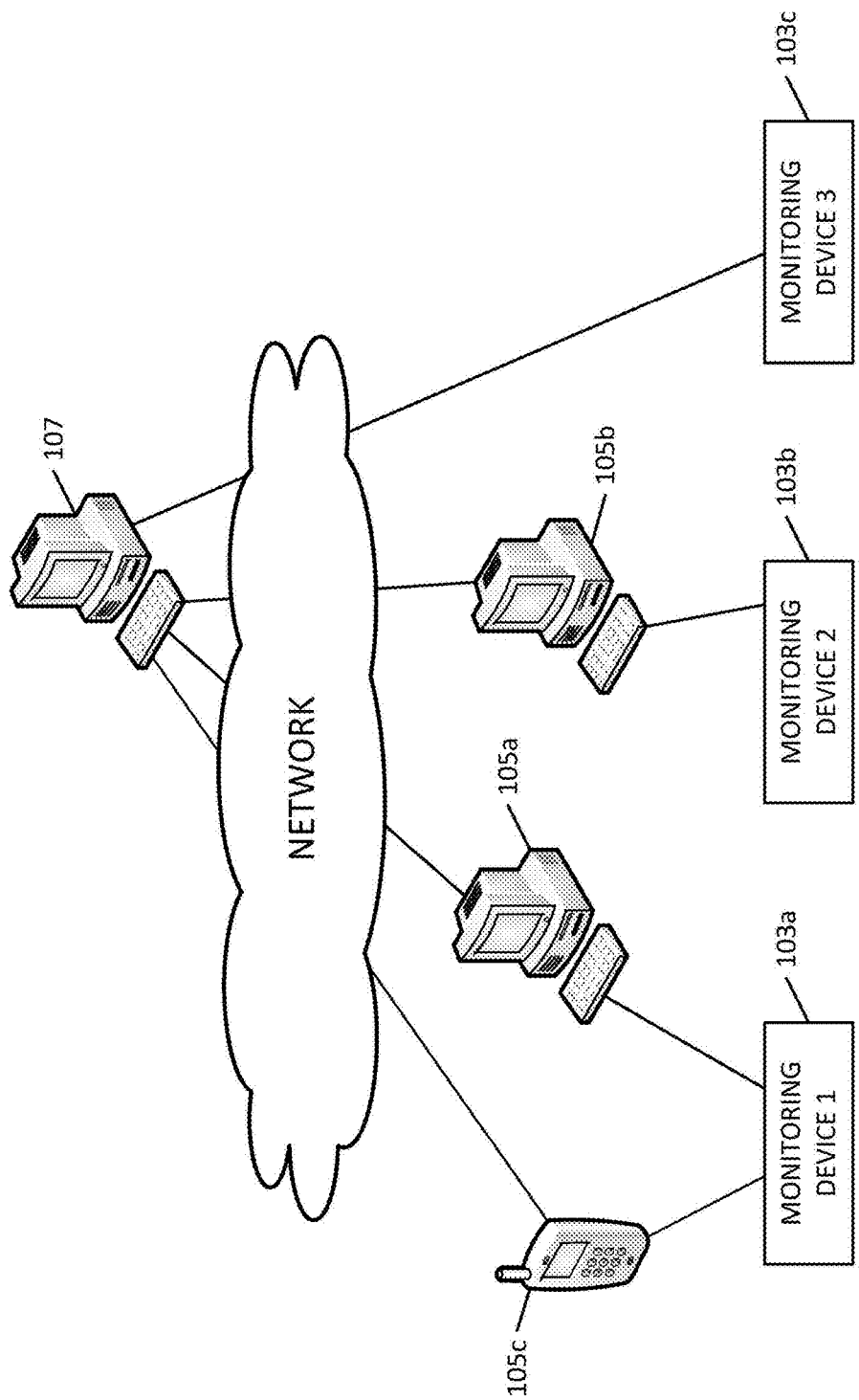
FIG. 1 illustrates a general network and system environment in which one or more aspects described herein may be used and operate.

FIG. 1 illustrates a general network and system environment in which one or more aspects described herein may be used and operate. For example, environment 100 may include multiple devices connected via various types of networks, connections and protocols including the Internet, short-range and long-range wireless communications, wired communications, cellular communications, BLUETOOTH (e.g., Low-Energy), ZIGBEE, RFID, Wi-Fi, WLAN, USB, FireWire and the like and/or combinations thereof. For example, activity monitoring devices 103a and 103b may be connected to computing devices 105a and 105b, respectively, through short-range connections including wired and wireless connections. Activity monitoring device 103c, on the other hand, may be connected to a remote activity monitoring and tracking system 107 via long-range wireless or wired communications including Wi-Fi, cellular communications, TCP/IP, Ethernet and the like and/or combinations thereof.

Activity monitoring devices 103a, 103b and 103c may include any type of activity monitoring system including smartphones, dedicated activity monitoring devices, sensors and the like and/or combinations thereof. Examples of activity monitoring devices are described in: U.S. application Ser. No. 13/287,047, entitled "Wearable Device Having Athletic Functionality," filed Nov. 1, 2011; U.S. patent application Ser. No. 12/767,288 entitled "Athletic Watch," filed Apr. 26, 2010; U.S. patent application Ser. No. 12/767,447 entitled "GPS Features And Functionality In An Athletic Watch System," filed Apr. 26, 2010; U.S. patent application Ser. No. 12/767,425 entitled "Athletic Watch," filed Apr. 26, 2010; U.S. application Ser. No. 12/767,308, entitled "Athletic Watch," filed Apr. 26, 2010; and U.S. application Ser. No. 13/343,587, entitled "Athletic Watch," filed Jan. 4, 2012, the contents of which are hereby incorporated by reference in their entirety.

Activity monitoring devices 103a, 103b, 103c may include different sensors (e.g., heart rate monitor, accelerometer, global positioning system, cellular triangulation system, shock sensors, temperature gages, gyroscopes, light sensors, etc.), may use different communication or data recording protocols, have different calibrations and/or be configured to detect different types of activity and movement. For example, device 103a may be configured to detect a number of steps and a corresponding pace based thereon while device 103b may be configured to detect heart rate and hip movement (e.g., for basketball or other types of sports). Accordingly, the data recorded by devices 103a and 103b might not be immediately compatible or comparable. A user may, for instance, have to view metrics and the recorded data using different applications, services or systems so that the information is appropriately processed and visualized or otherwise conveyed. Even between devices having similar components (e.g., devices 103a and 103c), the devices may have different sensitivities or calibrations and thus, the resulting data may still offer inaccurate comparisons of performance.

To facilitate comparisons and to streamline tracking of overall physical activity, activity data may be processed using a multi-activity system and platform such as system 107. System 107 may host an activity monitoring and tracking site and community through which users may track their own activity progress as well as connect with other users to share and/or compare activity levels, compete, engage in joint activities, communicate and the like. As described herein, communication of activity data between monitoring devices 103a and 103b may be facilitated through computing devices 105a and 105b, respectively. Activity monitoring device 103a may further communicate data with device 105c. However, use of computing devices 105a, 105b, and 105c might not be necessary, if, for instance, devices 103a and 103b include communication means (e.g., Internet access or wide-area network access) for interfacing with system 107. In some examples, devices 105a, 105b and 105c may also provide intermediate processing of activity data and include one or more of a multi-activity system and platform's functions and/or capabilities.

System 107 may be configured to provide a single source through which a user may view activity data for a variety of activities and types of activities performed. Rather than having to view basketball activity data, for example, through a first site or system and running data through another site or system, the user may view the information in aggregate through a single platform or system. Additionally, data recorded using different monitoring devices or types of activity monitoring devices such as devices 103a, 103b and 103c may also be aggregated and viewed together. System 107 may also provide visualizations and data processing that allows more granular control of the recorded data and activities. For example, system 107 may provide the user with the ability to view sets of activity data based on the monitoring device used, type of activity monitoring device, type of activity performed, time period, and/or activity session. Moreover, the aggregation of physical activity data by system 107 may allow a user to measure, view and evaluate his or her overall physical activity levels. For example, various physical activity data (e.g., metrics) may be converted into a virtual activity metric, such as activity points, to provide a basis of comparison between different activities and activity sessions. Additionally, a user may define goals that may be achieved through performing multiple types of activities, even if the multiple types of activities are measured using different metrics or provide different types of sensor data, and/or if the user uses different monitoring devices or types of monitoring devices such as devices 103a, 103b and 103c.

Computing devices 105a, 105b and 105c may be configured to provide data processing similar to that of system 107, without requiring data to be sent to system 107. For example, computing device 105a may receive data from multiple monitoring devices 103a, 103b and/or 103c and provide comparisons and data tracking similar to system 107. Alternatively or additionally, computing devices 105a, 105b and 105c may also be used in some arrangements to provide intermediate storage of data and to facilitate data communication with system 107. For example, if devices 103a and 103b include relatively small memory capacities, computing devices 105a, 105b and 105c may be used to store recorded data from devices 103a and 103b, respectively so that devices 103a and 103b may delete previously recorded activity data to make space to store additional new data. Computing devices 105a, 105b and 105c may correspond to other activity monitoring devices, telecommunication devices such as cellular phones, satellite phones, Internet telephony devices, smart phones and the like, portable computing devices including music players, video players, laptop computers and the like and/or desktop computing systems such as personal computers (PCs).

In one or more arrangements, one or more of devices 105a, 105b and 105c may be configured differently than the other devices. In one example, device 105c may be configured for local synchronization and storage of activity data while one or more of devices 105a and 105b may be configured for pass-through synchronization. Accordingly, activity data may be synchronized between activity monitoring device 103a and device 105c such that activity data is stored on device 105c. The activity data may then be synchronized to multi-activity system 107 at some point in the future. When in pass-through synchronization mode, device 105a may facilitate synchronization between device 103a and multi-activity system 107 without intermediate storage. That is, device 105a might not support synchronization between just device 105a and activity monitoring device 103a. The various synchronization configurations of devices 105a, 105b and 105c may depend on the type of synchronization applications installed and/or executing thereon.

Figure 2:
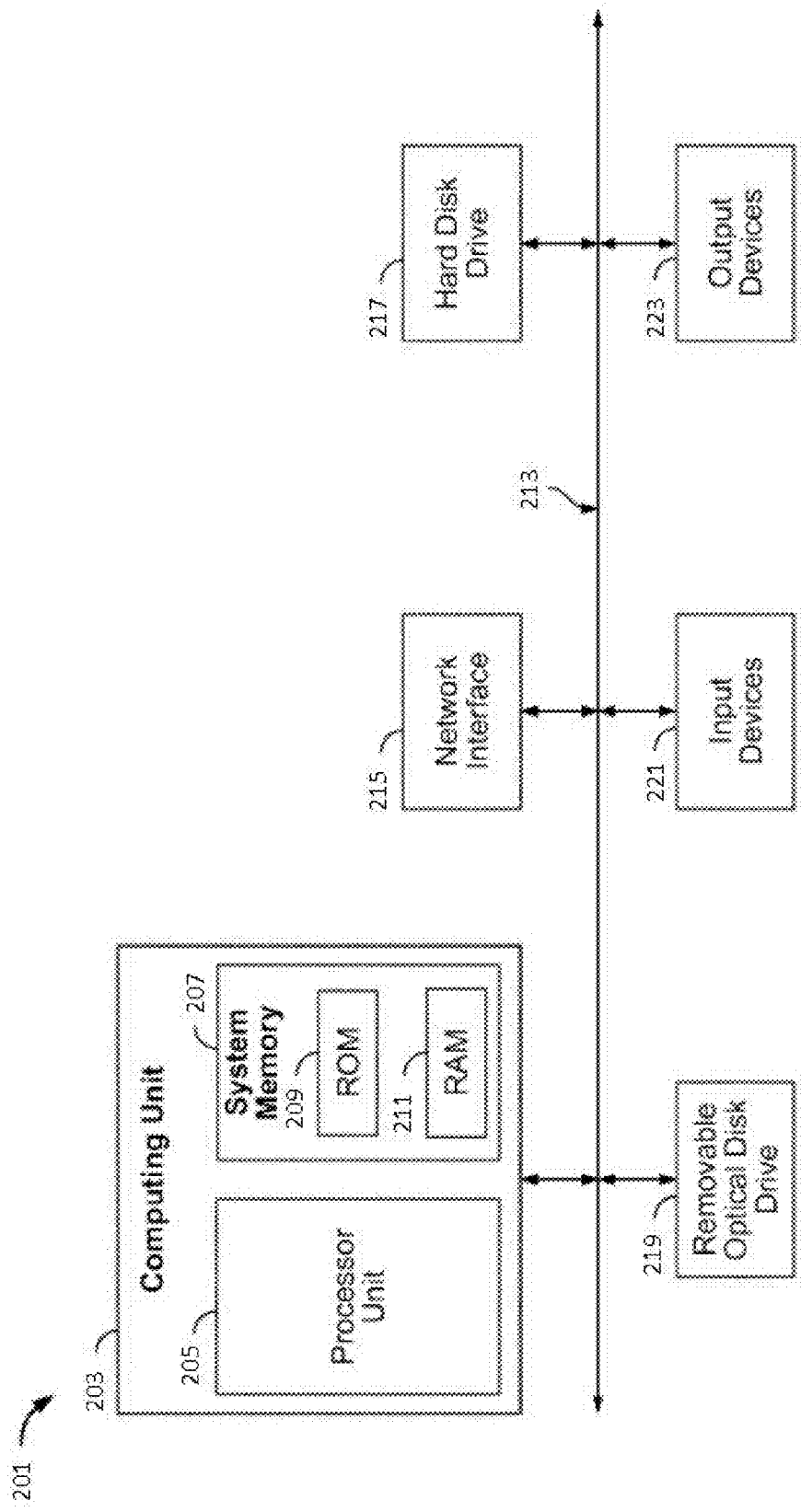
FIG. 2 illustrates an example computing system.

FIG. 2 illustrates an example computing system that may be included in one or more of the devices described in FIG. 1. For example, computing system 201 may be adapted to operate as any one of devices 103a, 103b, 103c, 105a, 105b and 107. As seen in this figure, the computer 201 has a computing unit 203. The computing unit 203 may include a processing unit 205 and system memory 207. The processing unit 205 may be any type of processing device for executing software instructions, but may conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 217 and the removable optical disk drive 219. Computer 201 may further use or interface with other memory storage mediums such as solid state drives, removable magnetic disk drives and flash memory cards. The processing unit 205 and the system memory 207 also may be directly or indirectly connected to one or more input devices 221 and one or more output devices 223. The input devices 221 may include, for example, a keyboard, touch screen, a remote control pad, a pointing device (such as a mouse, touchpad, stylus, trackball, or joystick), a scanner, a camera or a microphone. The output devices 223 may include, for example, a monitor display, television, printer, stereo, or speakers.

Still further, the computing unit 203 may be directly or indirectly connected to one or more network interfaces 215 for communicating with a network. This type of network interface 215, also sometimes referred to as a network adapter or network interface card (NIC), translates data and control signals from the computing unit 203 into network messages according to one or more communication protocols, such as the Transmission Control Protocol (TCP), the Internet Protocol (IP), and the User Datagram Protocol (UDP). Network adapters may be wireless or wired or combinations thereof. These protocols are well known in the art, and thus will not be discussed here in more detail. An interface 215 may employ any suitable connection agent for connecting to a network, including, for example, a wireless transceiver, a power line adapter, a modem, or an Ethernet connection. Connection agents may similarly be wireless or wired or a combination thereof. Accordingly, using interface 215, computer 201 may be able to access wide area networks such as the Internet in addition to local area networks. In one or more arrangements, a user may browse websites or other network devices through a local or wide area network using interface 215. Data such as physical activity may be transmitted to or received from local or remote network sources (e.g., devices 103a, 103b, 103c, 105a and 105b of FIG. 1).

Other peripheral devices may be included with or otherwise connected to a computer 201 of the type illustrated in FIG. 1, as is well known in the art. In some cases, a peripheral device may be permanently or semi-permanently connected to the computing unit 203. For example, with many computers, the computing unit 203, the hard disk drive 217, the removable optical disk drive 219 and a display are semi-permanently encased in a single housing. Still other peripheral devices may be removably connected to the computer 201, however. The computer 201 may include, for example, one or more communication ports through which a peripheral device can be connected to the computing unit 203 (either directly or indirectly through the bus 213). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, the computer 201 may include a wireless data "port," such as a Bluetooth interface, a Wi-Fi interface, an infrared data port, or the like.

It should be appreciated that a computing device employed according to various examples of the invention may include more components than the computer 201 illustrated in FIG. 2, fewer components than the computer 201, or a different combination of components than the computer 201. Some implementations, for example, may employ one or more computing devices that are intended to have a very specific functionality, such as a digital music player, an activity monitoring device or server computer. These computing devices may thus omit unnecessary peripherals, such as the network interface 215, removable optical disk drive 219, printers, scanners, external hard drives, etc. Some implementations may alternately or additionally employ computing devices that are intended to be capable of a wide variety of functions, such as a desktop or laptop personal computer. These computing devices may have any combination of peripheral devices or additional components as desired.

Figure 3:
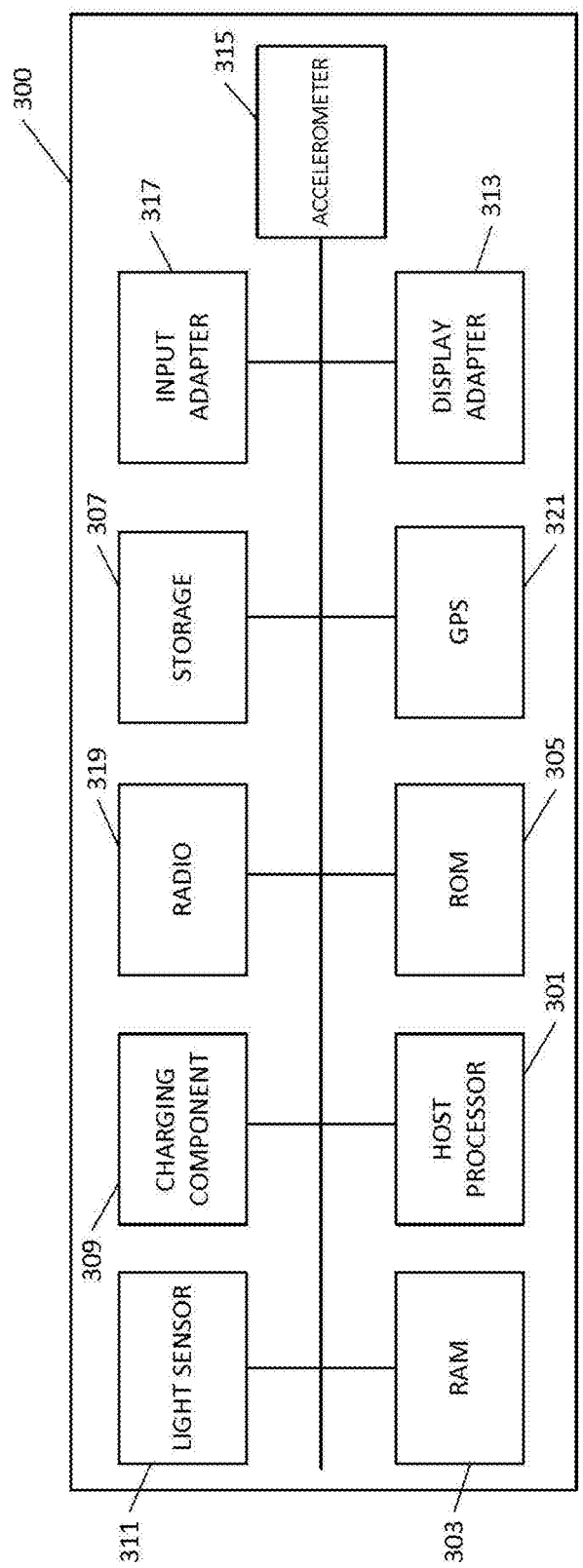
FIG. 3 illustrates another example computing device which may be applied to an activity monitoring device.

FIG. 3 illustrates another example computing device which may be applied to an activity monitoring device such as devices 103a, 103b and 103c of FIG. 1. For example, activity detection and tracking device 300 may include a variety of components including a main controller or host processor 301 configured to execute instructions and control other components of the device 300 in accordance with the instructions. The device 300 may further include memory for storage of data and instructions including volatile and non-volatile memory such as random access memory (RAM) 303, read-only memory (ROM) 305 and storage 307. Additionally, the device 300 may include a charging component 309 for charging one or more batteries (not shown) powering the device 300. The device 300 may further include various input and output adapters and other components including an ambient light sensor 311, a display adapter 313, an accelerometer 315 and input adapter 317. Ambient light sensor 311 may be used to determine a level of brightness for one or more displays for viewability. Light sensor 311 may also be used to determine a general time of day. Input adapter 317 may be configured to receive and process various types of input including button presses, touch input, scroll wheel input and the like, depending on the types of input devices included in the device 300. Accelerometer 315 may be configured for detecting movement of the wearable device and the user when the device is worn. In some examples, accelerometer 315 may be a one-axis, three-axis or six-axis accelerometer. Other sensors including heart-rate sensors, temperature sensors, humidity sensors, compass, gyroscopic sensor and the like may also be included in the device 300.

Communication by the device 300 may be performed through wired and wireless connection means. In one example, device 300 may include a radio component 319 configured to communicate with other devices wirelessly through radio frequency transmissions. The radio component 319 may correspond to a BLUETOOTH transceiver, an RFID device, a Wi-LAN transceiver, cellular transceiver and the like and/or combinations thereof, and/or may include a dedicated processor. Display adapter 313 may be configured to control one or more displays of the device in conveying various activity information, interaction information, alerts, notifications and the like. In one example, display adapter 313 may be configured to control a first display independently from controlling a second display of the device 300. The wearable device may further include location determination components such as global positioning system (GPS) component 321. Location determination may also be performed using other devices including a cellular transceiver (e.g., based on cellular triangulation). Components described herein may be combined into a single device or may be distributed over multiple components. Moreover, additional or alternative components may be used to provide additional or alternative functionalities.

A multi-activity platform and system such as system 107 may be configured to receive physical activity data for multiple different types of activities and multiple activity sessions from a variety of different monitoring/detection devices and types of monitoring/detection devices. The various functionalities provided by the system may include: activity data tracking and processing, facilitating activity challenges, interfacing with legacy activity tracking systems, generating community information including activity statistics for an entire community, device configuration, setup and synchronization, tracking and processing goals, user registration, interfacing with other communities or social networks to obtain or provide relevant information, user profile and site management and the like.

While the multi-activity platform and system 107 is described as being separate from devices 103a, 103b, 103c, 105a, 105b and 105c, all or a portion of the multi-activity platform may be implemented in devices 103a, 103b, 103c, 105a, 105b and 105c. For example, the multi-activity platform may include an application protocol interface configured to facilitate data communication and interactivity between different activity monitoring devices, tracking services or systems, activity monitoring applications and the like. As such, regardless of the configuration or type of the activity monitoring device (e.g., types of sensors included or type of activity to be tracked), tracking service or system or applications executed thereon, data may be communicated and functions may be invoked using a shared framework.

Figure 4:
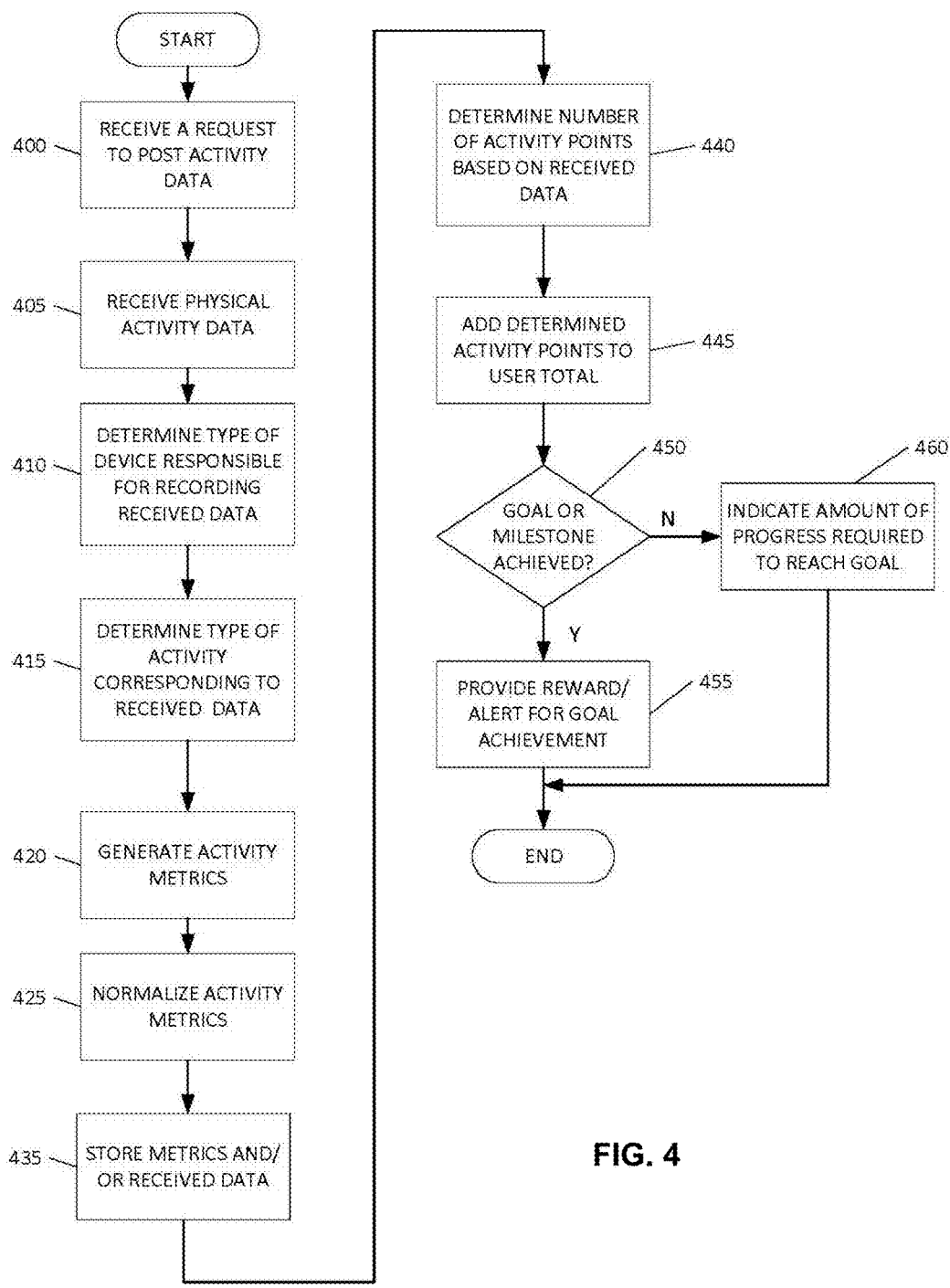
FIG. 4 illustrates an example process through which a multi-activity platform and system may process activity data from multiple devices and for multiple activities.

FIG. 4 illustrates an example process through which a multi-activity platform and system may process activity data from multiple devices and for multiple activities. In step 400, the system may receive a request to post data to the system. The request may be received from an activity detection and monitoring device such as devices 103a, 103b and 103c (FIG. 1) or from an intermediary device such as computing devices 105a and 105b (FIG. 1). In step 405, the system may receive the physical activity data from the requesting device. The physical activity data may be transmitted according to various protocols and, in at least one example, may be transferred using an API provided by the system, as discussed in further detail herein. In step 410, the system may determine a device type of an activity detection and monitoring device responsible for recording the physical activity data. Device types may be indicative of device capabilities, a type of activity for which the device type is configured for use, device components, data accuracy, data recording parameters (e.g., how frequently data is collected), and the like and/or combinations thereof. The device type may be determined based on various parameters specified in the request (e.g., a device type parameter in a data posting function of the API) or based on an analysis of the physical activity data received. For example, the system may determine if the physical activity data received includes accelerometer data, heart rate data, GPS data and the like. Based on predefined rules, the system may then determine whether the types of data in the physical activity data correspond to a first device type or a second device type. In another example, the system may receive a device identifier such as a user specified name, a brand, a product name, a serial number and the like and determine the device type based thereon. In a particular example, the device identifier may be pre-associated or registered with the device type at a time of device registration. Various other manners of determining device type may also be used as needed or desired.

In step 415, the system may further determine a type of activity associated with the received physical activity data. In one example, this determination may be made based on the type of device from which the data was received. For instance, a first type of device may be configured for a first activity type such as basketball while another type of device may be configured for a second activity type such as running or walking In another example, the activity type determination may be determined based on a data parameter received by the system. The parameter may be user-specified by a user tagging the activity data with the type of activity performed or may be tagged by one or more devices based on activity type recognition algorithms and methodologies. In one example, a device such as the activity detection and monitoring device may compare the pattern of physical activity data to previous sets of physical activity data and determine similarities. Upon determining that the pattern of physical activity is of a predefined threshold match with a previous set of physical activity data (of a known activity type), the device may determine that the recently recorded physical activity corresponds to the same activity type. Various other functions, algorithms and methods may be used for determining activity type.

In step 420, the system may be optionally configured to generate activity metrics for the physical activity data received. Metrics may include time, pace, distance, heart rate, body temperature, steps taken, calories burned and the like. In some arrangements, the physical activity data may already include metrics generated by the activity detection and monitoring device or an intermediary computing device. Accordingly, the system may be configured to determine whether metrics have already been generated or included in the received activity data and if not, generate the metrics. However, if the metrics are already generated/included, the system might not generate metrics. In other arrangements, the physical activity data may be raw sensor data that has not been processed into metrics. Accordingly, if the latter, the system may process the raw sensor data into one or more metrics. For example, for accelerometer data and running activities, foot contact time may be identified from sensor data according to various known methodologies, and pace, distance and speed may be calculated therefrom. The metrics may be generated using algorithms and methods selected based on the device type and/or the type of athletic activity performed. For example, different device types may have different calibration values while data for different types of athletic activity may correspond to different types of metrics.

Different device types may also have different sensors and thus require different types of algorithms for processing the sensor data.

In step 425, the system may further normalize the activity metrics determined from the activity data. Normalization may be performed to compensate for discrepancies in data accuracy between different devices, different device types, different activity sessions, different activity types and the like. Normalization may be performed using predefined tables or normalization (e.g., calibration) values for adjusting metrics determined for certain types of activities or types of devices. Thus, distance run as determined using a first activity monitoring device may be multiplied by a factor of 1.05 while distance run as determined using a second activity monitoring device may be multiplied by a factor of 0.998. These normalization or calibration values may be determined based on empirical analysis in one or more arrangements. In other examples, normalization and calibration values may be determined based on statistical analyses by asking a user to perform a specified activity (e.g., run 200 feet) and recording and analyzing the resulting data.

In step 430, the system may further determine whether the activity session, type of activity performed, device used or device type is eligible for a virtual or universal activity metric such as activity points. The system may, for example, restrict the accumulation of activity points to certain activities, activity types, devices or device types and/or combinations thereof. Activity points may be used to convey a measure of overall activity level, to define and measure progress toward a goal, as virtual currency, to achieve milestones and other types of achievements and the like. By using a virtual/universal metric, activity resulting from multiple activities, activity types, devices and device types may be aggregated into an overall activity level or amount. If the activity data is not eligible for activity points, the activity data such as the raw data and/or the metrics may be stored in step 435 without converting those metrics and data into an amount of activity points and without rewarding the user with activity points. The process may then continue to step 450 or the process may end.

If, on the other hand, the activity data is eligible for activity points, the system may determine a number of activity points corresponding to the received physical activity data in step 440 using varying algorithms depending on device type and/or activity type. For example, different algorithms may be defined for different device types, different activity types or different combinations of device types and activity types. The metrics and/or raw activity data may also be stored. Since some activities may require a lower level of physical exertion for the same amount of physical activity (e.g., as defined by one or more particular metrics) than others, different algorithms may be used. In one example, traversing 3 miles by running may be more physically taxing than traversing 3 miles by walking. Accordingly, the algorithm for the running activity (to activity points) may generate a greater number of activity points than an algorithm used to generate activity points for the walking activity. That is, more activity points may be awarded for running 3 miles than for walking the 3 miles. Algorithms may also take into account multiple types of activity metrics such as heart rate, distance, pace, body temperature and the like. In some arrangements, activity characteristics such as altitude, terrain, temperature, and weather (e.g., rain, snow, sun) may also be used in the activity point determination process.

Once the number of activity points has been determined, the activity points may be added to a total number of activity points for a particular time period in step 445. For example, activity points may be accumulated to achieve a goal during a goal time period (e.g., 1 hour, 12 hours, a day, 2 days, a week, etc.) As such, in step 450, the system may determine whether the user has achieved a goal, reached a milestone or the like based on an amount of activity points accumulated. For example, a user may have a 3,000 activity point goal for the day. Accordingly, the system may determine whether the user has achieved 3,000 activity points for the day. In another example, a milestone may be defined as reaching 25,000 lifetime activity points. Accordingly, the system may determine whether a total of all lifetime accumulated activity points has reached 25,000. As such, different activity point counts may be kept for different time periods.

If the user has reached a goal or achieved a milestone, a reward or alert may be provided to the user in step 455. The reward may include virtual items, services, coupons, tickets, currency, virtual currency, items for an avatar and the like. If a goal has not been achieved or a milestone not reached, the system may indicate an amount of progress still required (e.g., a number of activity points needed) to reach the milestone or goal in step 460.

In addition to receiving data from devices, the system may also be configured to transmit data to devices. For example, synchronization of data between the system and one or more monitoring devices may include transmitting physical activity data recorded by a first monitoring device to a second monitoring device and/or downloading historical activity data recorded by the first monitoring device back to the first monitoring device. In some instances, not all data may be transmitted from one monitoring device to another and instead, data may be filtered based on data compatibility, activity type, user performing the activity and the like. For example, a receiving device may be required to have the capability to record the same type of data (e.g., have the same type of sensor) as the data to be synchronized from the transmitting device. In another example, data might only be synchronized if the receiving device is configured to track and/or monitor an activity type corresponding to the data. Various other rules may be used to process synchronization requests. Activity points may always be synchronized so long as the receiving device has the ability to track activity points.

In some examples, transmission and synchronization of data between two monitoring devices may be facilitated by the multi-activity platform and system. For example, the system may be configured to convert data sent using a first communication protocol with which a receiving device is incompatible to a second communication protocol with which the receiving device is compatible. Additionally or alternatively, the content of the data may be modified by the system according to formatting requirements of the receiving device (e.g., character limits, image sizes, number formats, date formats, etc.) and data storage structures or parameters of the receiving device. In one example, user profile information may be automatically imported from one device to another device. Various data fields available on the first device might not exist on the second device and thus, the system may filter out data for those fields prior to synchronizing the information to the second device. The system may be configured to perform a variety of other data and protocol manipulation functions to provide compatibility between two devices.

As discussed, an activity monitoring device such as device 103*a*, 103*b* or 103*c* may initially detect and store activity data and subsequently synchronize the data with one or more of a local device/application (e.g., device 105*c*)

and/or a remote multi-activity system/server (e.g., system 107). In one arrangement, the multi-activity system/server may represent a destination or preferred storage site due to a larger storage capacity. Accordingly, data recorded by the activity monitoring device and/or synchronized to a local device/application such as device 105c may be ultimately transferred to the multi-activity system/server for long-term storage so as not to require and/or occupy large data storage capacities in the monitoring device and/or the local device. The local device may be a mobile communication device such as a smart phone, a portable media device, tablet computer, netbook computer, or laptop computer and/or a stationary device such as a desktop computer.

In some arrangements, an intermediary device such as device 105a may execute a synchronization application configured to synchronize data between the activity monitoring device and the multi-activity system/server. Such an intermediary computing device and synchronization application might not be configured to synchronize data between the intermediary device and the activity monitoring device. Instead, the synchronization application might only synchronize data between the activity monitoring device and the multi-activity system/server and only provide such synchronization functionality when a connection to the multi-activity system/server is available. In contrast, a local application/device may synchronize activity data from the activity monitoring device independently of synchronizing the data with the multi-activity system/server. Once a network connection is available with the multi-activity system/server or when the user elects to synchronize with the multi-activity system/server, the data may be subsequently synchronized to the multi-activity system/server from the local device/application.

Other synchronization processes may also be used. For example, a local device/application may synchronize data through the intermediary application/device. In yet another examples, the activity monitoring device may be configured to communicate directly with the multi-activity system/server (e.g., without first communicating with the local device/application or the intermediary application/device) and synchronize data therewith. As well, the one or more intermediary devices, with or without any local device(s), may synchronize among any combination thereof, e.g., depending on connectivity, the desirability to keep such combination(s) of devices in synchrony or otherwise. The activity monitoring device may or may not be synchronized together with any such combinations of intermediary and/or local device(s). The multi-activity system/server may or may not be synchronized together with any such combinations of intermediary and/or local device(s) and/or activity monitoring device.

In order to reduce the amount of overlap in data transmitted and synchronized, various parameters/settings may be defined to track the data that has been synchronized to the multi-activity system/server and to a local device/application. In one example, the activity monitoring device may store two parameters: a local read offset (LRO) and a local read time stamp (LRTS). The local read offset (e.g., memory location identifier) may indicate the offset in the activity monitoring device storage (e.g., flash memory) at which the local application/device should begin reading activity data from the monitoring device when synchronizing. For example, this memory location or offset may specify a location where a first unread activity data record is stored. The local read time stamp indicates the time stamp of the last sample read by the local application from the activity monitoring device storage. The time stamp may correspond to a time at which the sample (e.g., activity data) was recorded by the monitoring device. These parameters are set when (e.g., during or after) the local device/application synchronizes with the activity monitoring device. For example, the activity monitoring device may set and/or store the local read offset based on the memory location of the activity monitoring device storage last read by the local device. In particular, the local read offset may correspond to the offset of the last memory location read by the local device incremented by one position or memory location (e.g., the first new activity data memory location). As such, the LRO and LRTS may help the activity monitoring device, local application/device and/or the MSP track the data that has been read and/or the data that has not been read, so that read data is not re-transmitted needlessly to the local application/device during synchronization.

Additionally, the multi-activity service/system may define a last synchronization offset (LSO) and a last synchronization time stamp (LSTS). The LSO may refer to the offset (e.g., a memory location identifier) into the activity monitoring device's storage memory at which reading and synchronization of data to the multi-activity service/system should begin. The LSO may be different than the LRO if the local synchronization device has read more or less data than the amount of data that has been synchronized to the multi-activity service/system. On the other hand, if the same data that has been synchronized to the multi-activity service/system has also been read by the local device/application, the LSO and the LRO may be the same.

The local device may update (or cause the activity monitoring device to update) the LRO and LRTS upon synchronizing data with the monitoring device. Moreover, the local device may update the LSO and LSTS, or cause the LSO and LSTS to be updated upon synchronizing data to the multi-activity service/system. When the intermediary device/application conducts synchronization between the monitoring device/application and the multi-activity system/service, only the LSO and LSTS may be updated. In such event, the LRO/LRTS may also be updated. In one example, the intermediary device/application may initially request the LSO and LSTS from the multi-activity service/system and use the LSO and LSTS to determine a start point in the activity monitoring device's memory for reading data and synchronizing the data with the multi-activity service/system. Using the above process, the multi-activity service/system may avoid receiving data that has already been synchronized to the multi-activity service/system in the past.

Additionally or alternatively, data of the monitoring device already synchronized to the multi-activity system/service may be deleted from the monitoring device. In another example, the data may be deleted if the multi-activity system/service has not been synchronized with that data; in such case of deleted data, a notification or indicator may be provided to the activity monitoring device, a local device, an intermediary device and/or the multi-activity system/server indicating that synchronization is to be performed with the local device storing the data that has yet to be synchronized with the multi-activity system/service However, data only synchronized to a local device, and not the multi-activity system/service, might not be deleted. Examples of circumstances in which data might not be deleted include, e.g., to maintain redundancy as to the synched data (such as until a selected time has elapsed or a selected event occurred, such as synchronization to a predetermined device or number of devices, or to the multi-activity system/service), or in the event the user wishes to later synchronize the data through the intermediary device/ application instead of using the local device, and/or in the case the user wishes to synchronize additional local devices from the monitoring device. In other examples, the data may be deleted if the multi-activity system/service has not been synchronized with that data. Instead, a notification or indicator may be provided to the activity monitoring device, a local device, an intermediary device and/or the multi-activity system/server indicating that synchronization is to be performed with the local device storing the data that has yet to be synchronized with the multi-activity system/service. Data synchronized to the multi-activity system/service might not be deleted from the activity monitoring device in some instances if, for example, the data has not yet been synchronized to the currently proximate local device/application. The deletion of data from the activity monitoring device may be configurable by the user. Alternatively or additionally, data may be deleted once synchronized to the multi-activity system/service and/or to any other device in the event that the amount of space remaining on the activity monitoring device decreases below a specified threshold.

According to other aspects, data from an activity monitoring device may be synchronized to multiple local devices. In such a configuration, each local device may set a different set of LRO and LRTS markers unique to that local device.

In yet other arrangements, if a local device determines that the user is attempting to synchronize a threshold amount of data from the monitoring device, the local device may provide a message/recommendation to the user to use the intermediary device/application instead. This recommendation may be provided in circumstances where the intermediary device/application is configured to read data off of the monitoring device at a faster rate than the local device (e.g., USB vs. BLUETOOTH).

By using the above noted offsets and timestamps, the amount of data that may be synchronized is optimized such that new or unsynchronized data is to be synchronized to a recipient device.

Monitoring Device Setup/Configuration

A multi-activity platform and system may further allow devices, systems and applications to setup and configure various types of monitoring devices. In some arrangements, an intermediary computing device such as device 105*a* or 105*b* may serve as a multi-activity system that is configured to communicate with and interact with a various monitoring devices and device types that may be configured to detect and monitor a variety of types of activity. For example, intermediary application or computing device may be used to register users or devices with a multi-activity service or system such as an on-line community or service. In a particular example, the intermediary application or computing device may be configured to register multiple different devices and device types.

Figure 5B:
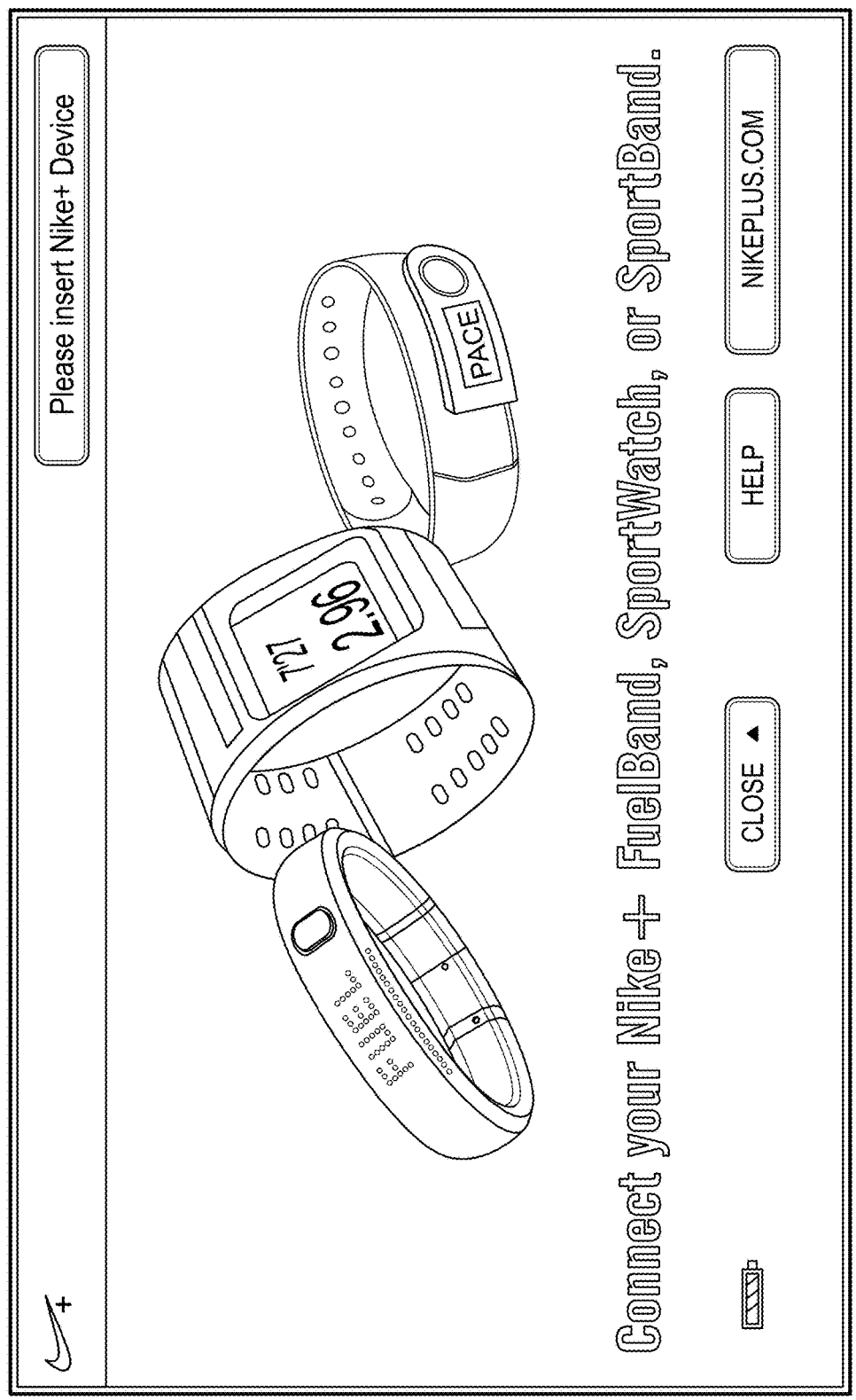

FIGS. 5A-5E illustrate example interfaces for a device setup and configuration application that may execute on a user's local computing device to which an activity monitoring device may be connected. In one example, the application may be stored in the activity monitoring device and downloaded and installed to a user's device upon connection. Alternatively or additionally, the activity monitoring device may store a location identifier such as a URI with an instruction for the computing device to retrieve and install the data located at the URI. In still another example, as illustrated in FIG. 5A, the activity monitoring device may specify a URI where the device may be introduced and an option may be provided to download a corresponding application for configuring the device. The local computing device may then automatically navigate to the URI upon connection of the activity monitoring device.

Figure 5C:
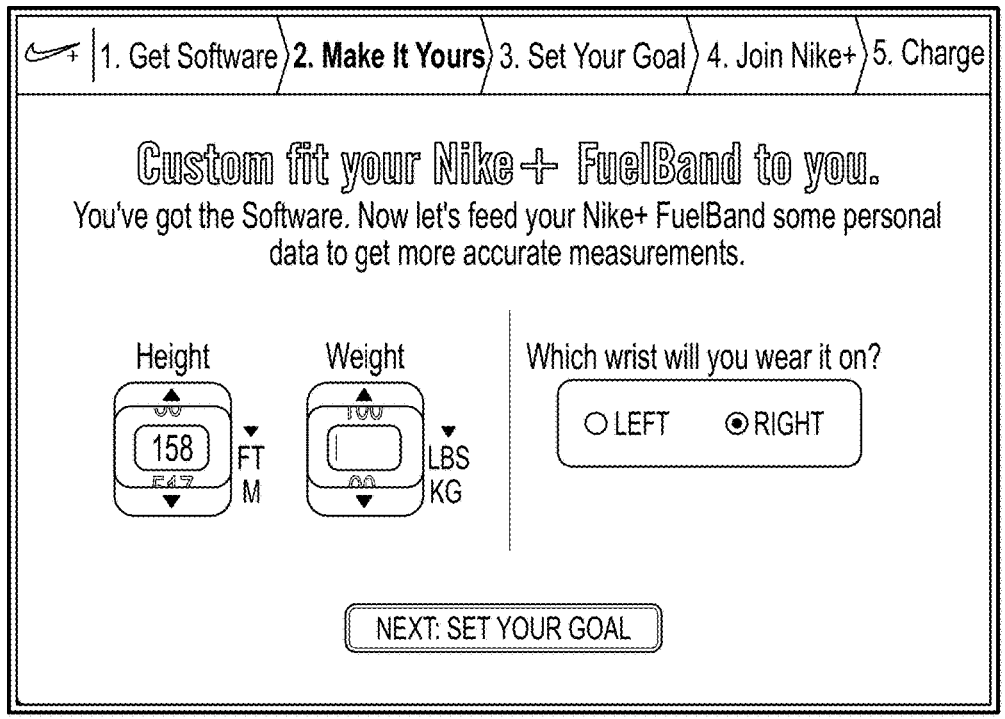
Figure 5D:

FIGS. 5B-5D illustrate example device configuration interfaces that may be provided upon downloading the device configuration application. FIG. 5C, for example, allows the user to specify user characteristics such as height and weight to help better calibrate the device as well as identify a wrist on which the device will be worn. Other types of user characteristics may be defined and provided as configuration options as desired or needed. For example, the device may be worn on other parts of the user's body. Age may also be added as a user characteristic for calibration purposes. In FIG. 5D, the user may be presented with an interface for setting an activity goal. The user may select any of multiple predefined levels or define his or her own goal manually (not shown). The goal may then be stored to the monitoring device for goal tracking and progress monitoring.

Figure 5E:
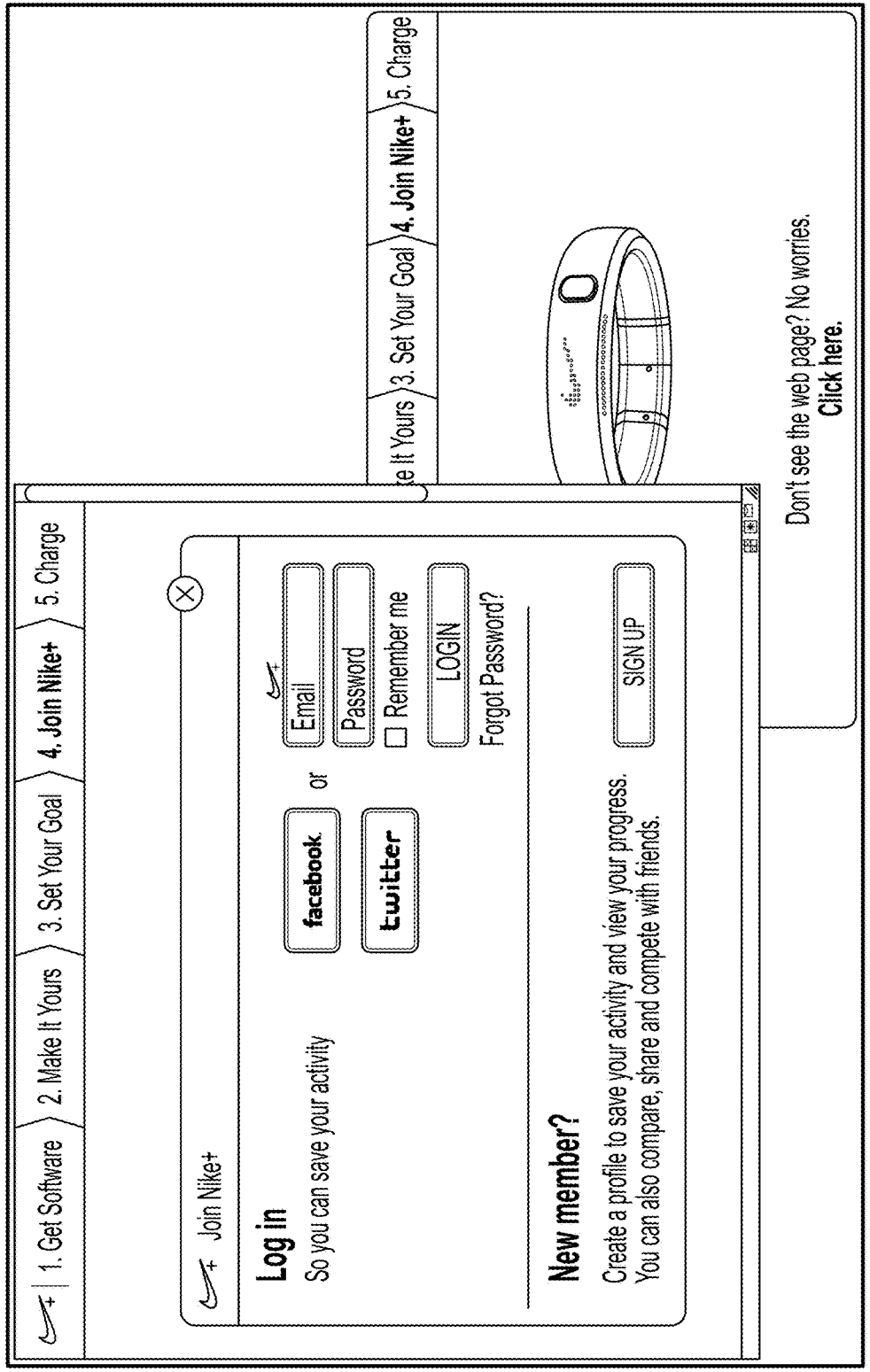

FIG. 5E illustrates an example interface through which a user may create or login to an on-line activity tracking and monitoring service. The user may be provided the option of registering a username specific to the service or using a login for an external site (e.g., an external social community network) as a login for the activity tracking and monitoring service. The various configuration and login information may be communicated to the monitoring device through the shared API as discussed herein. Additionally, a status of the device may be retrieved using the shared API as well. Other monitoring devices and device types may similarly be configured using the shared API. For example, the configuration and setup application may be configured to interact with multiple types of monitoring devices.

Figure 5F:
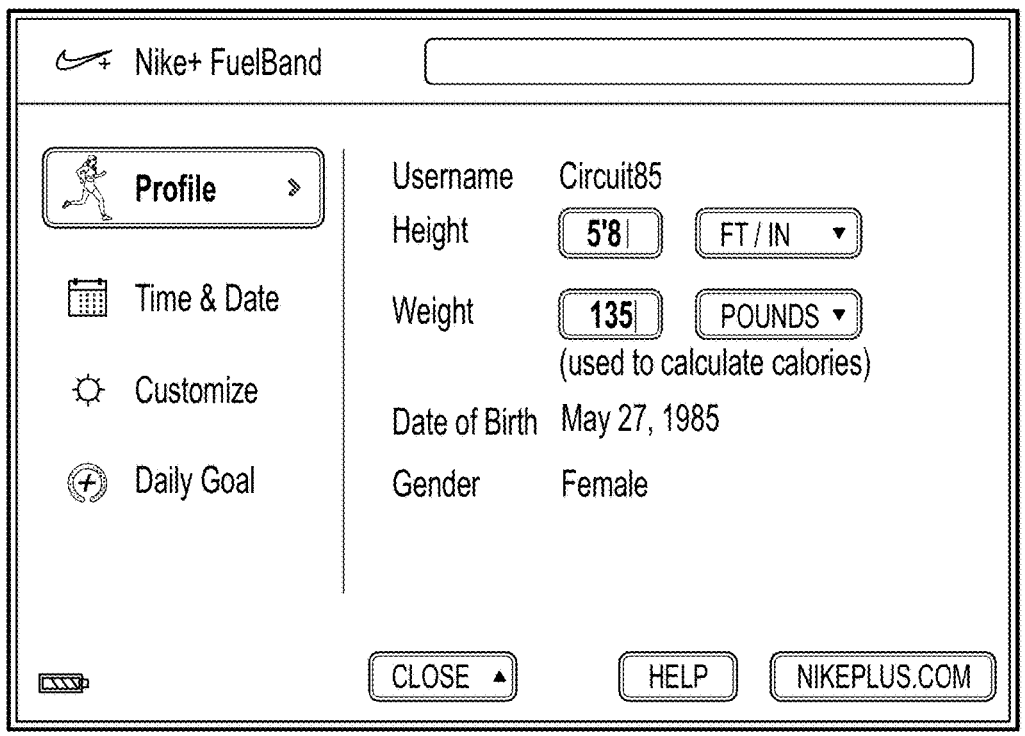
Figure 5G:
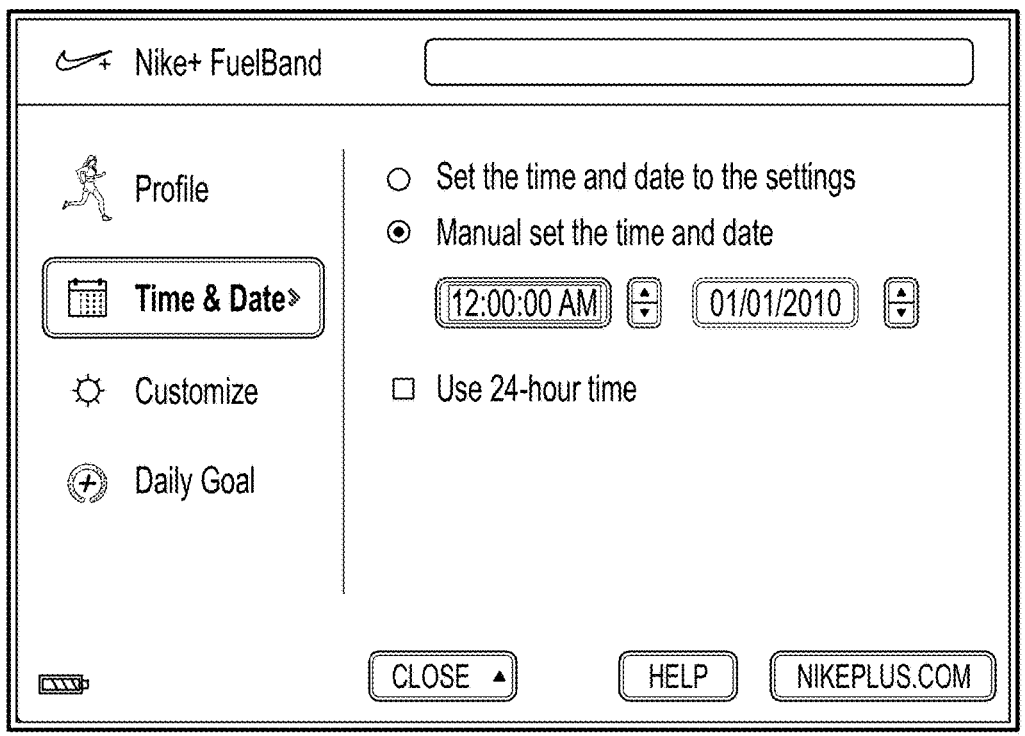
Figure 5H:
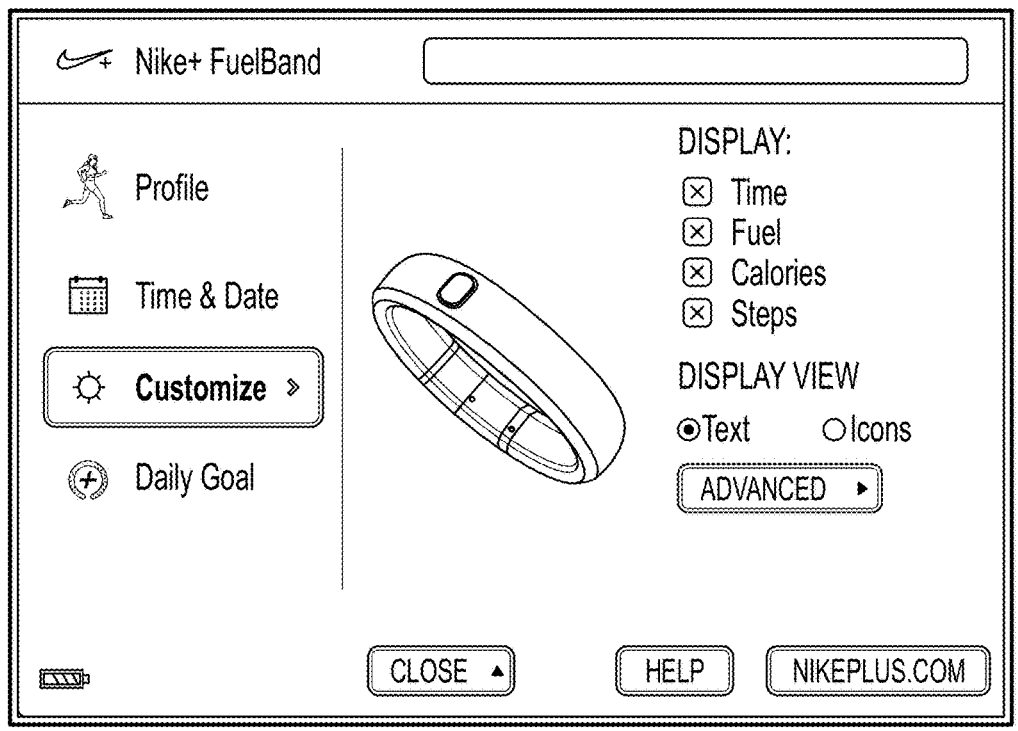
Figure 5I:
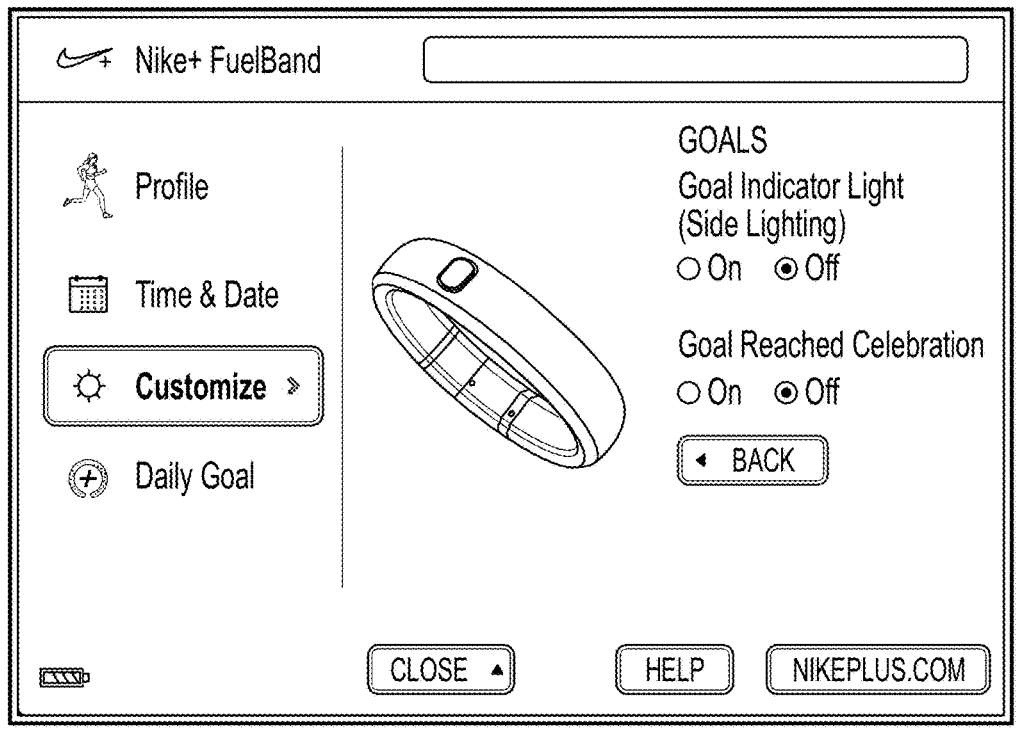

FIGS. 5F-5I illustrate further example application interfaces through which a user may configure an activity monitoring device. In FIG. 5F, for example, a user may specify his or her birthdate, gender, height and weight. In FIG. 5G, the user may further indicate how the device should obtain a time of day. The user may manually enter the time of day or may obtain time and date information from one or more other systems such as the computing device through which the device is being configured, a cellular system, a satellite and the like. The user may also indicate whether 24-hour or 12-hour time should be used. FIG. 5H illustrates an interface through which a user may select metrics that are to be displayed on the device. For example, a user may select to display calories, but not steps. Other settings may similarly be defined. FIG. 5I illustrates an interface through which a user may configure display options such as whether to use a goal indicator light and/or to include goal celebrations. Various other configuration options may be added or removed as desired or needed.

The configuration application may be configured to interact and configure multiple different types of devices. Accordingly, the configuration interfaces may differ in content and/or appearance depending on the type of device connected. In one example, the application may identify the type of device connected and automatically execute the appropriate APIs and display the corresponding interfaces for the identified type of device. The different interfaces may offer different configuration options such as different displayable metrics, color configurations (e.g., if the device support color displays), display configurations (e.g., different options depending on a number of displays included in the device) and the like and/or combinations thereof.

Figure 6A:
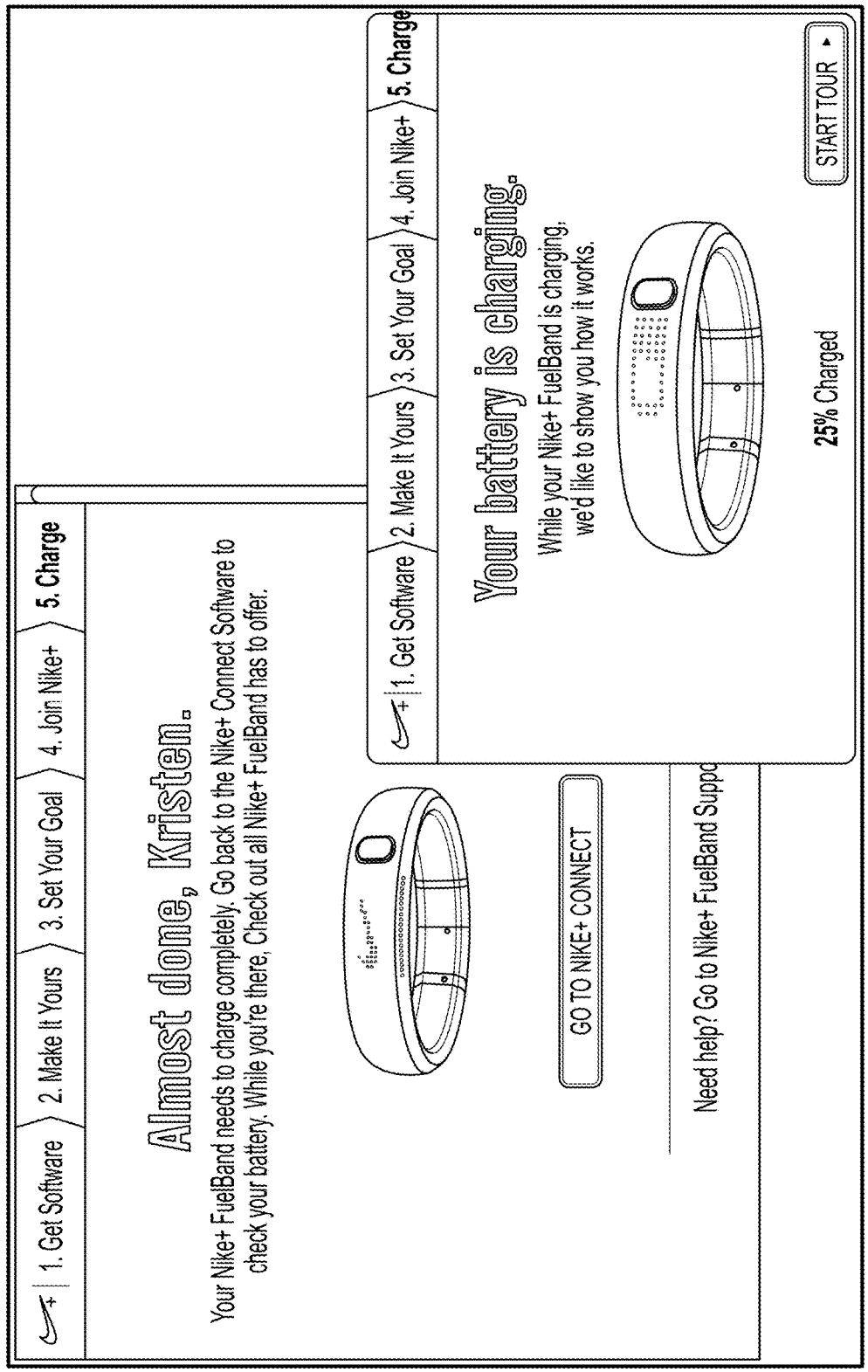
FIGS. 6A and 6B illustrate example interfaces conveying a battery charging status information.

FIG. 6A illustrates an example interface conveying a battery charging status of the device. In some examples, the device might not be useable for a first time until the device has reached a specific level of charge (e.g., 50%, 65%, 70%, 80%, 90%, 95%, 100%, etc.).

Figure 6B:

When the device has reached the requisite level of charge, a display such as the interface of FIG. 6B may be provided.

Figure 7:
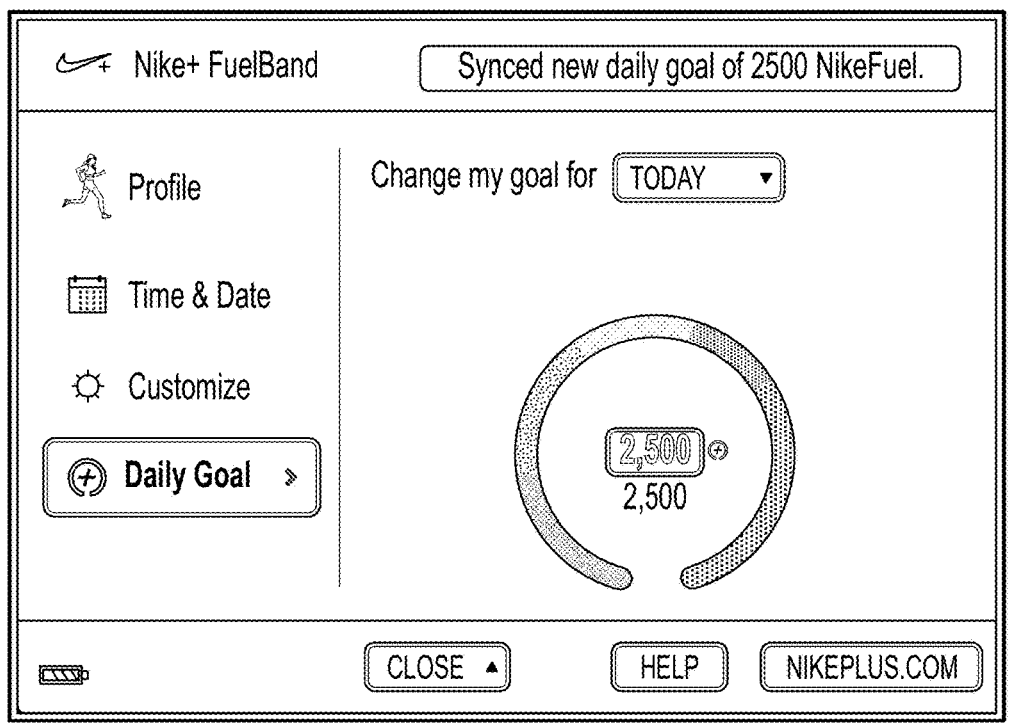
FIG. 7 illustrates another example configuration interface through which a user may define or redefine a goal.

FIG. 7 illustrates another example configuration interface through which a user may define or redefine his or her goal. The user may change a goal for the current time period or for any other time period as desired. Once the user has confirmed a goal, the goal information may be synchronized to the user's device using the various shared APIs described herein.

Multi-Activity Community

A multi-activity system or service may include an on-line community or site that allows a user to review activity information for not only his or her activities but for other activities. The review may include a variety of information types including audio, video, text and the like. For example, motivational messages (e.g., user generated or system generated) may be provided to users through audio messages. Users may also record audio notes to be stored in association with one or more activity sessions, goal time periods or the like.

The on-line community or site may provide a user with different initial interfaces depending on the user's status. For example, if the user is new to the community, a first interface may be displayed. On the other hand, if the user is a returning user, a second interface may be present to the user upon login.

Figure 8A:
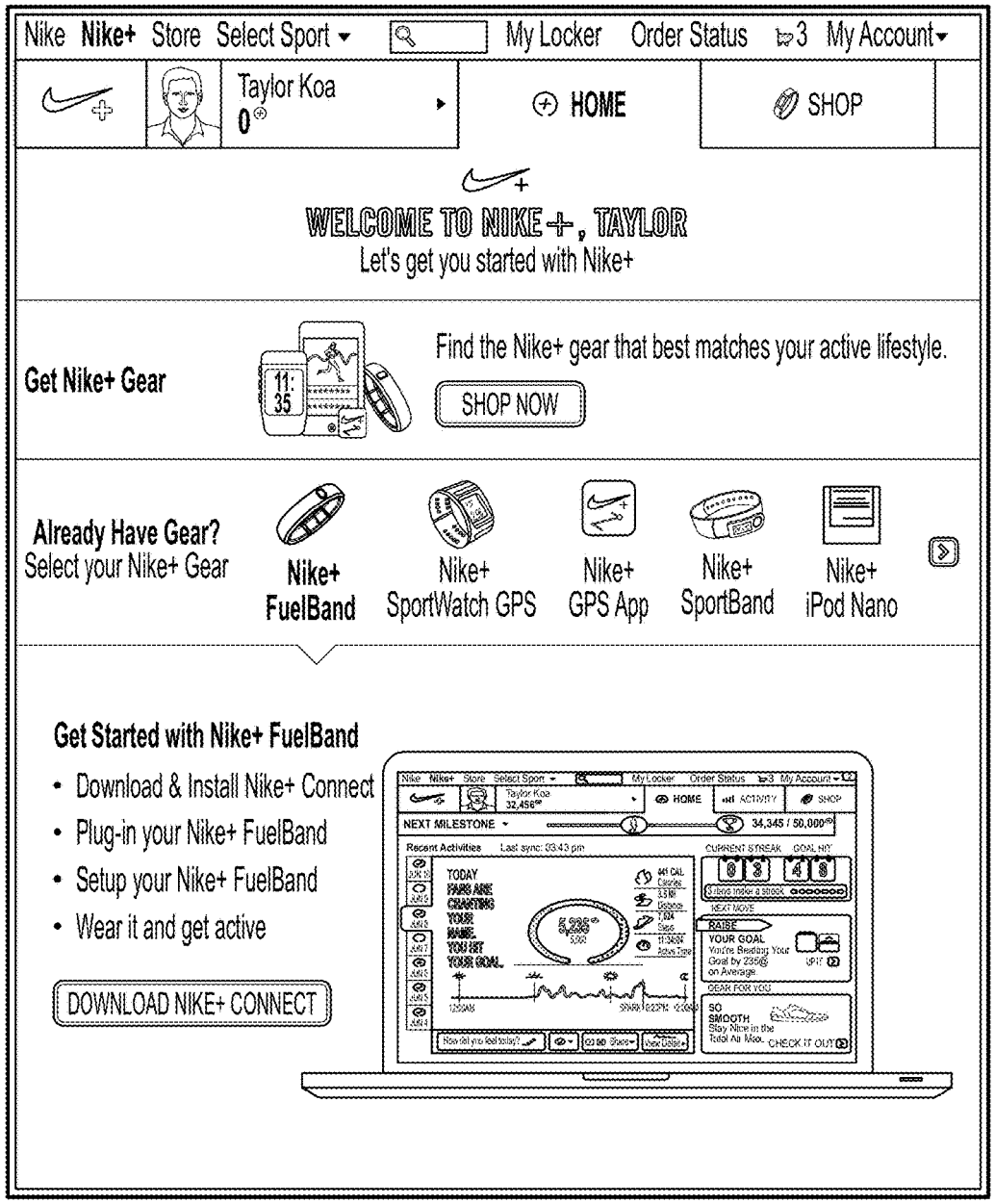
FIGS. 8A and 8B illustrate example welcome interfaces.

FIG. 8A illustrates an example welcome interface that may be displayed for a new user on an on-line community or site upon user login. The interface may provide options to the user to purchase activity monitoring devices, or to specify the type of monitoring device or other equipment that the user already has purchased and/or will be using if known. In some arrangements, the registration/configuration application may automatically notify the on-line community of registered devices and thus, the welcome interface for users (regardless of new or returning) may acknowledge the existence of a registered device upon login. For example, the list of product recommendations might not include ones already purchased and/or registered. The interface of FIG. 8A may further provide a link to download a registration/configuration application. Again, if the user has already downloaded the application, the interface might not provide the link.

Figure 8B:
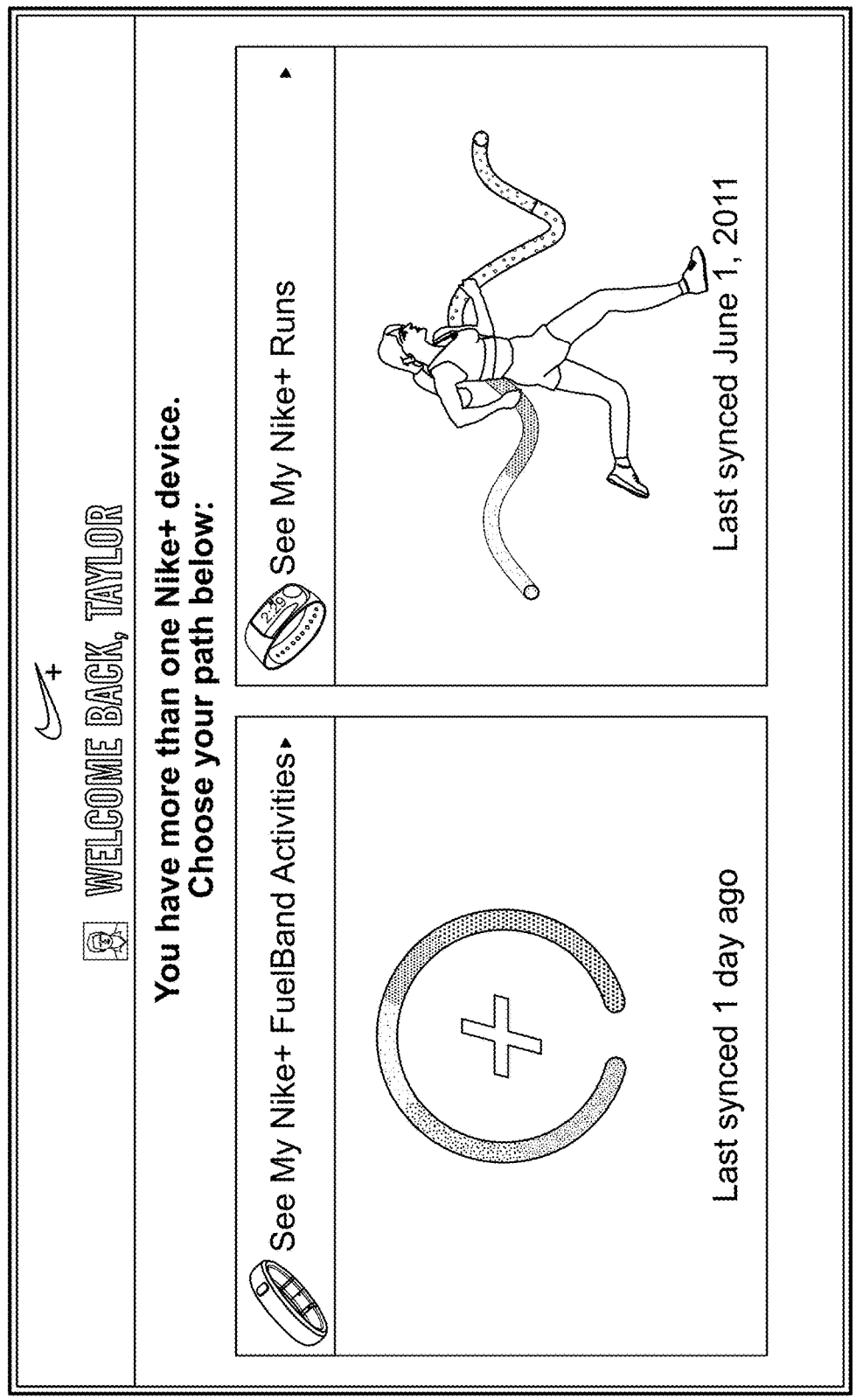

FIG. 8B illustrates an example welcome interface that may be displayed to an existing user of the on-line community/site. Instead of recommending products or providing options for downloading device applications, the interface may include options for viewing activity data. Activity data may be categorized based on type of activity and/or type of device used to record the activity data. Accordingly, the interface may provide multiple options for review of activity data depending on the types of activity in which the user has engaged and/or the types of devices the user has used to record his or her activity. As discussed herein, a multi-activity platform and system may be used to receive and differentiate between data of different activity types and device types. Accordingly, the on-line site/community may automatically recognize when different activity types and device types are represented in the activity data.

Figure 9A:
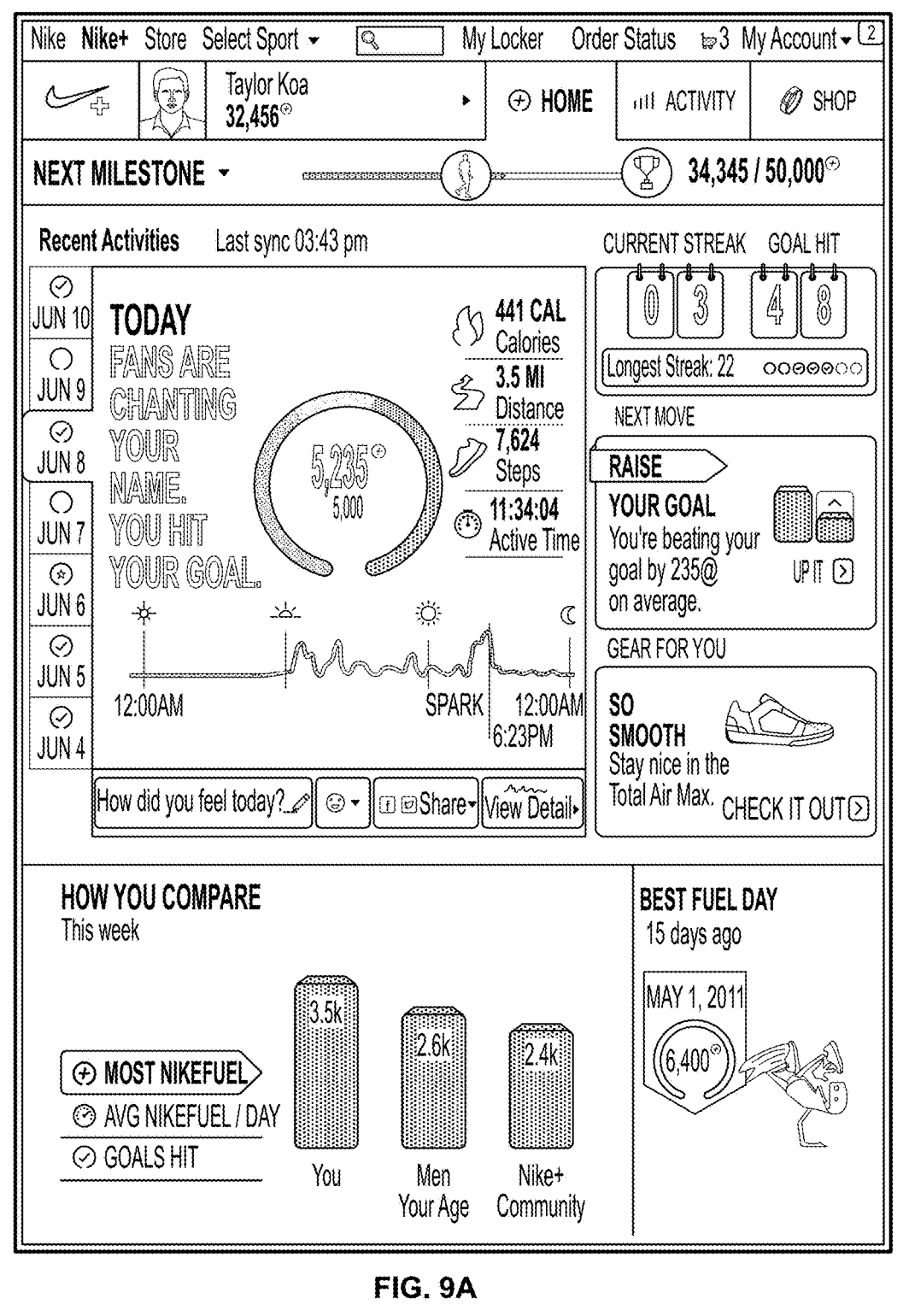
Figure 9B:
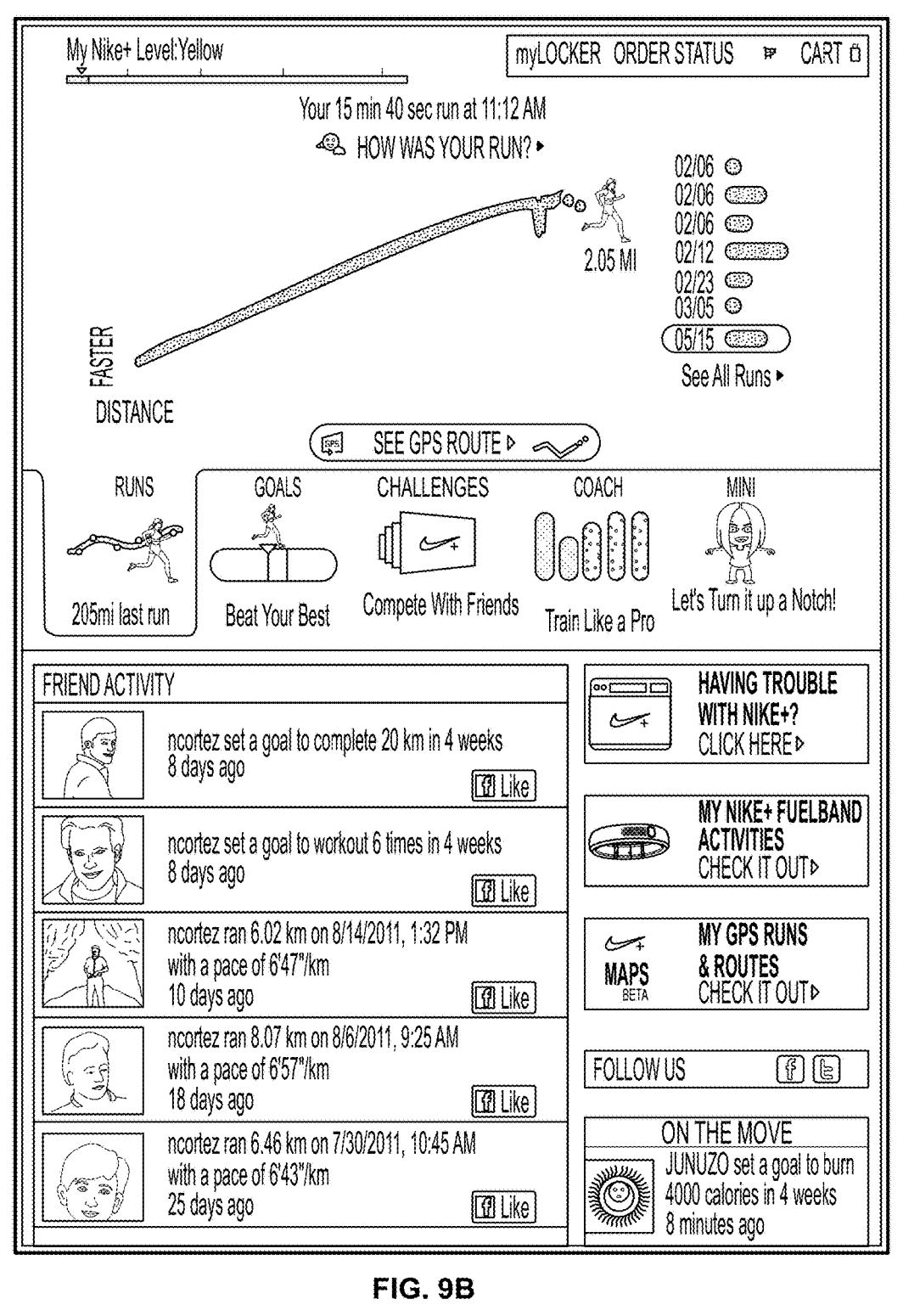

Additionally or alternatively, activity of different activity types or recorded using different device types may be visualized in different ways (e.g., colors, themes, interfaces, types of graphs, types of statistics, etc.). FIGS. 9A and 9B illustrate different interfaces that may be generated and displayed depending on the type of activity data that is to be viewed. FIG. 9A, for example, displays activity data recorded using a first type of monitoring device in a first type of visualization interface. Details of the interface are described in further detail herein. FIG. 9B illustrates a second type of visualization interface for visualizing activity data recorded using a second type of monitoring device. Types of devices may differ based on capabilities, calibration, types of sensors used, area on which the device is configured to be worn and the like. Accordingly, different visualizations and/or interfaces may be provided for different types of devices regardless of the type of activity performed (e.g., the types of activity recorded using the different types of devices may be the same or different).

In other examples, various activity metrics may be viewed in a same interface or display regardless of the device type or activity type. For example, users may be able to track progress toward a goal that may be achieved through performance of multiple types of activities and regardless of the type of device that is used to record those activities.

Figure 10A:
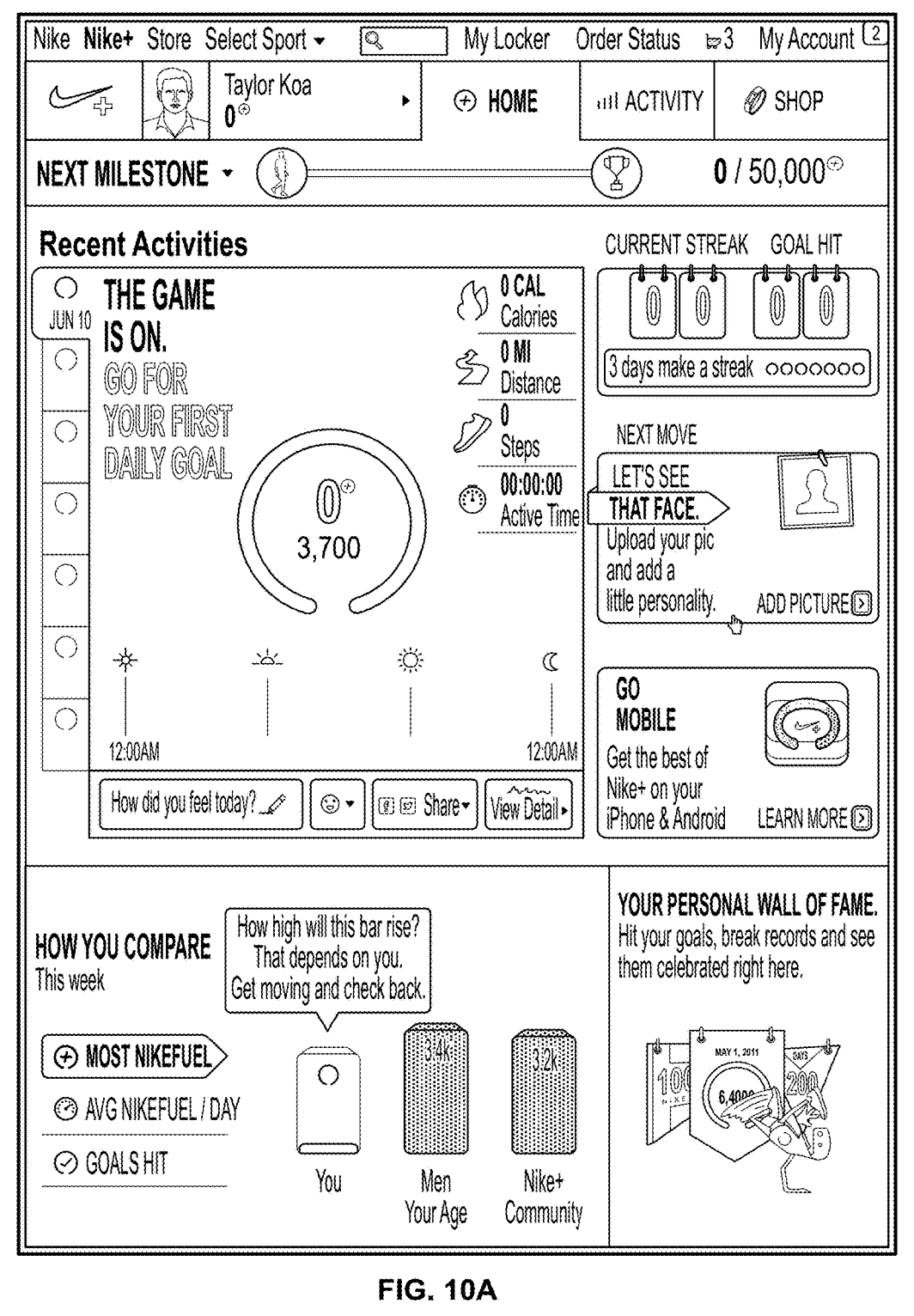
Figure 10B:
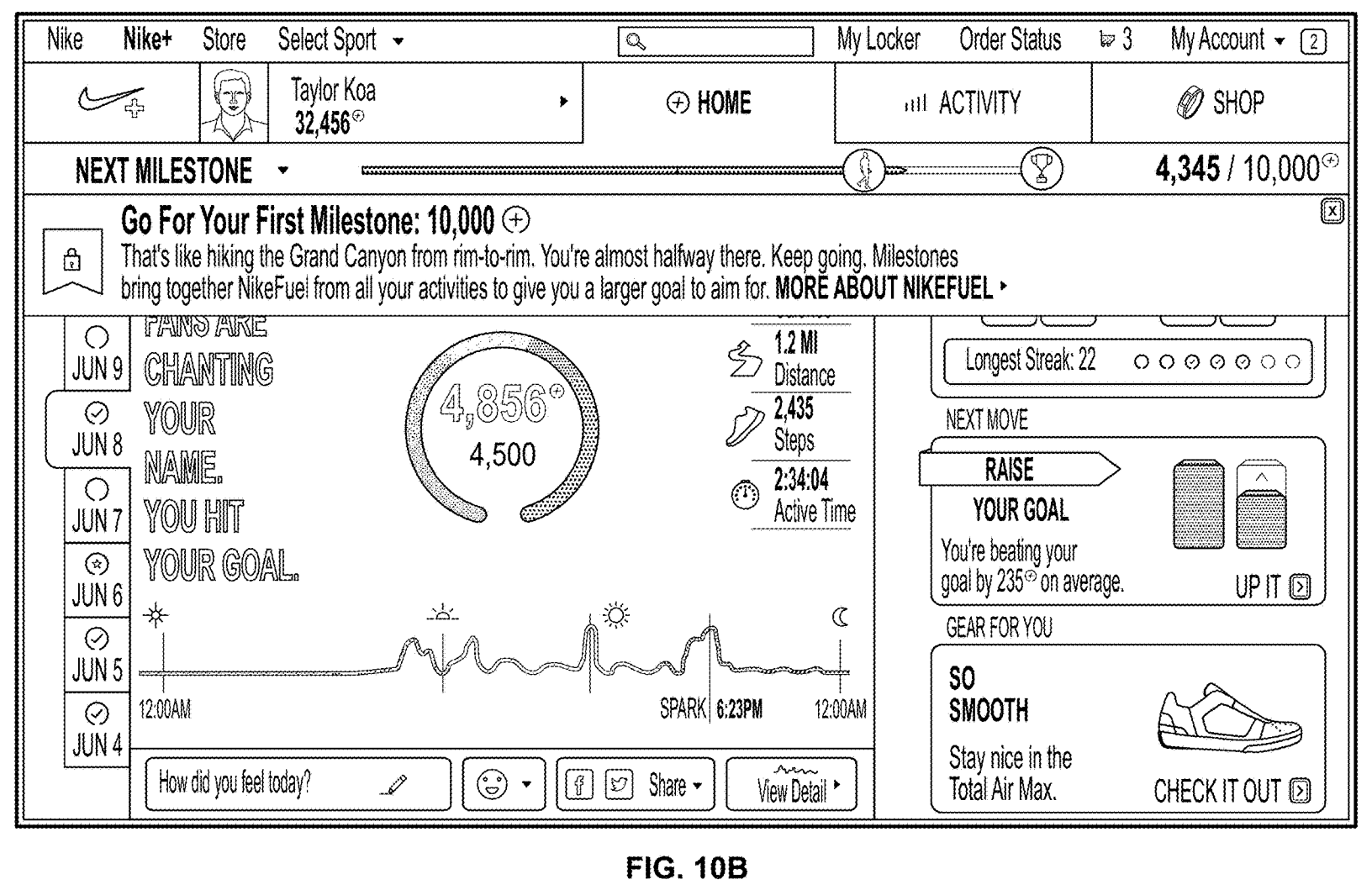
Figure 10C:
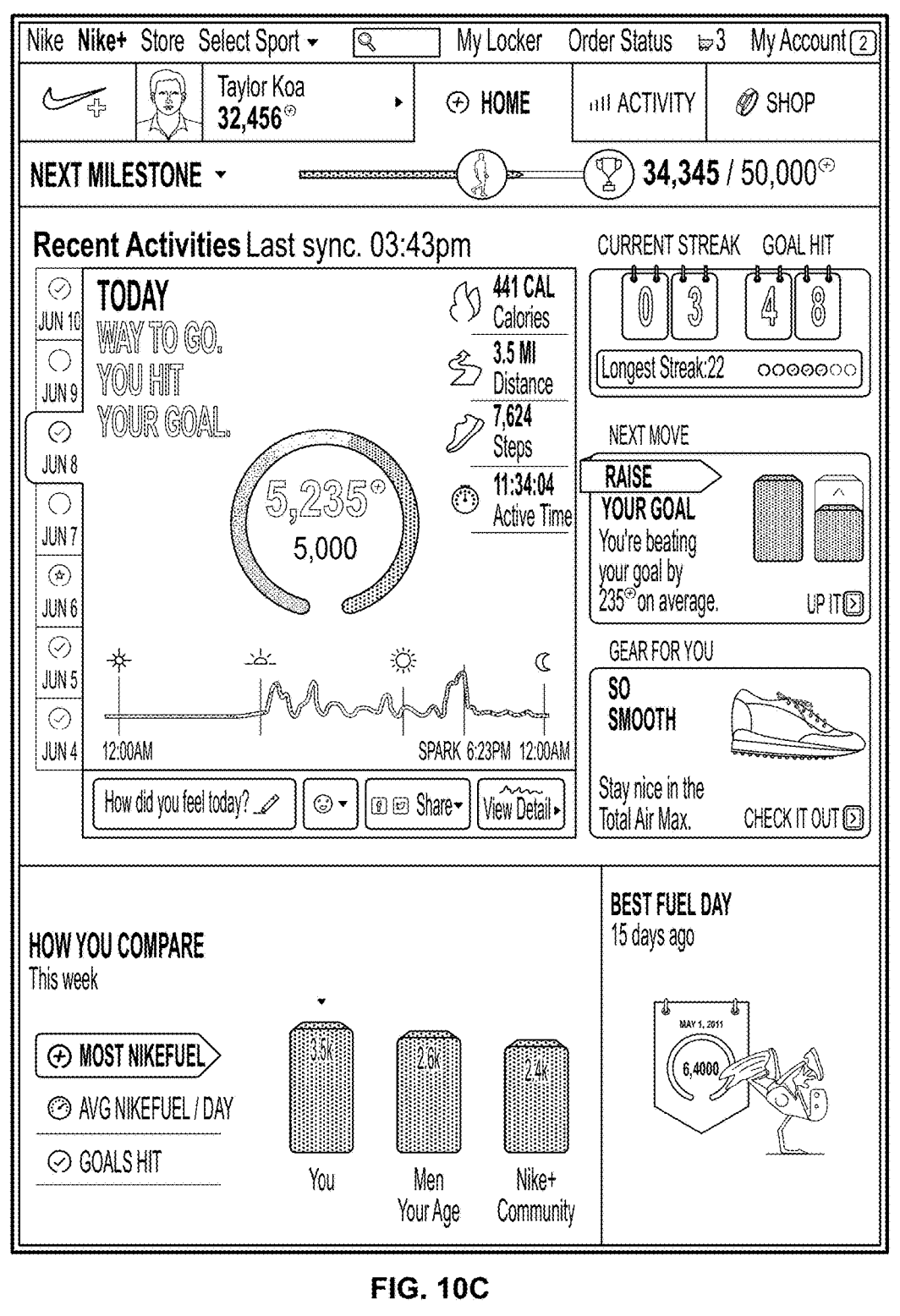
Figure 10D:
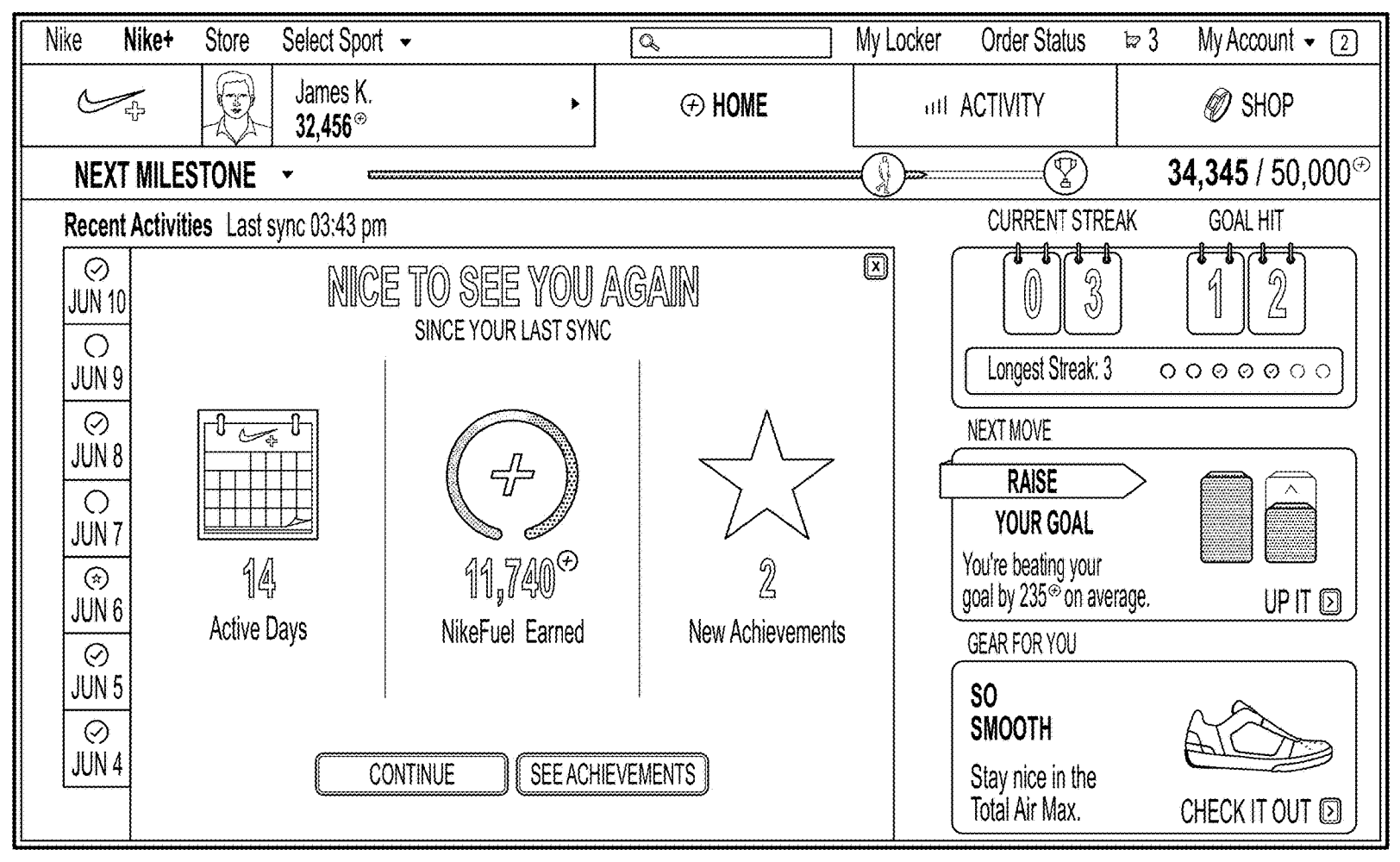
Figure 10E:
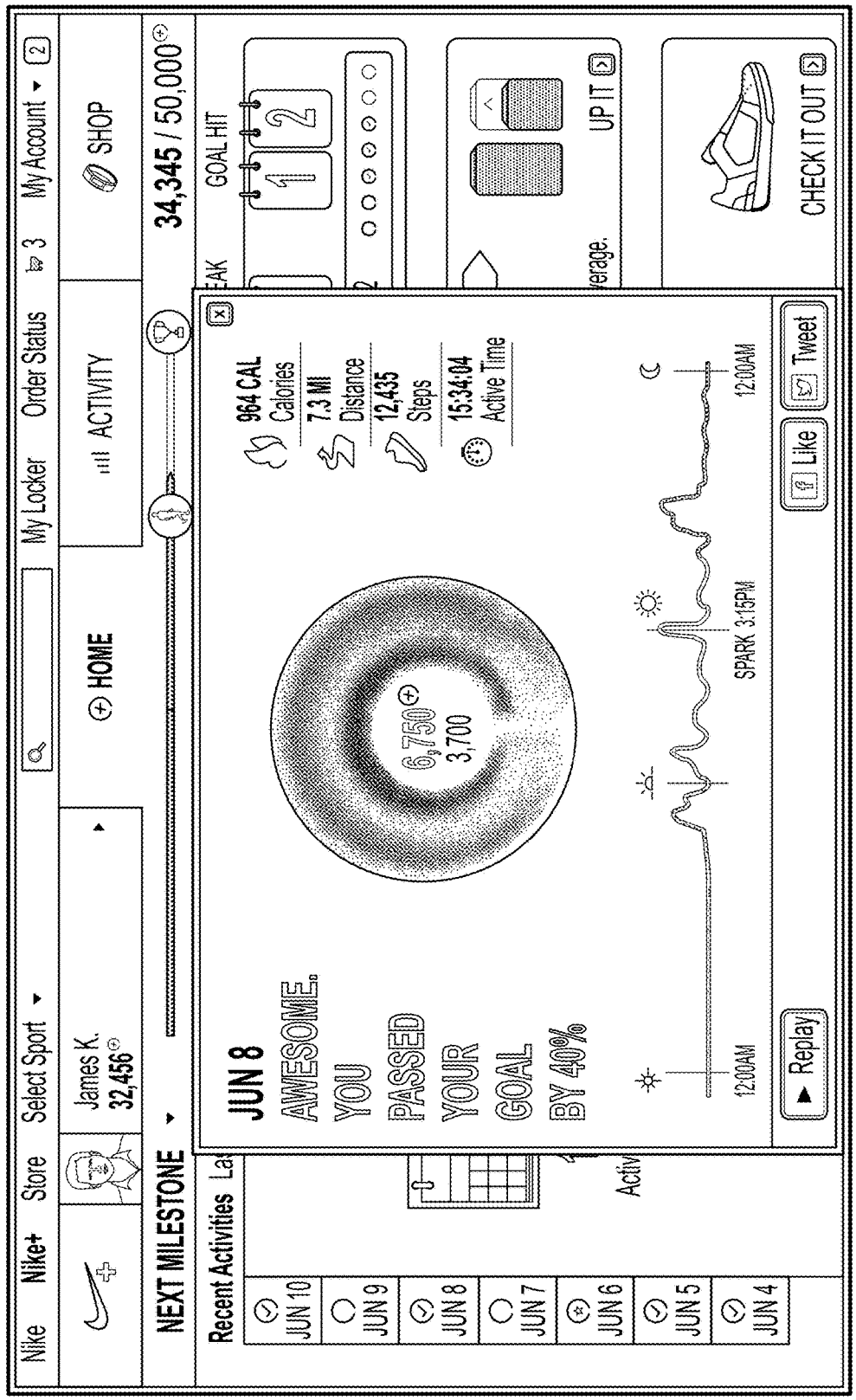

FIGS. 10A-10G illustrates example activity tracking and monitoring interfaces that may be used to track multiple types of activities and activities recorded using multiple types of monitoring devices. The interfaces may also be used to tag additional information about the various activities and activity sessions performed and to track progress toward an activity goal. FIG. 10A, for instance, illustrates an interface indicating that that user has recorded no activity and made no progress toward an activity goal. The interface of FIG. 10A may be displayed, for example, when a user first registers with the service and has not performed or synchronized any activity data with the on-line community. The interface may further display information such as an amount of progress toward a milestone. A milestone may differ from a goal defined for a specified goal period. For example, a goal period may be of a finite amount of time and goal progress may be determined based on activity performed during that finite amount of time. Goal time periods may also be recurring on a regular schedule. Milestones, on the other hand, may refer to achievements reached over a course of a user's lifetime of activity performed (e.g., reaching 50,000 activity points in the user's lifetime). Milestones may be unique. For example, each milestone might only be achieved once. Alternatively, milestones may be defined for finite time frames including a goal time period. In some examples, milestones may be defined for any time period different from a specified goal time period. In still other examples, milestones and achievements may relate to metrics other than a goal metric. Various configurations of milestones and goals may be used.

The activity tracking interface may further include a section comparing a user's performance against users of the community and/or groups of users in the community. For example, in FIG. 10A, the user's weekly activity points are compared against the entire community of users as well as a community sub-group of men of the same age as the user. The user may configure (e.g., select and/or define) the sub-groups and number of sub-groups to which his or her performance is to be compared. The user may further configure the activity time period to be compared (e.g., daily, weekly, monthly, etc.).

FIG. 10B illustrates an interface that may be displayed when a user has recorded and synchronized activity data. As shown, the interface indicates that the user has made progress toward a milestone of accumulating 10,000 activity points over the user's lifetime. The interface may also include an option to view subsequent milestones. Milestones may be consecutive or progressive in nature such that a user must complete a first milestone before reaching a second milestone.

FIG. 10C illustrates another interface displaying a user's progress made toward a goal as well as a milestone. Other activity summary information may also be provided including whether a streak has been achieved and a length of the streak, a number of goals reached, and various metrics for a selected goal time period. In one example, a section of the interface may display detailed metrics and activity information for a selected goal time period. Different goal time periods may be displayed as selectable section labels along a side of the display section. In addition to identifying the goal time periods (e.g., days, hours, weeks, etc.), the section labels may also display a progress made toward the goal for those time periods. For example, the section labels may indicate whether the user completed the goal by that day, whether a moderate amount of progress was made toward the goal (but not completed) or if a low level of progress was made toward the goal. Other indicators may also be included as part of the goal time period section labels. For example, if a user reached a milestone during that goal time period, another symbol or indicator may be displayed. In another example, if a user exceeded his or her goal by a specified amount, yet another symbol or indicator may be used as indication. Different colors, indicators, patterns, symbols, characters, transparencies and the like may be used to differentiate between goal progresses, other achievements, events and the like.

The activity detail display for a goal period may include a goal meter that indicates whether the user met his or her goal and if not, an amount of progress made towards the goal. In addition, a graph may be displayed to illustrate a breakdown of activity level over the goal time period. Various peaks in activity may also be identified in the graph with an indicator such as "SPARK." Peaks may be defined by an activity level exceeding a threshold amount of activity, the top number of activity levels in the goal time period, and the like. For example, the top 1, 2, 3, 4, 5, 10 peaks may be indicated in the graph. Various metrics may also be displayed in a portion of the detail display such as calories burned, distance traversed, steps taken and/or time active. Another portion of the display may display a current streak (e.g., a current number of consecutive goal time periods in which the goal has been reached) and a number of goals hit in the user's lifetime (or a specified time period). This portion of the display may display a streak tracker that provides an indication of a number of consecutive goal time periods including a current goal time period and a goal progression status for each of those time periods. The interface may also identify the longest streak the user has achieved. In yet another portion of the interface, the display may provide a recommendation for raising or lowering the goal. For example, if a user has exceeded previous goals by a specified amount (e.g., an average amount by which the user exceeded one or more previous goals, an accumulated amount by which the user exceeded the one or more previous goals, a greater, median or lowest amount by which the user exceeded one or more previous goals, etc.), the system may recommend that the user increase a next goal (e.g., by that specified amount or an even greater amount).

FIG. 10D illustrates an example general summary interface that is not specific to any particular goal time period. The general summary interface may provide information regarding a recent predefined time period such as a most recent week, month, year, a time period since a last synchronization with a monitoring device or a particular monitoring device and the like. The general summary interface may indicate a number of achievements reached, an amount of activity points earned since the last synchronization and/or a number of active days (e.g., a number of days in which a threshold level of activity was reached).

FIG. 10E illustrates an achievement celebration, where the achievement corresponds to exceeding a goal by 40%.

Figure 10F:
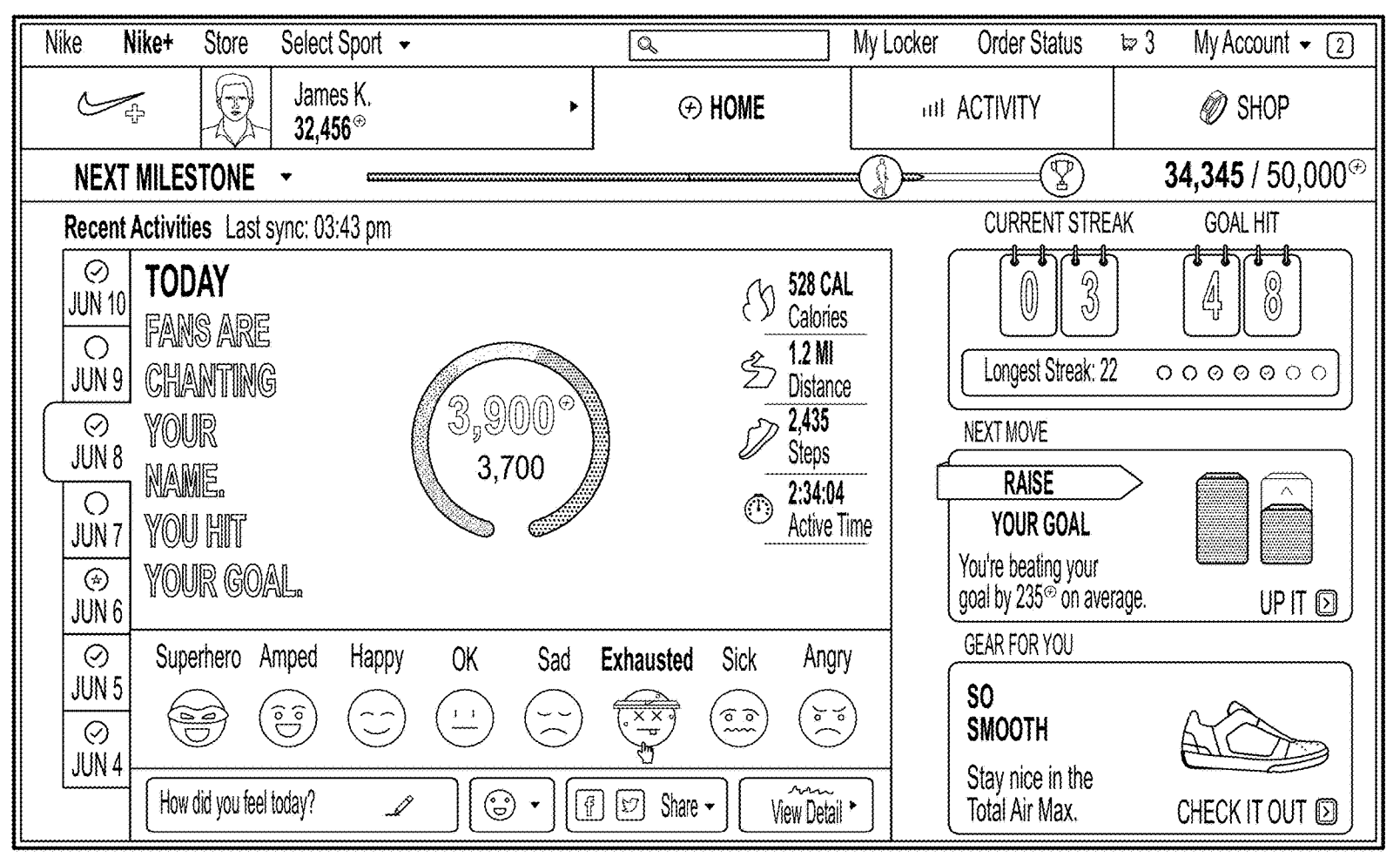

FIG. 10F illustrates an interface through which a user may specify a subjective feeling they had toward or during the activity time period or activity session. The user may select/specify an emoticon and/or provide user-specified comments or notes regarding that time period. This information may then be stored in association with the goal time period, activity session, and/or the user's account. In other examples, activity sessions and activity points may be tagged or otherwise labeled with location information and/or time information. Geographic may be tagged using one or more location determination systems such as GPS, cellular triangulation, Wi-Fi location determination based on ISP and the like. Location determination systems may be internal to or integrated with the device or may be separate from the device (e.g., a mobile communication device such as a smart phone having GPS functionality). Time may be determined based on the time of the device or times of other devices, servers and systems. Accordingly, activity points and activity data in general may be filtered and viewed in a granular fashion based on geographic location and/or time. This tagged or additional information relating to particular activity points or activity sessions may be stored as metadata in one or more examples.

Figure 10G:
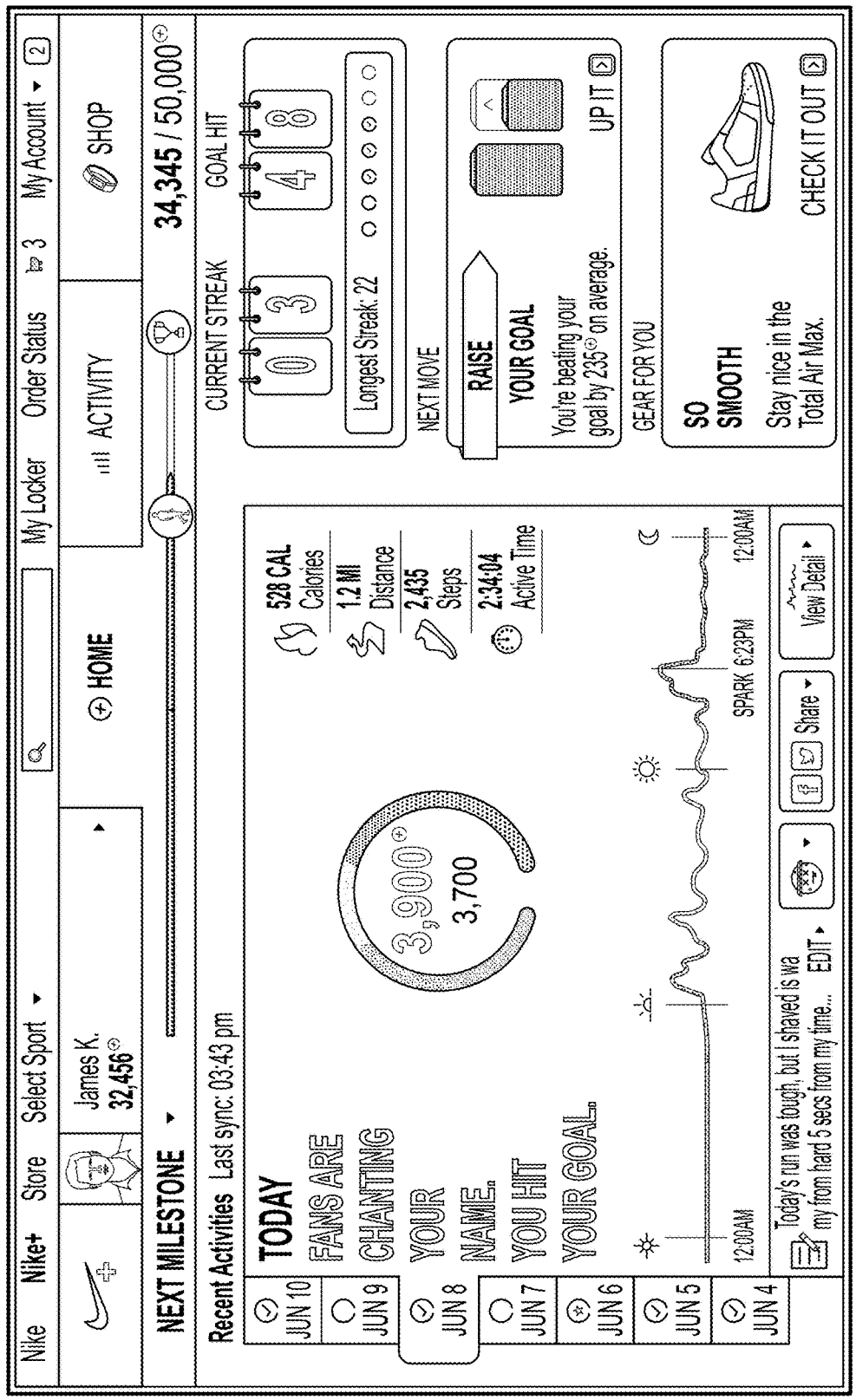

FIG. 10G illustrates an interface that may be displayed after a user has entered a user's subjective feeling and notes about the activity time period.

Figure 11A:
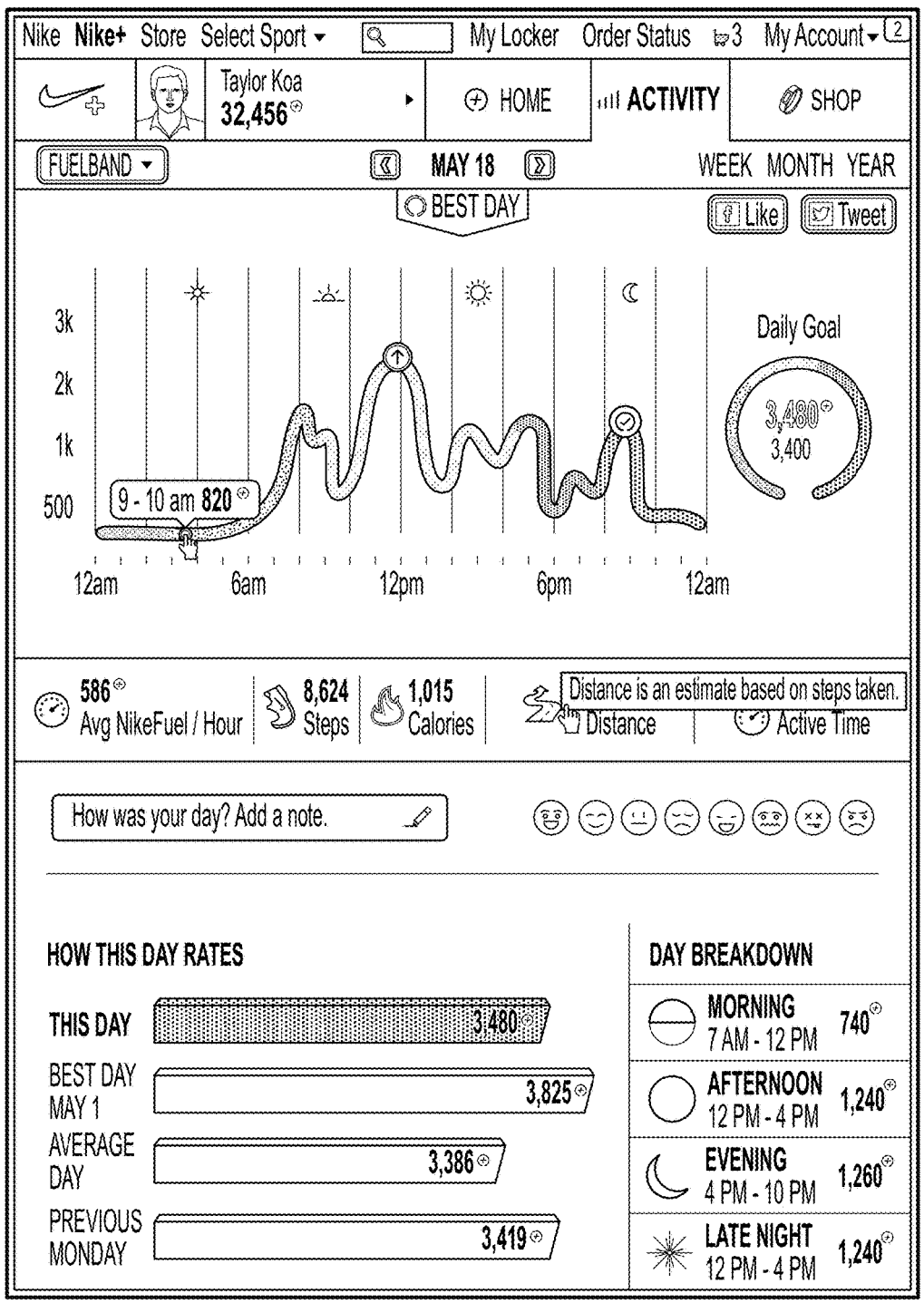
FIGS. 11A-11D illustrate example interfaces providing information for activity performed for a period of time.
Figure 11B:
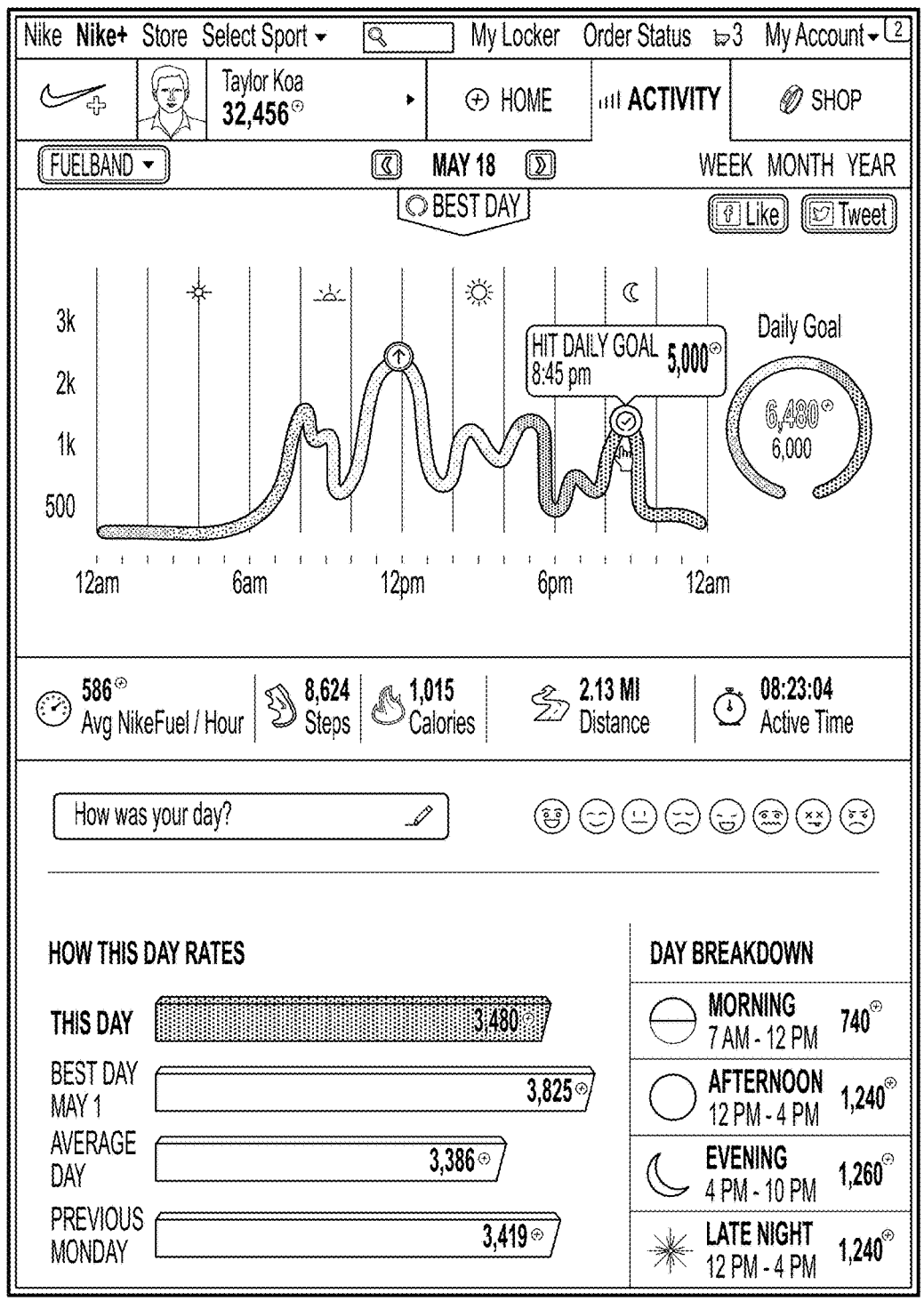

FIGS. 11A and 11B illustrate example interfaces providing a detailed graph of activity performed for a period of time such as a goal time period. A user may hover over or otherwise interact with portions (e.g., any portion or specific portions) of the graph to obtain activity metrics and information specific to the particular point in time or of the graph. Indicators may be provided on the graph to indicate various events such as a point at which the user hit the goal and a peak activity level. For example, FIG. 11D illustrates an indicator identifying a time period such as an hour in which the user was most active. If the goal time period displayed corresponds to a best day, a banner or other indicator may also be displayed in the detailed interface. A best day or best activity time period may be defined as a day or other time period during which a highest amount of activity points was earned, a metric reached an all-time high (e.g., a pace, distance, etc.), a user was active for a greatest amount of time (e.g., most active hours) and the like. A portion of the interfaces may also display a comparison of the current time period against other time periods.

Figure 11C:
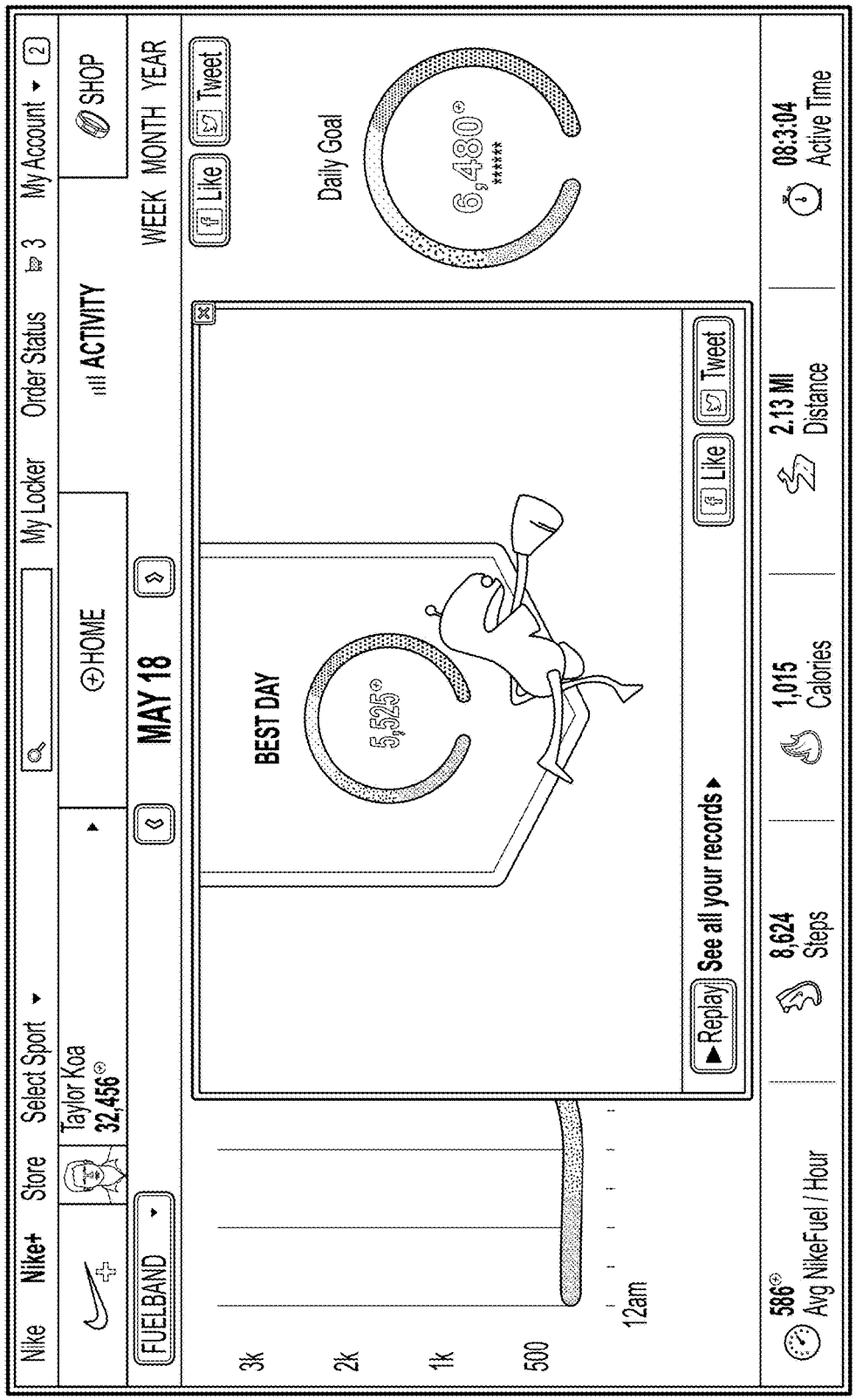
Figure 11D:
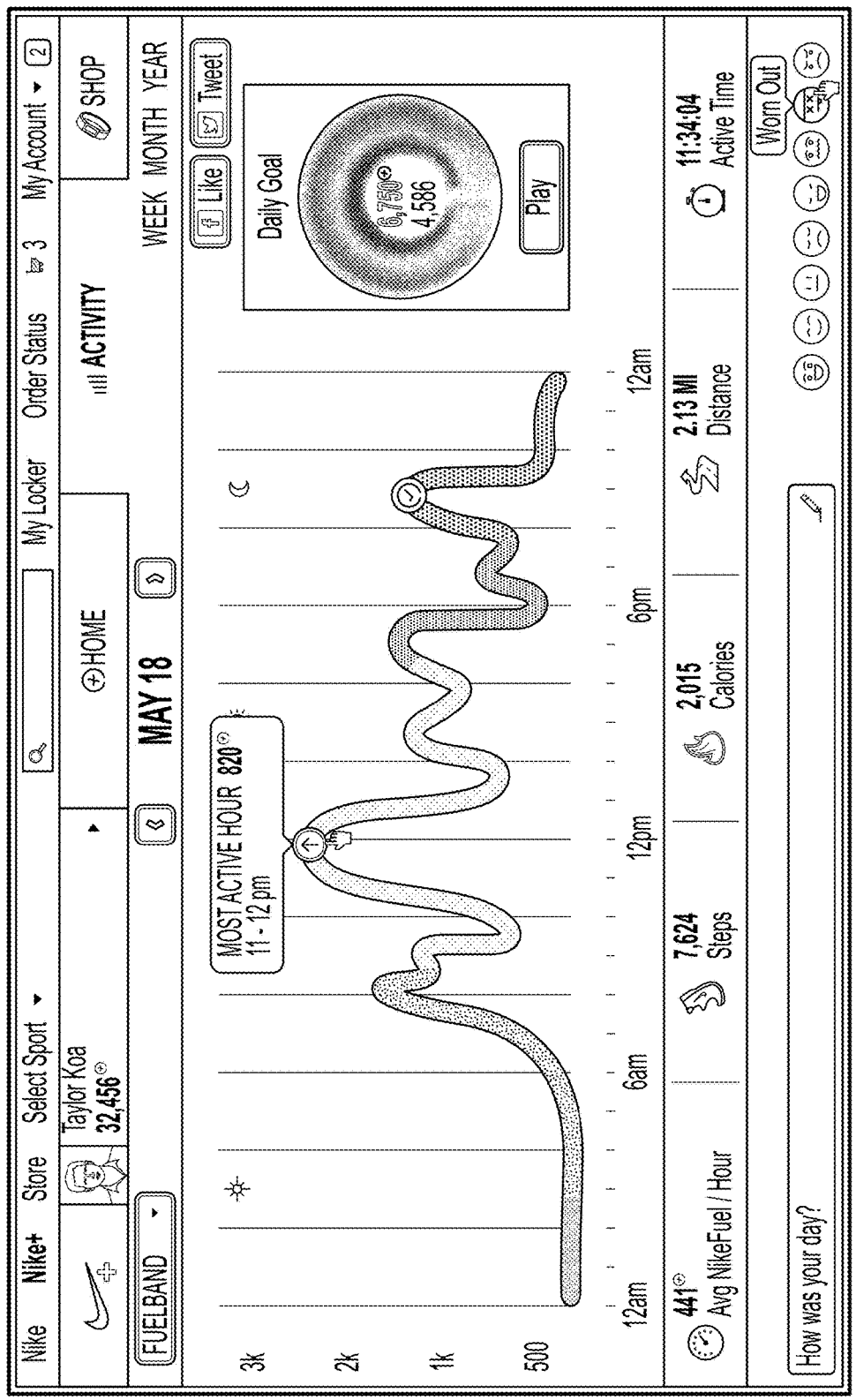

FIG. 11C illustrates a best day indication interface.

Figure 12:
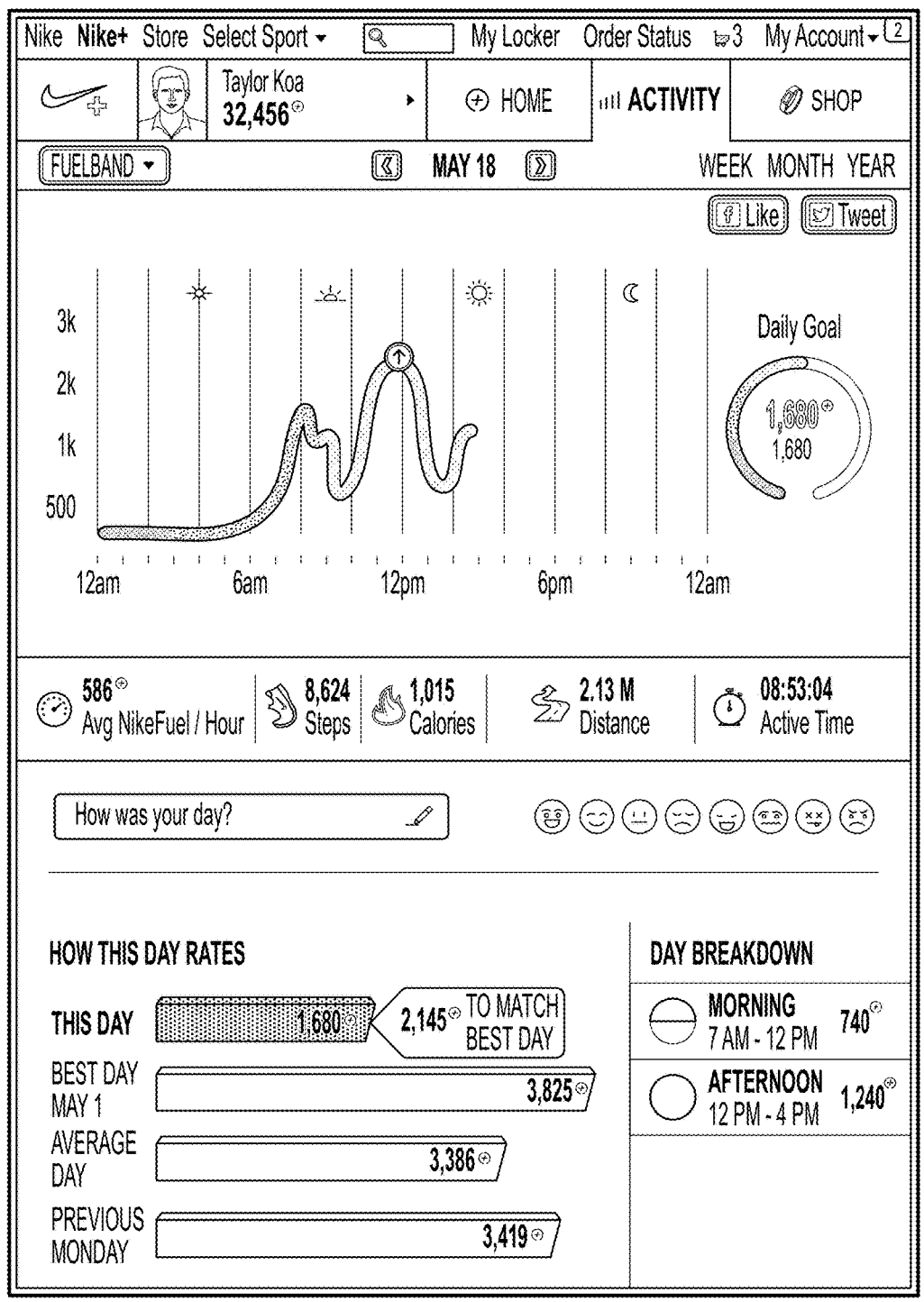
FIG. 12 illustrates an interface in which a user's activity over a time period may be replayed

FIG. 12 illustrates an interface in which a user's activity over a time period may be replayed. For example, the graph may be animated such that the user's activity is graphed in animation fashion over the goal time period.

In some examples, the interfaces may display activity levels along with a breakdown of types of activities and types of monitoring devices that contributed to the accumulated activity. For example, hovering over or otherwise interacting with a graph of activity points may display a list of activity types, activity sessions, device types and the like that are associated with the activity points accumulated. The list of activity types, activity sessions and/or device types may further include an indication of an amount of activity points accumulated for each of those various parameters. The user may also filter data displayed in an activity point graph by the above noted parameters. For example, the graph may be filtered such that only activity points accumulated from a particular type of activity is displayed. In another example, the graph may be filtered such that only activity points accumulated using a particular type of monitoring device is displayed in the graph. In yet another example, the graph may be filtered such that only activity points accumulated during a particular activity session are shown. In still other examples, activity data and activity points may be associated with specific monitoring devices. Thus, a user may be able to differentiate between activities performed and activity points accumulated based on the device that was specifically used. Additionally or alternatively, the activity points corresponding to the different types of activities, different types of monitoring devices and/or different activity sessions may be displayed with different appearances in the graph. For example, accumulated activity points for a first type of activity may be displayed in red while activity points accumulated for a second type of activity may be displayed in yellow and so on. Various other visual configurations may be employed and may be user specified.

FIGS. 13A-13F illustrate example summary interfaces displaying a user's activity levels over a week, month and year, respectively. Each of the interfaces in FIGS. 13A-13F may display the user's activity level of those time periods with a further breakdown based on a smaller time frame. For example, a weekly summary may include daily bar graphs while a monthly summary may include weekly bar graphs. Interacting with (e.g., hovering over) one or more of the entries may display more specific activity information and details including metrics, types of devices used, activity sessions, types of activities performed and the like and/or combinations thereof. The interfaces may also display a goal completion rate for that summary time period. For example, in the weekly summary of FIG. 13A, the interface may display a number of daily goals hit and/or a percentage of goals reached.

Figure 13A:
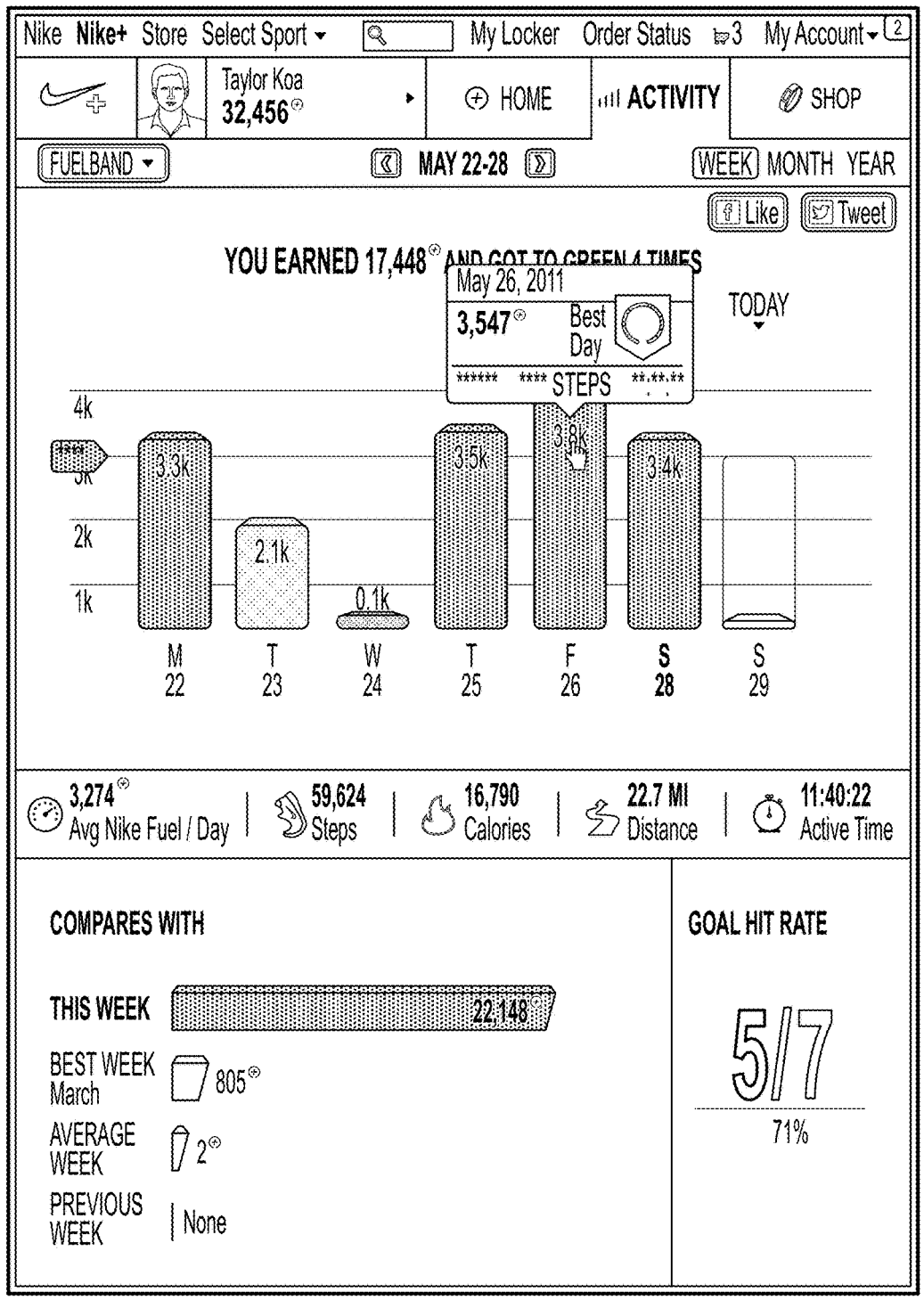
FIGS. 13A-13F illustrate example summary interfaces displaying a user's activity levels over a week, month and year, respectively.
Figure 13B:
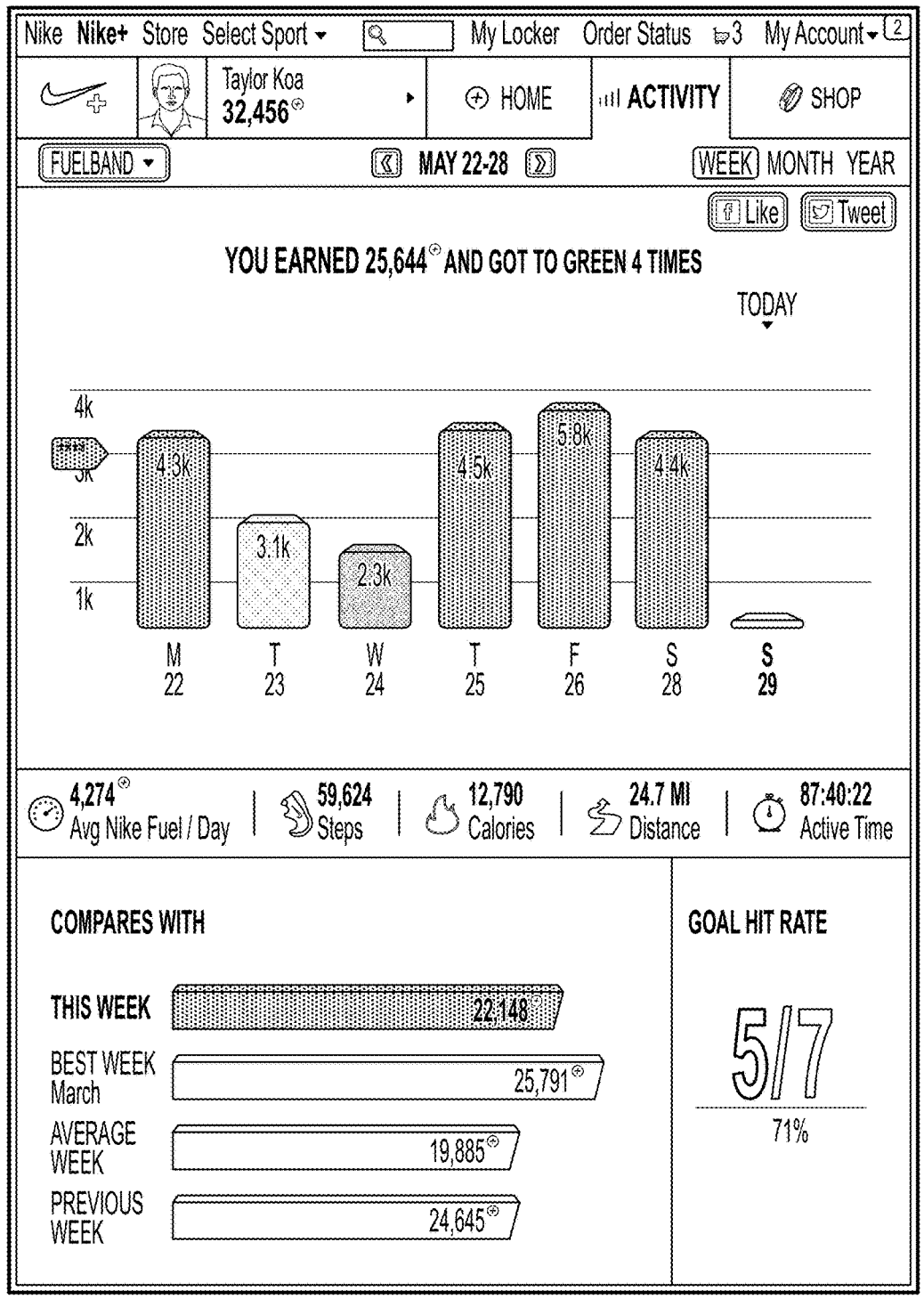
Figure 13C:
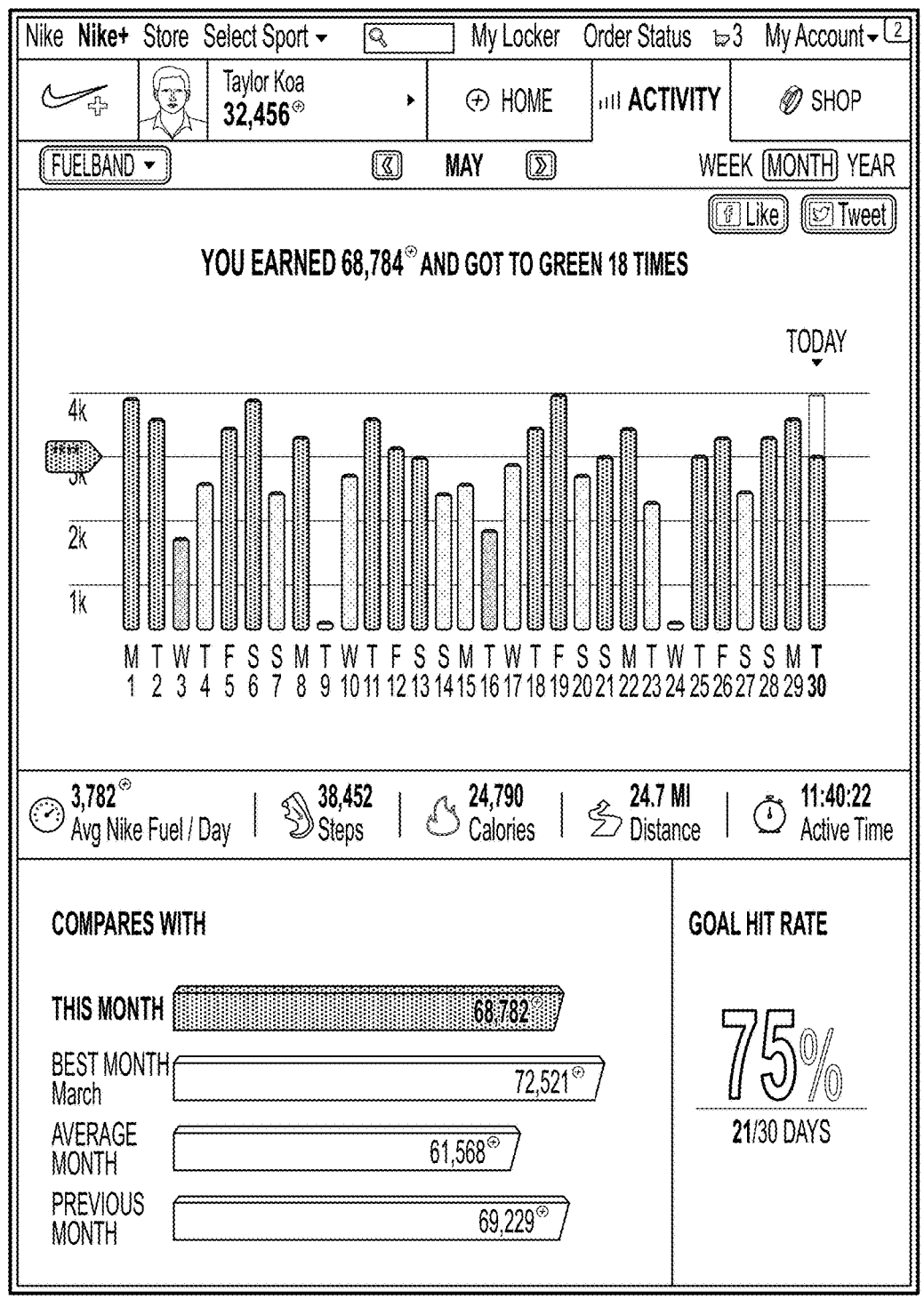
Figure 13D:
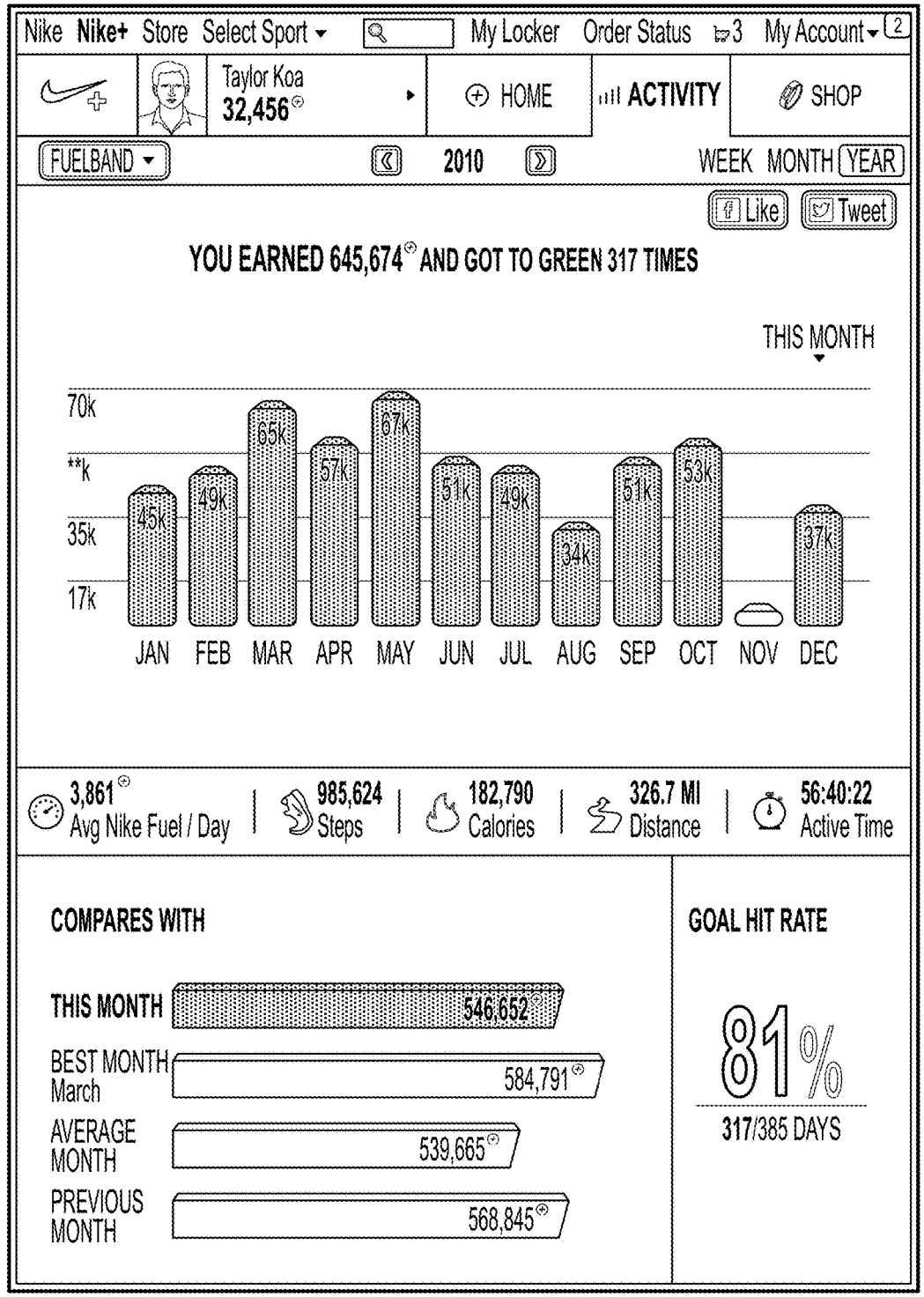
Figure 13E:
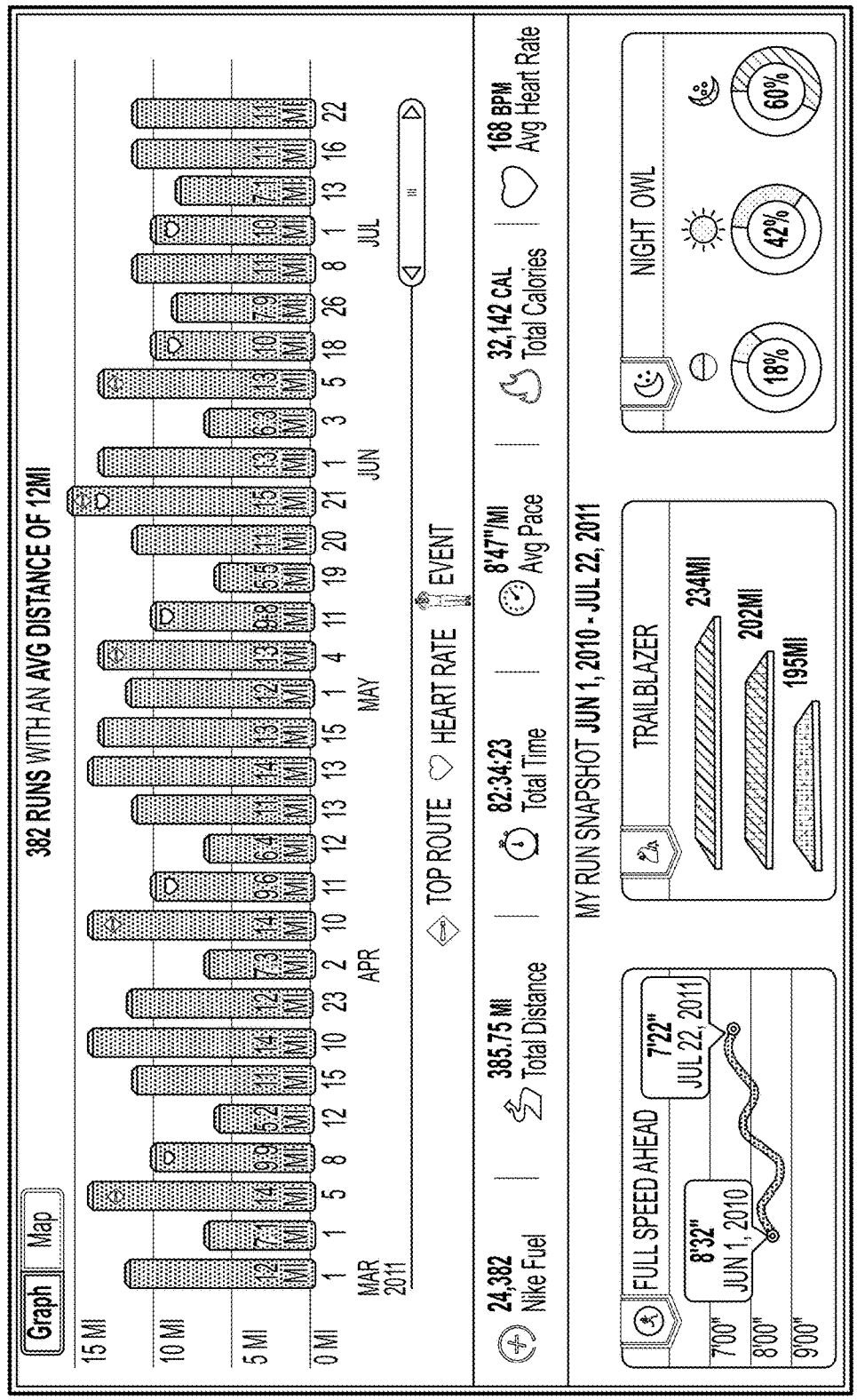

In FIG. 13E, the summary interface may provide a user with a daily graph of his or her performance along with snapshot information for a given time frame (e.g., the last year, the last six months, the last month, the last week, the last two days, a specified time period and the like). The snapshot may provide additional information such as an amount of activity performed on various types of terrains. A title for the terrain snapshot (e.g., "TRAILBLAZER") may change depending on the terrain on which the user has performed the most activity. For example, if the user ran the most on road surfaces, the title of the terrain snapshot may be "ROAD WARRIOR". The amount of activity (e.g., run distance) performed on each of the types of surfaces or environments may be defined by an activity metric such as distance or time or by a percentage for the snapshot period. The user's activity may also be conveyed through a time of day snapshot. Accordingly, a user may evaluate an amount of activity performed during different periods of the day such as morning, afternoon and evening. As with the terrain snapshot, the title of the time of day snapshot may also differ depending on the period of the day during which the user performed the most activity (e.g., for the snapshot time frame). Other types of snapshots may also be provided. For example, snapshots may be generated for other types of activity metrics, type of activity, type of device used to measure the activity, location, altitude, temperature, joint or solo performance and the like.

Figure 13F:
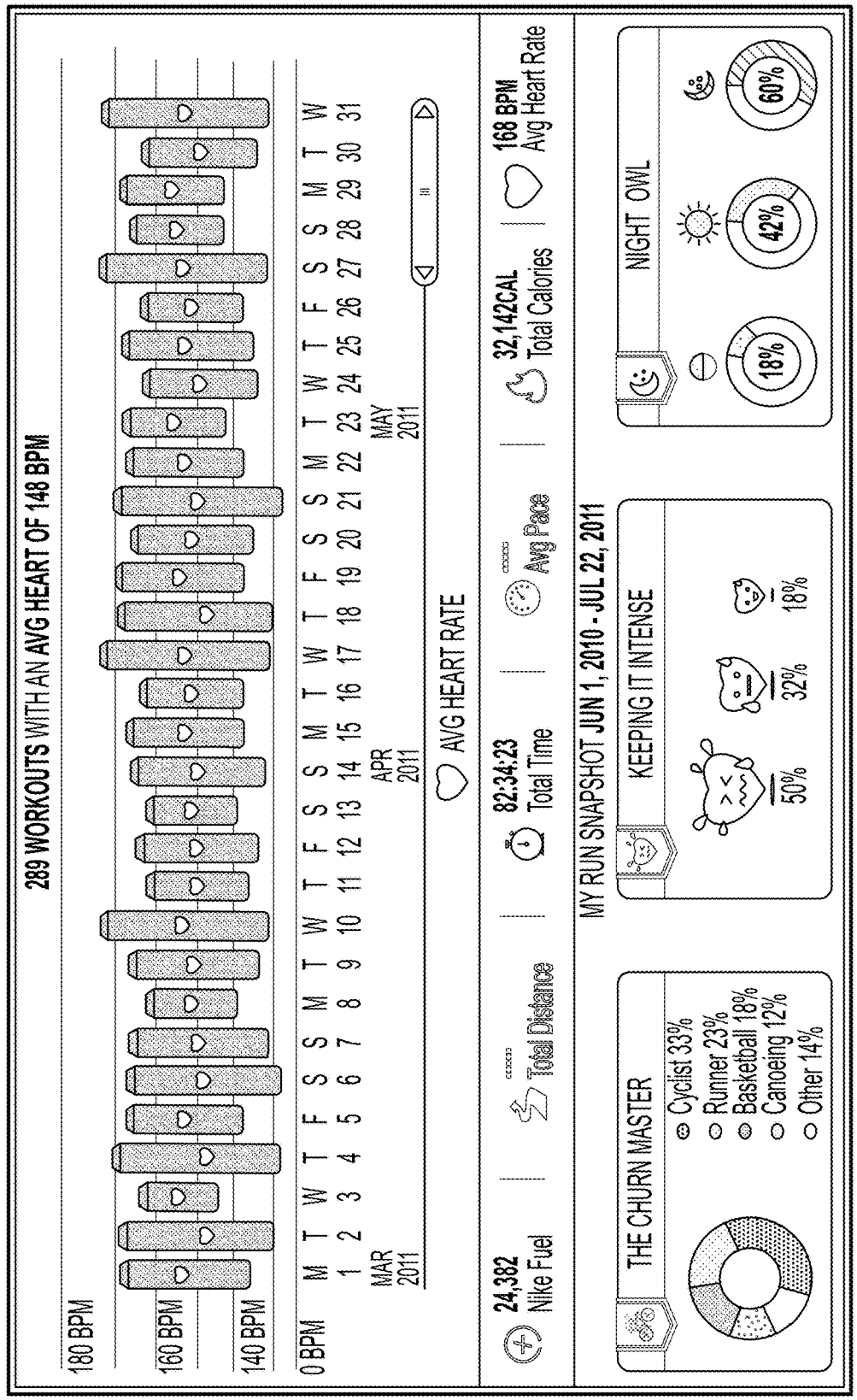

FIG. 13F illustrates an example heart rate summary interface in which activity snapshots are provided for type of activity and heart rate or intensity. The heart rate or intensity snapshot may be categorized based on automatic sorting based on predetermined thresholds or based on user designation of how they felt (e.g., a subjective feeling) about an intensity of the workout or activity. In some instances, the heart rate or intensity snapshot may be generated based on a combination of both measured heart rate as well as a user-specified intensity level. In one example, two categories of heart rates may be defined along with three different user-specified intensity levels for each activity or workout. Accordingly, a heart rate/intensity snapshot may categorize activity into six different regions (three different intensity levels for each of the two heart rate categories). Any number of heart rate categories/levels and intensity levels may be defined as needed or desired.

Figure 14A:
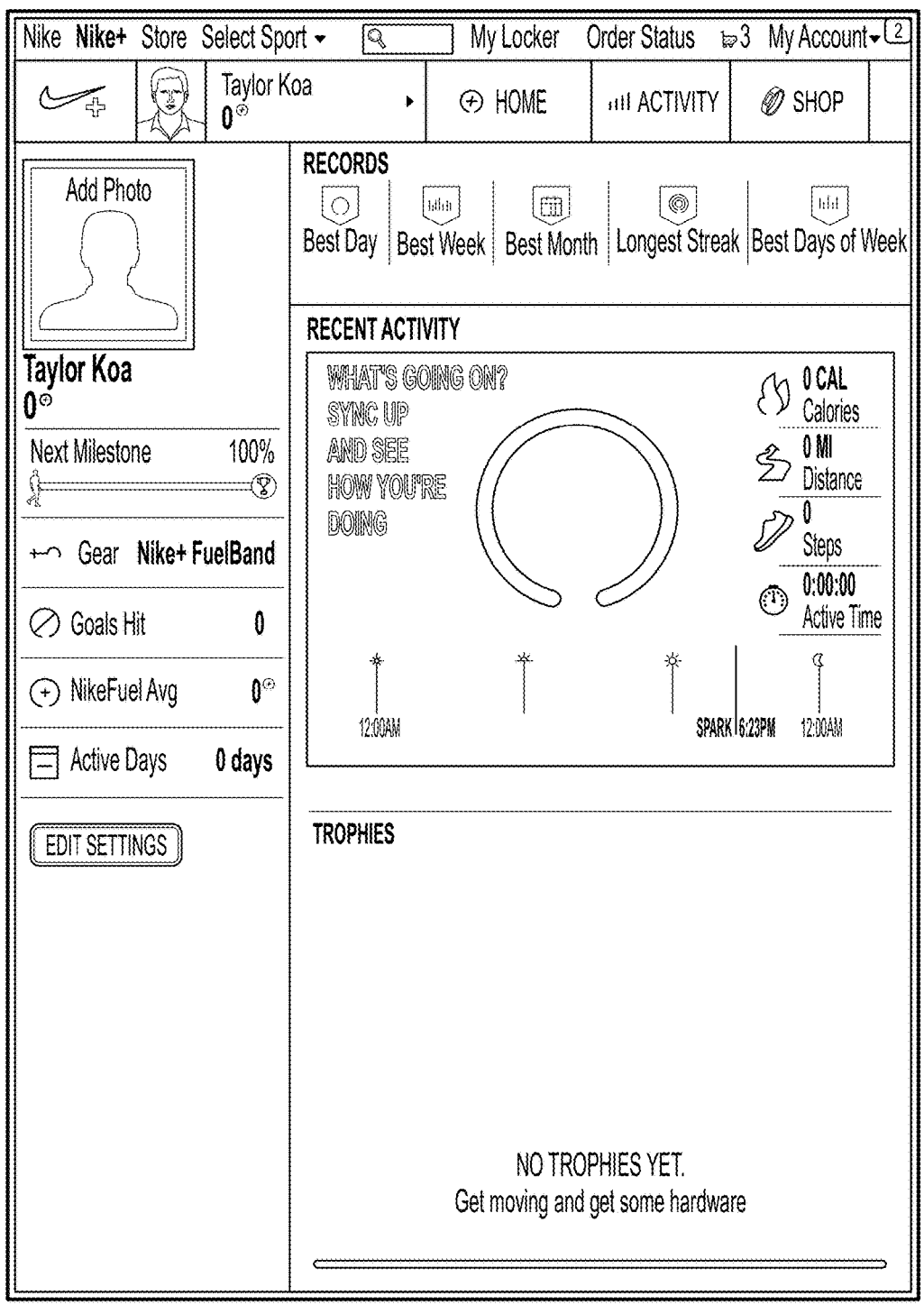
FIGS. 14A-14D illustrate example profile pages for a user.
Figure 14B:
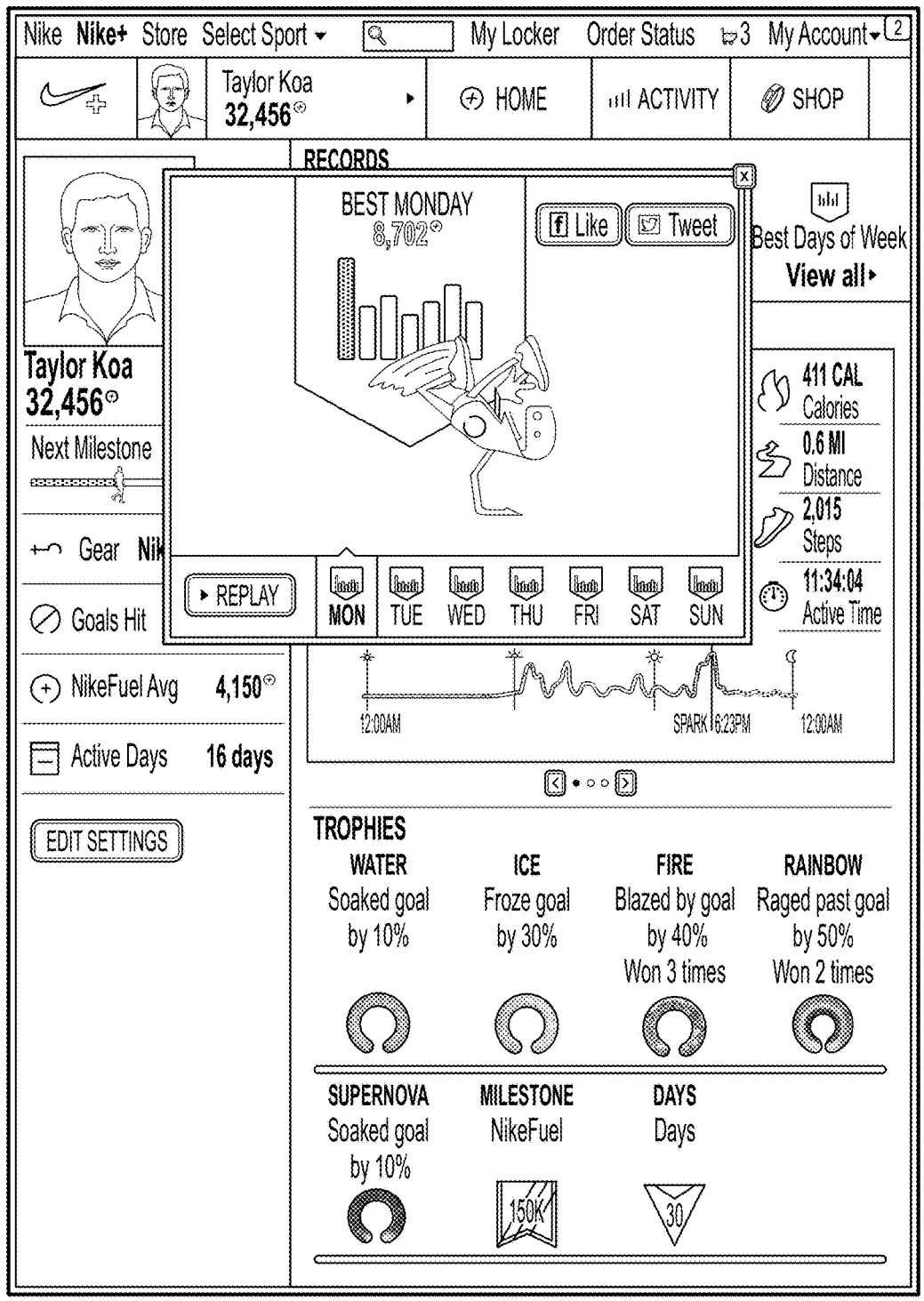
Figure 14C:
Figure 14D:
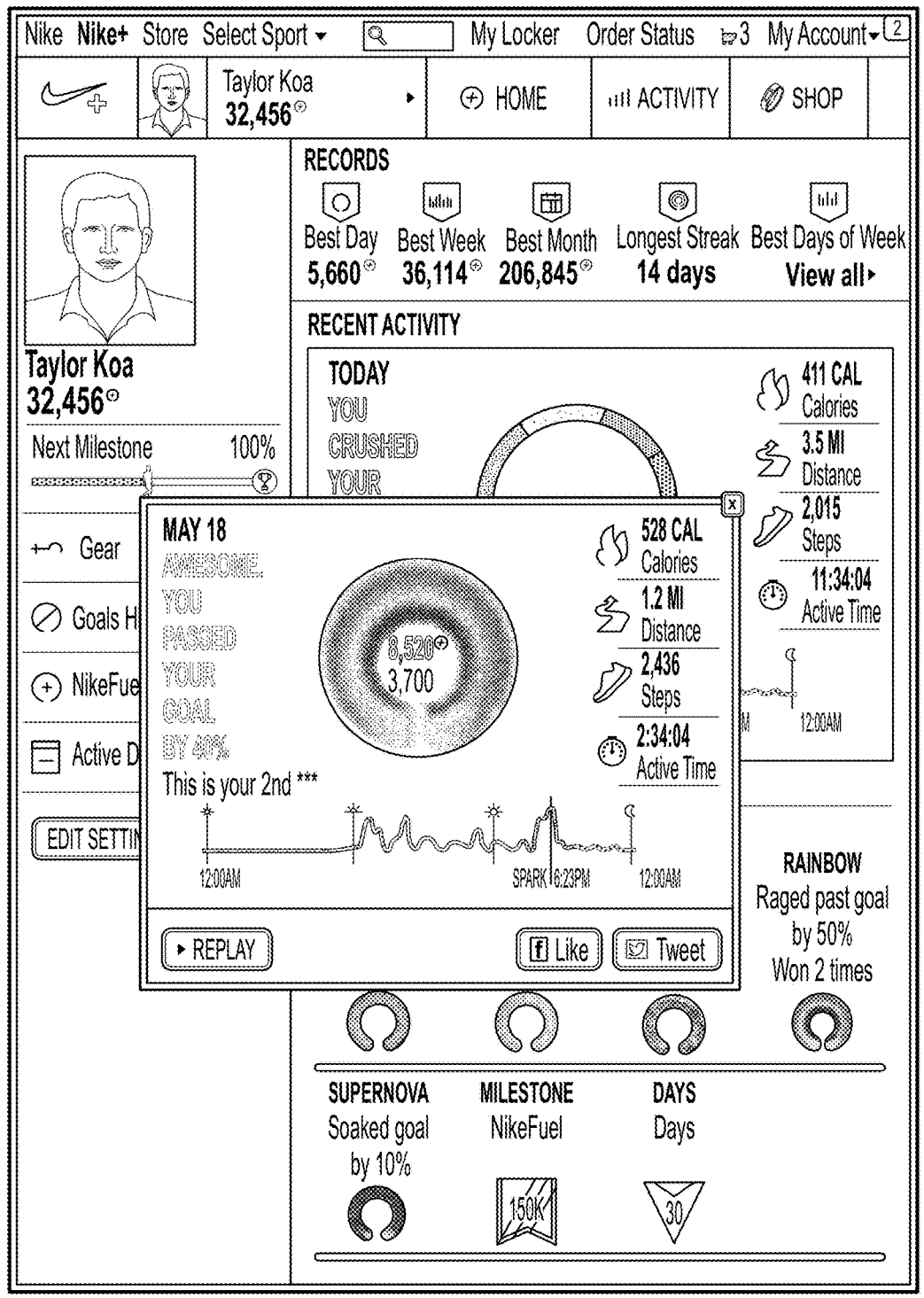

FIGS. 14A-14D illustrate example profile pages for a user. The user's profile page may include a listing of records, recent activity, achievements, milestones, awards and the like. Additionally, the user's profile may provide summary information for the user including a device most used or device type most used, a type of activity most frequently performed, activity point averages, other average metrics, personal information (e.g., name, age, location, birthdate, etc.) and the like. FIG. 14A illustrates a profile interface that may be displayed when the user has not registered or synchronized any activity data. In some arrangements, the user's profile page may also display devices and/or types of devices the user uses for recording activity.

Figure 15:
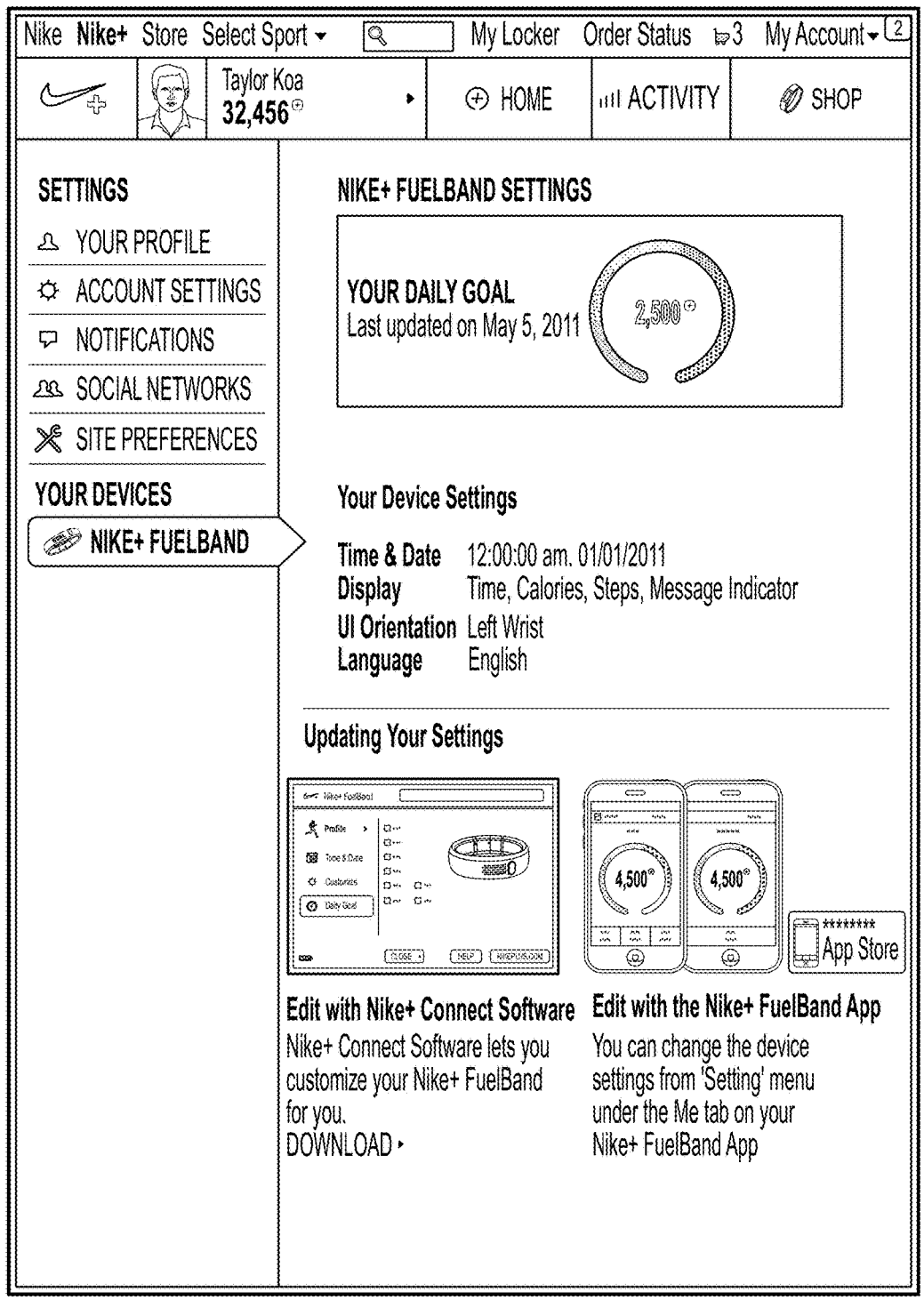
FIG. 15 illustrates an example device setting interface.

FIG. 15 illustrates an example device setting interface. Each device registered for the user may have a different device setting interface on the on-line site. The device setting interface may display information about settings registered in the device such as a current time and date recognized by the device, types of data (e.g., metrics) to be displayed on the device, an orientation of the device (e.g., a wrist or other location on which the device is worn) and a language setting. In some examples, the interface may allow the user to edit or update settings on the device. The interfaces for the different devices may include different setting parameters and information. For example, an interface for a first device may include GPS settings while an interface for a second device might not include GPS settings if the second device does not include a GPS sensor. The device-specific interfaces may also include activity data and summaries (as described herein) for activities detected using the corresponding device. Accordingly, these sub-interfaces may allow a user to display activity of the user at a more granular level. In some arrangements, an on-line site or community may further identify a type of device or a specific device most frequently used by the user to record activity data or a device or type of device with which a user has recorded a most amount of activity.

Figure 16A:
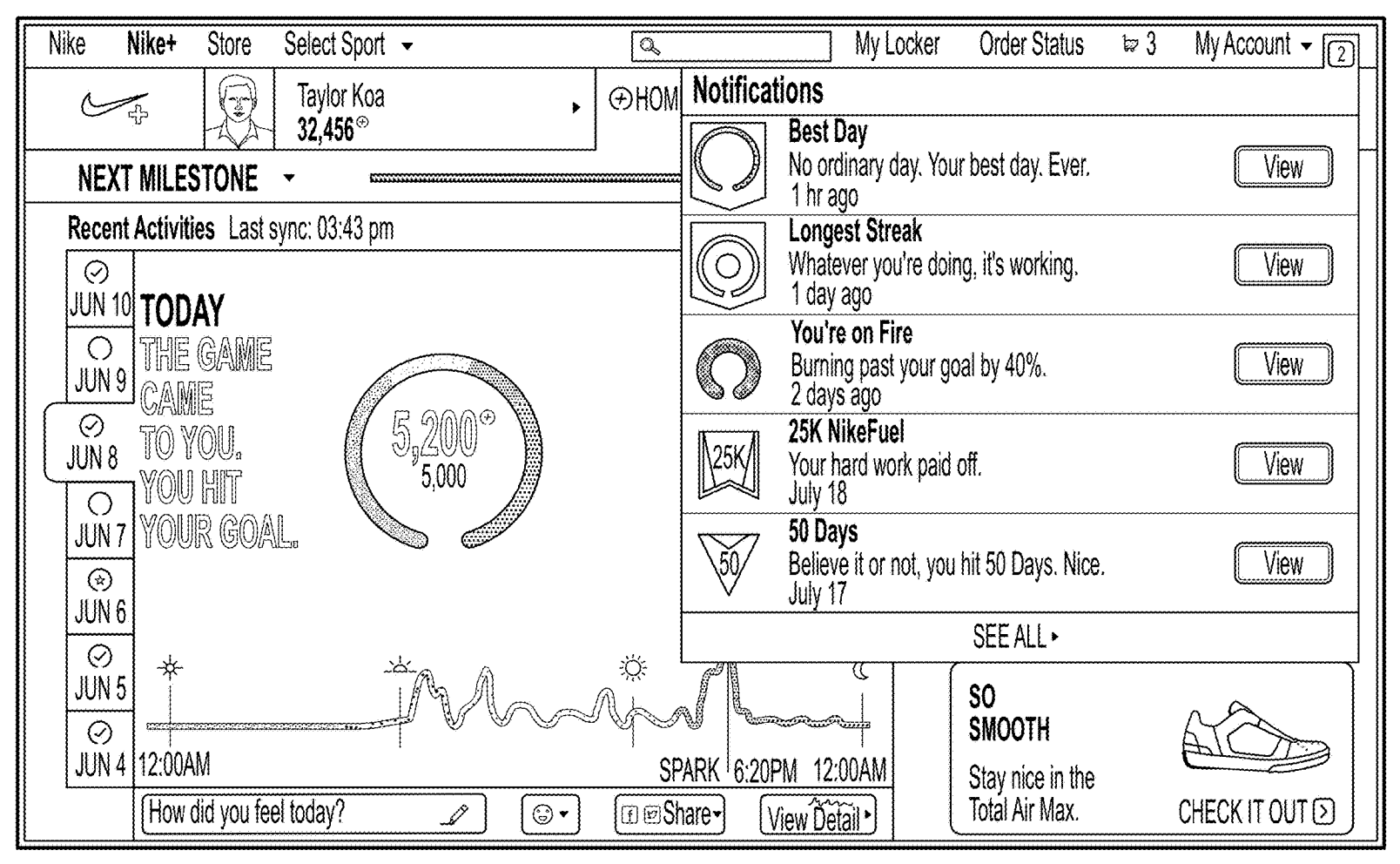
Figure 16B:

FIGS. 16A and 16B illustrate example notifications that may be displayed to a user through an on-line activity tracking site.

Figure 17A:
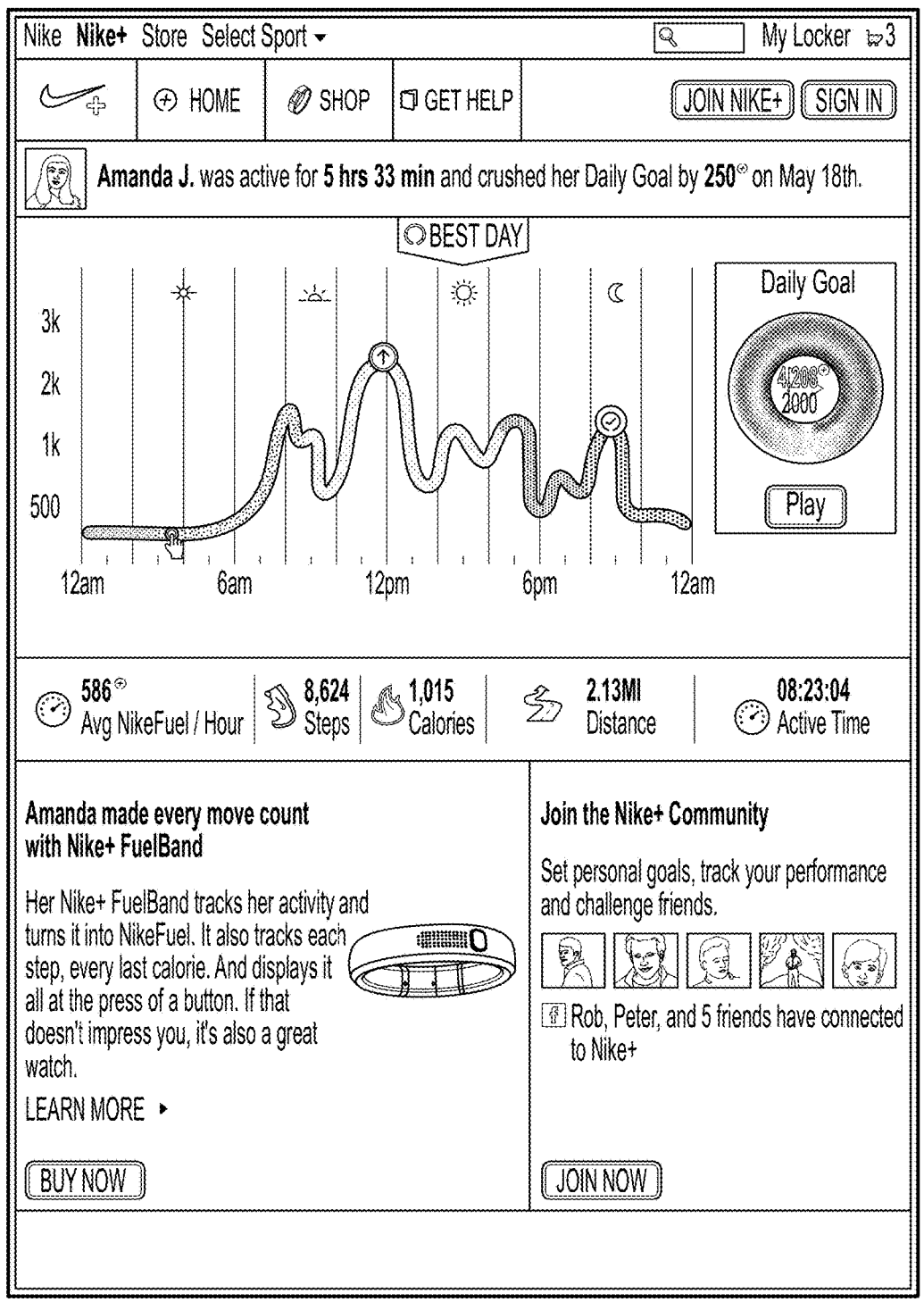
FIGS. 17A-17D illustrate example interface for sharing activity data.

FIGS. 17A-17D illustrate example interface for sharing activity data. In FIG. 17A, for example, a user's profile may be populated with information about other users. For example, a notification or news event may be posted to the user's profile to alert the user of the other user's recent activity or activity event. For example, the other user may have recently completed a goal or reached a milestone. Such events may be displayed to the user to act as motivation and to encourage the user to congratulate the other user. Activity sharing may be configured on or off. Other sharing parameters may be defined as well. For example, a user may identify users and/or groups to which activity should be shared. In other examples, a user may define times during which sharing is allowed and/or types of events or activities that may be shared. In a particular example, a user may specify that events or activity data resulting from a first type of device, a first type of activity or a particular activity session is to be shared while events and/or activity data resulting from a second type of device, a second type of activity or another specific activity session is not to be shared. Thus, the use of the multi-activity platform allows a system to provide more granular control in sharing activity information. Activity may be shared through the user's profile (e.g., when other user's view the user's profile) or as part of other user's profile, activity feeds and the like. For example, activity events and information of a first user may be pushed to a profile or page of another user.

Figure 17C:
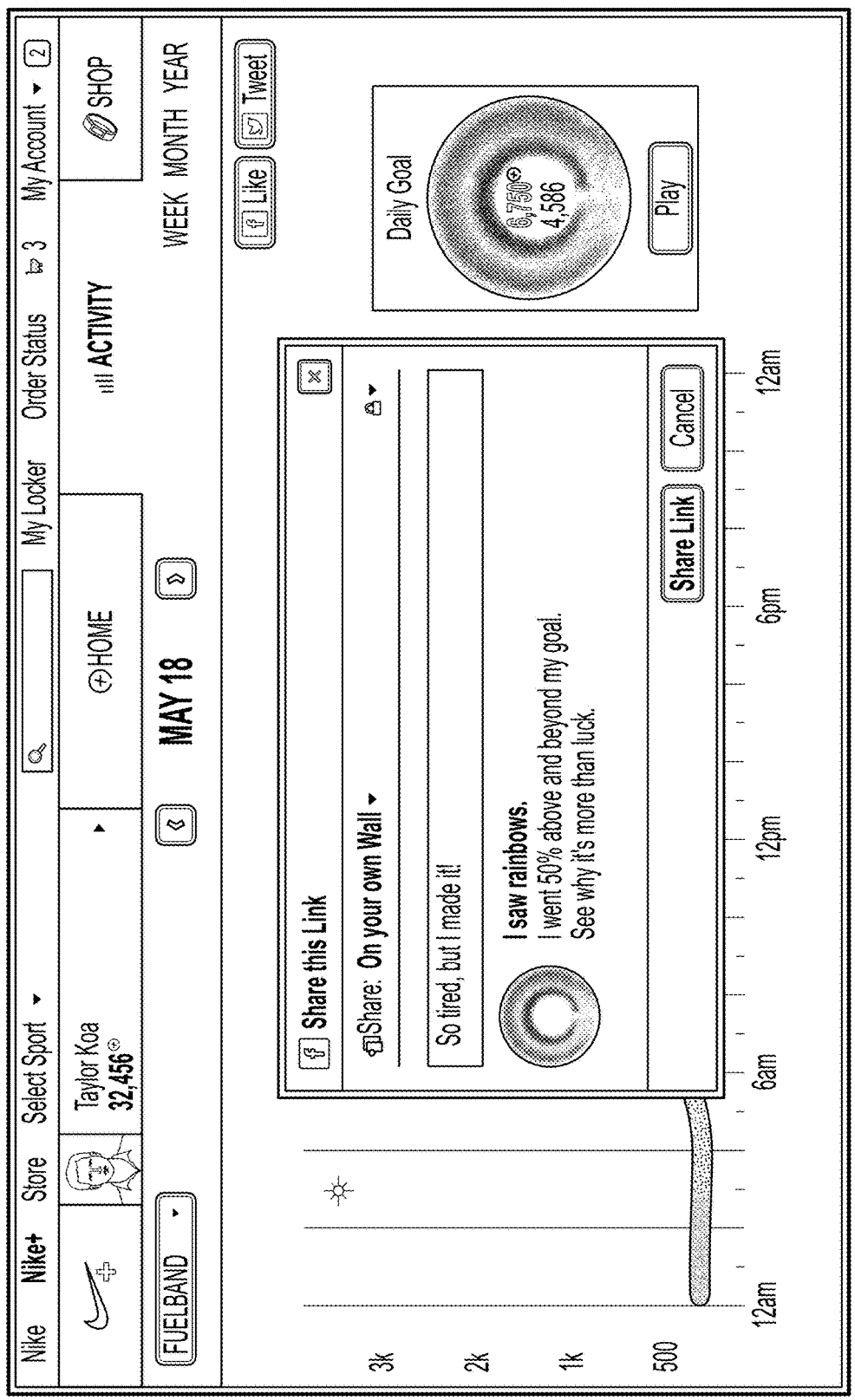
Figure 17B:
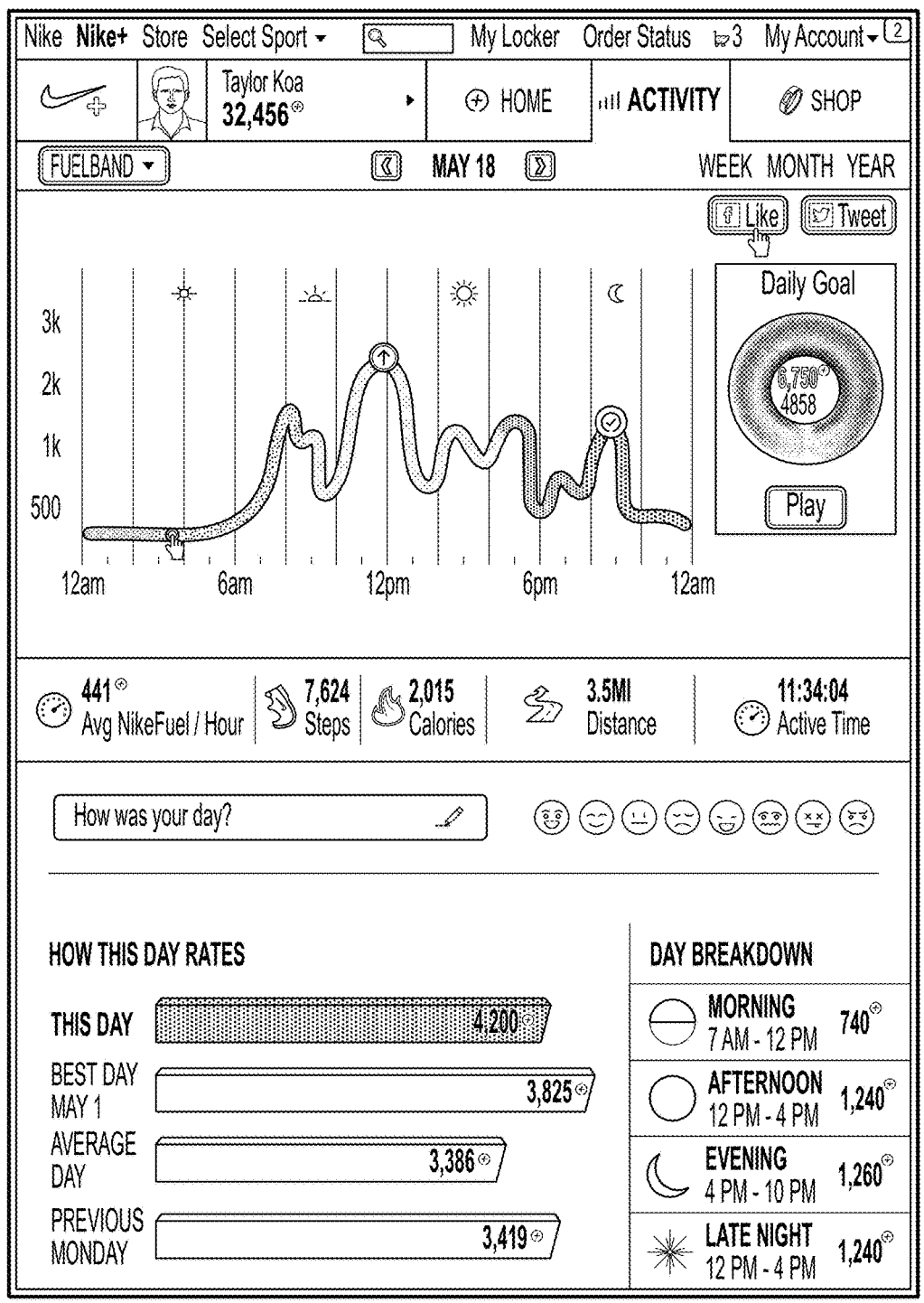
Figure 17D:
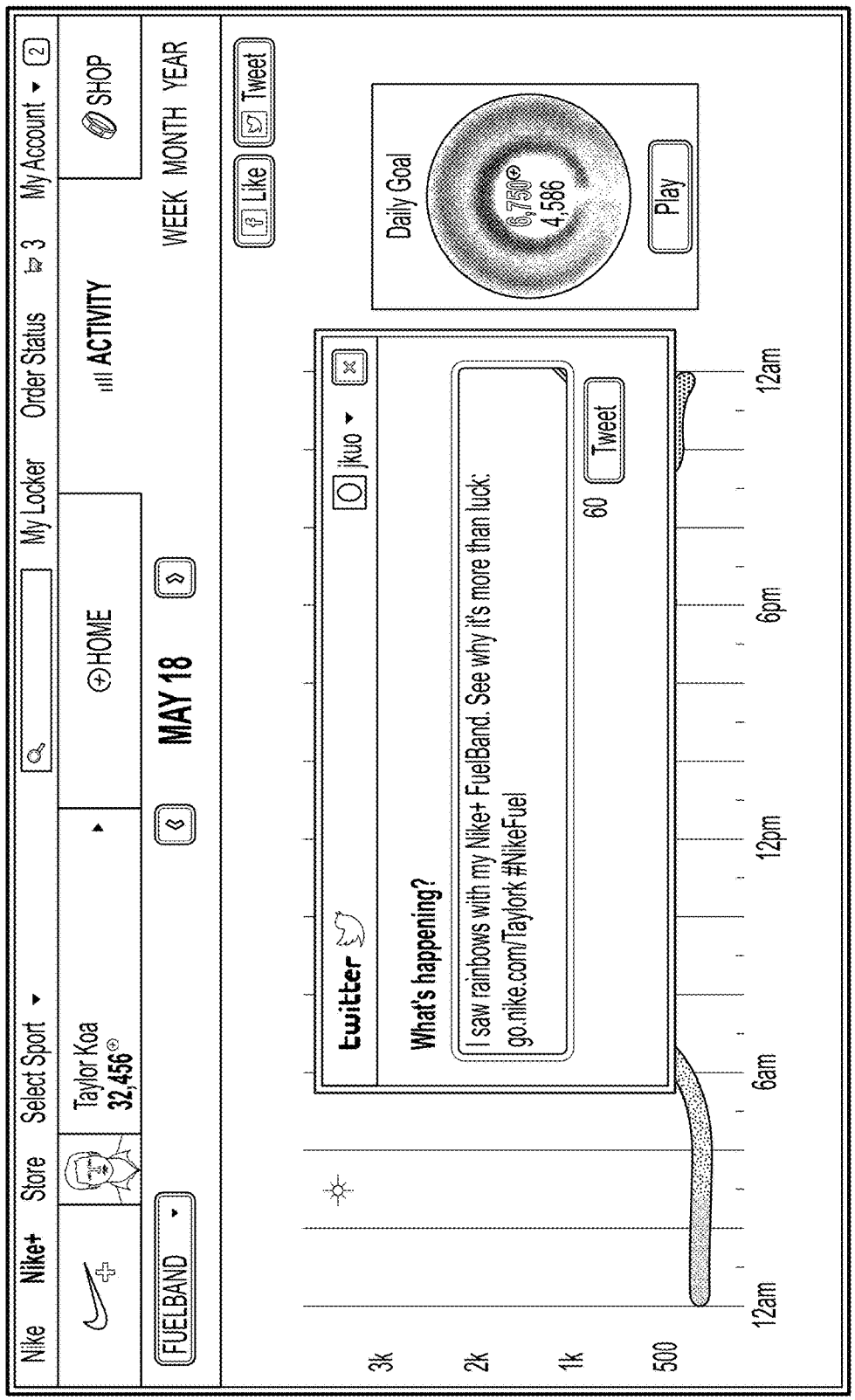

FIGS. 17B-17D illustrate example interfaces for sharing activity information and events through external social community and networking sites. FIG. 17B illustrates an interface including options for sharing on FACEBOOK or TWITTER. FIGS. 17C and 17D illustrate pop-up interfaces through which a user may submit a note, specify activity information to be shared, identify users to which the information is to be shared, and the like. As with configuration information that is and is not to be shared, the user may configure sharing of information through external sites and systems based on device type, activity type, activity session and the like as well. In one example, the user may configure sharing of information through external sites and systems separately from sharing through internal systems or communities.

Figure 18:
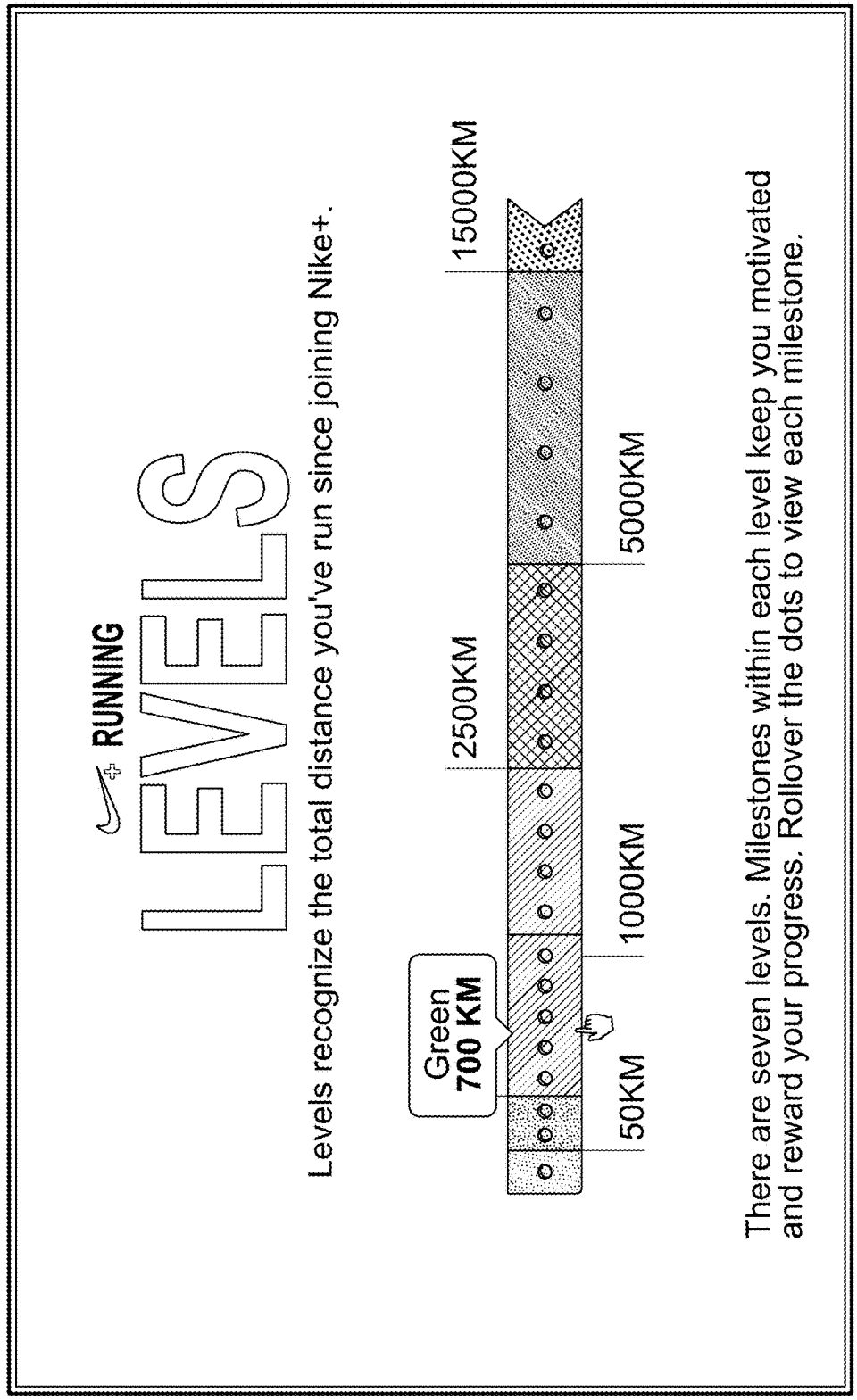
FIG. 18 illustrates an example activity level progression scale that defines various levels of activities based on colors.

Motivating users to continue athletic activity may be performed in numerous manners. In one example, users may be motivated through an activity level progression. FIG. 18 illustrates an example activity level progression scale that defines various levels of activities based on colors. Accordingly, as a user continues to perform athletic activity, the user may progress through the scale and from one color to the next. The scale may be defined in other ways and is not limited to a color scale. For example, different levels on the progression scale may be represented by different names, icons, images, and the like. Advancement on the progression scale may be rewarded in various manners including new profile icons, images, virtual objects (e.g., shoes or other apparel), discounts, new avatars, monetary rewards and the like. Progression or advancement may be evaluated in a variety of manners and based on various metrics. For example, in the example scale of FIG. 18, the user may progress by reaching different levels of lifetime miles (or other distance metric) run. In other examples, the scale may be defined by an average amount of activity performed per time period (e.g., per day, per week, per two weeks, per month, per year, etc.). Accordingly, a user may regress in the scale in one or more examples if, for instance, the user's average amount of activity per time period decreases. In other examples, such as the above noted example in which the scale is defined by a total number of recorded activity performed, a user might only be able to advance along the scale (e.g., without the possibility of regression). The progression scale may be defined based on a variety of metric types including calories burned, steps taken, pace and the like and/or combinations thereof.

Figure 19A:
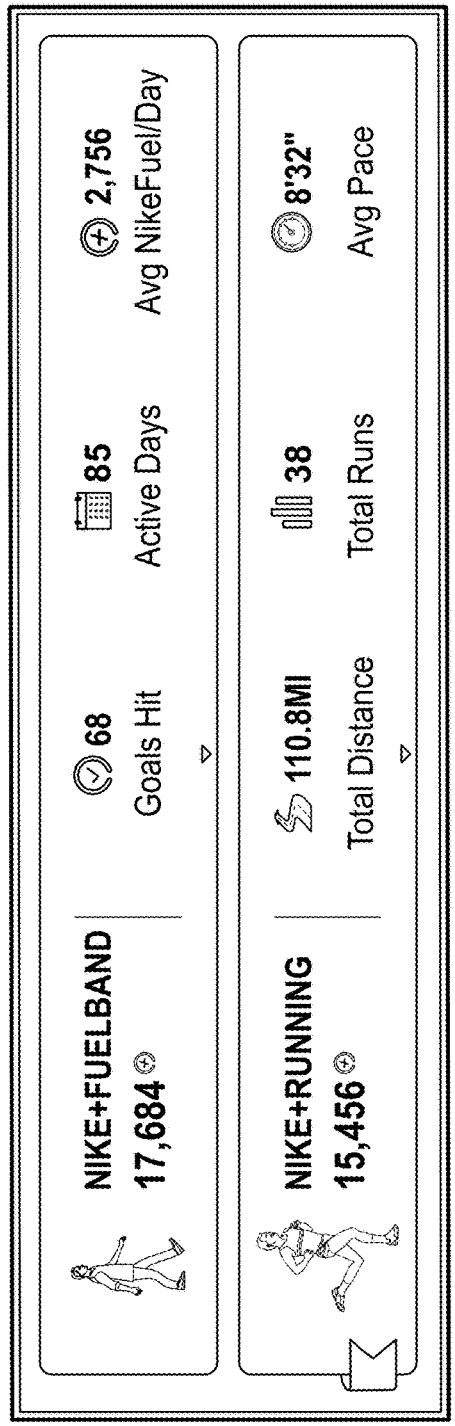
FIGS. 19A and 19B illustrate example interfaces through which a user may view his or her current activity level and view an amount of activity required to reach a next level on a progression scale.
Figure 19B:
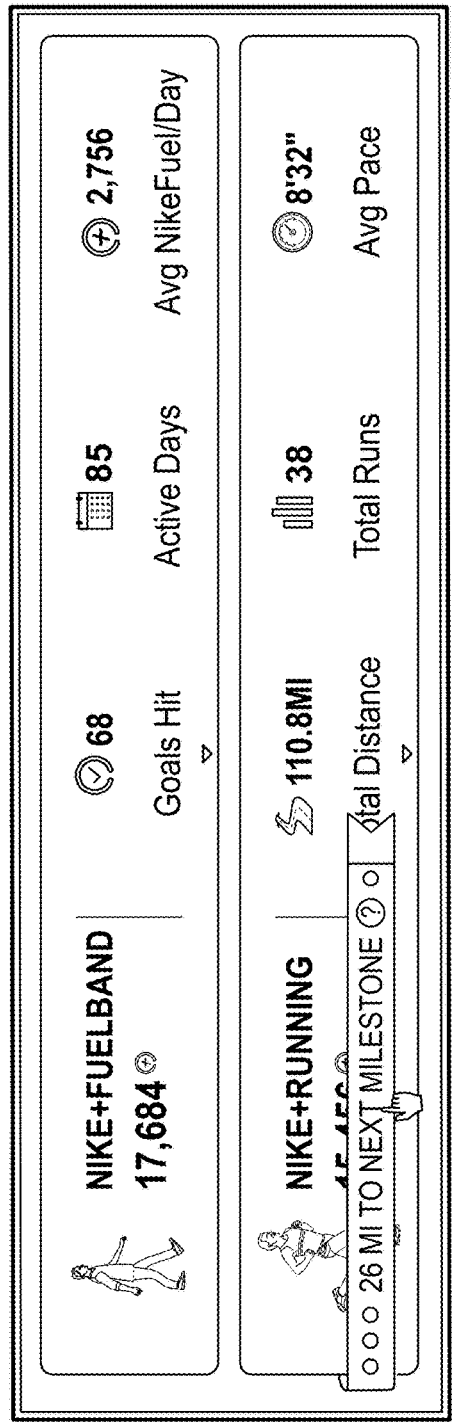

FIGS. 19A and 19B illustrate example interfaces through which a user may view his or her current activity level and view an amount of activity required to reach a next level on a progression scale. FIG. 19A, for example, illustrates a user's accumulated activity for each of two different activity tracking devices. Activity recorded for the different types of devices may be registered with different types of activity metrics. One or both of the activity trackers may include a user interface element that allows a user to view a current progress and/or an amount of needed progress to advance along an activity scale. For example, a ribbon element may be displayed to allow the user to cause the display of activity scale information.

FIG. 19B illustrates an interface in which the ribbon element has been activated. The activity scale information display element may color coded or otherwise coded to represent the various levels of the scale. Additionally, various sub-levels within each level may be represented in the display element as well. Accordingly, a user may be able to view not only the overall progress level, but also smaller demarcations of progress within each overall level. The display element may further specify the required amount of activity to reach the next sub-level or overall progress level with textual and/or visual information. Using such a display element that is activatable and/or hideable may allow the interface to maximize use of display space while providing the information that the user might want to view. The user may further be allowed to select or otherwise interact with the display element to cause another interface (e.g., another webpage or a sub-interface within the same page) to be displayed. The other interface may provide further information about the various levels and required amount of activity to reach those levels. Various other types of display elements may be used and different interactions may be incorporated into the display elements as needed or desired.

Figure 20:
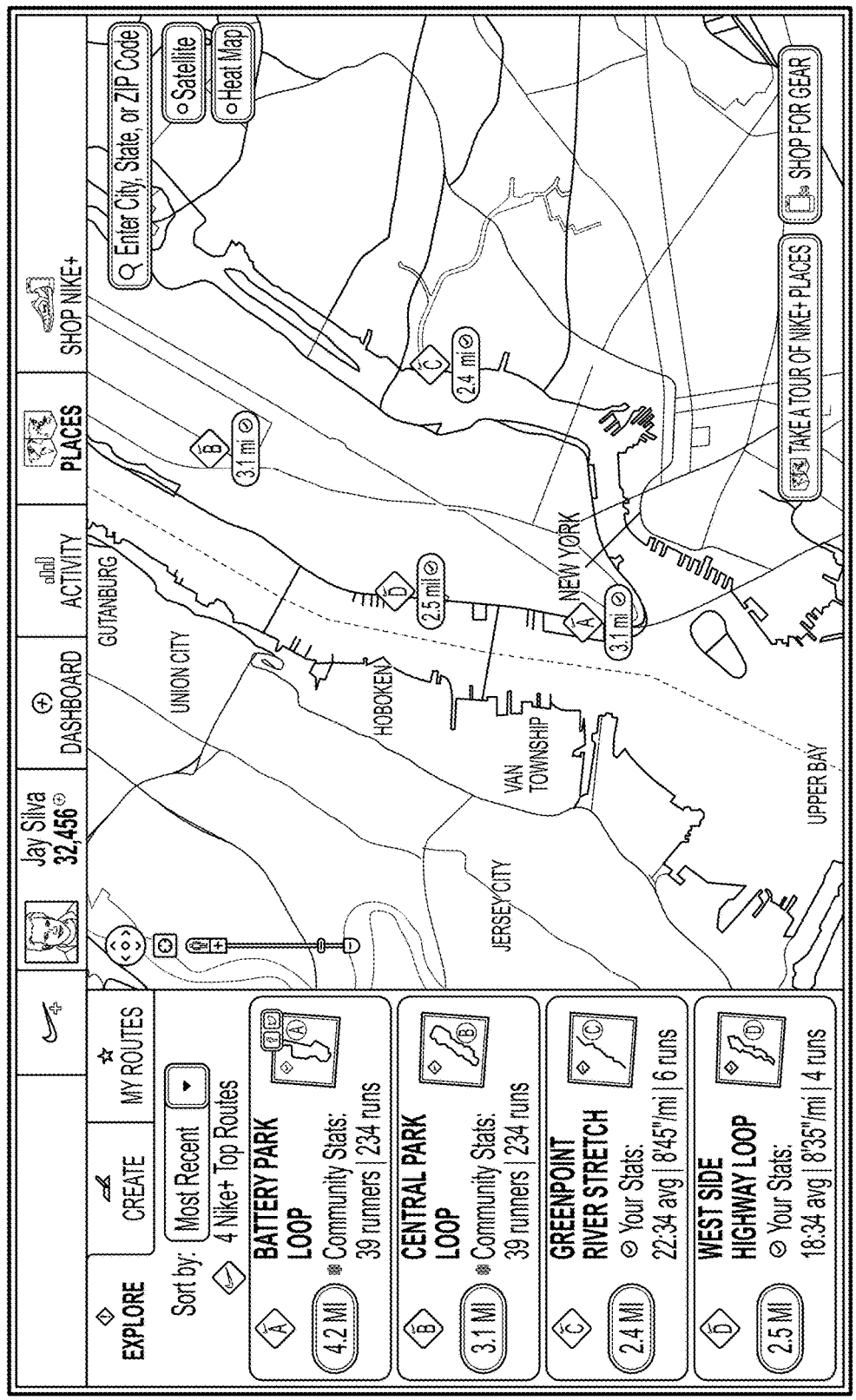
FIG. 20 illustrates an example interface including a map showing various locations where activity routes or other regimens have been defined.

An activity tracking system may further provide an ability for a user to track different routes or activity locations. FIG. 20 illustrates an example interface including a map showing various locations where activity routes or other regimens have been defined. The activity routes or regimens may be represented on map by a visual element that may include a visual feature indicating whether the user has used that activity route or regimen before. Additionally, the information bar may display detailed information about each of the various routes or regimens and provide user statistics (e.g., for a best run or a most recent run) if the user has previously used that route or regimen. A best run may be defined in terms of a lowest or highest metric (e.g., highest calories burned, lowest pace, longest distance, etc.). The user statistics might only correspond to cumulative statistics for all performances by the user for that route or regimen. If a user has not previously used the route or regimen (or has not used the route or regimen for a predefined amount of time), the information bar may display instead statistics for one or more other individuals that have performed the route or regimen. In one example, the information bar may display a total number of performances of that route or regimen amount a particular community (e.g., all users that have performed the route or regimen, the user's friends who have used the route or regimen, users that live within a 5 mile radius that have used the route or regimen, users who have used the route or regimen at least X number of times and the like).

While the interface of FIG. 20 only shows one area of the world, the user may also search for other areas of the world using a search field. The interface, in one or more examples, might only show areas in which routes or regimens have been defined. Additionally or alternatively, a user may be able to filter the routes or regimens shown in the map using a variety of parameters. For example, a user may specify that only routes or regimens for a particular activity or activity type are to be shown. In other examples, a user may filter the routes or regimens shown by popularity level and/or activity level. Popularity may be defined in a variety of ways including based on a number of times the route or regimen has been used, a number of positive comments or votes received, a number of times the route or regimen has been shared and the like. In yet another example, a user may filter the routes or regimens based on difficulty level. Difficulty level may be defined by a creator of the route or regimen or may be defined by votes/tags submitted by users who have previously used the route or regimen. Difficulty level may also be defined based on metrics measured from that route or regimen. For example, if the average heart rate for multiple users who have used the route or regimen is above a specified threshold, the route or regimen may be scored with high difficulty. Accordingly, different difficulty levels may correspond to different heart rate ranges. Other filtering parameters may include distances, estimated or average actual amount of time required, number of friends or other users who have performed the route or regimen and the like.

In some instances, the interface may automatically filter out routes or regimens based on a user's workout history and/or other characteristics. For example, if a user's longest run was 10 miles, the interface may filter out routes or regimens that are greater or less than the user's longest run by a predefined amount (e.g., 30%, 50%, 75%, 100%, etc.). In other examples, if a user has indicated a dislike of mountain running or trail running, the system may automatically filter out such routes or regimens. Various other rules and automatic filters may be specified and applied as desired by the user.

Figure 21:
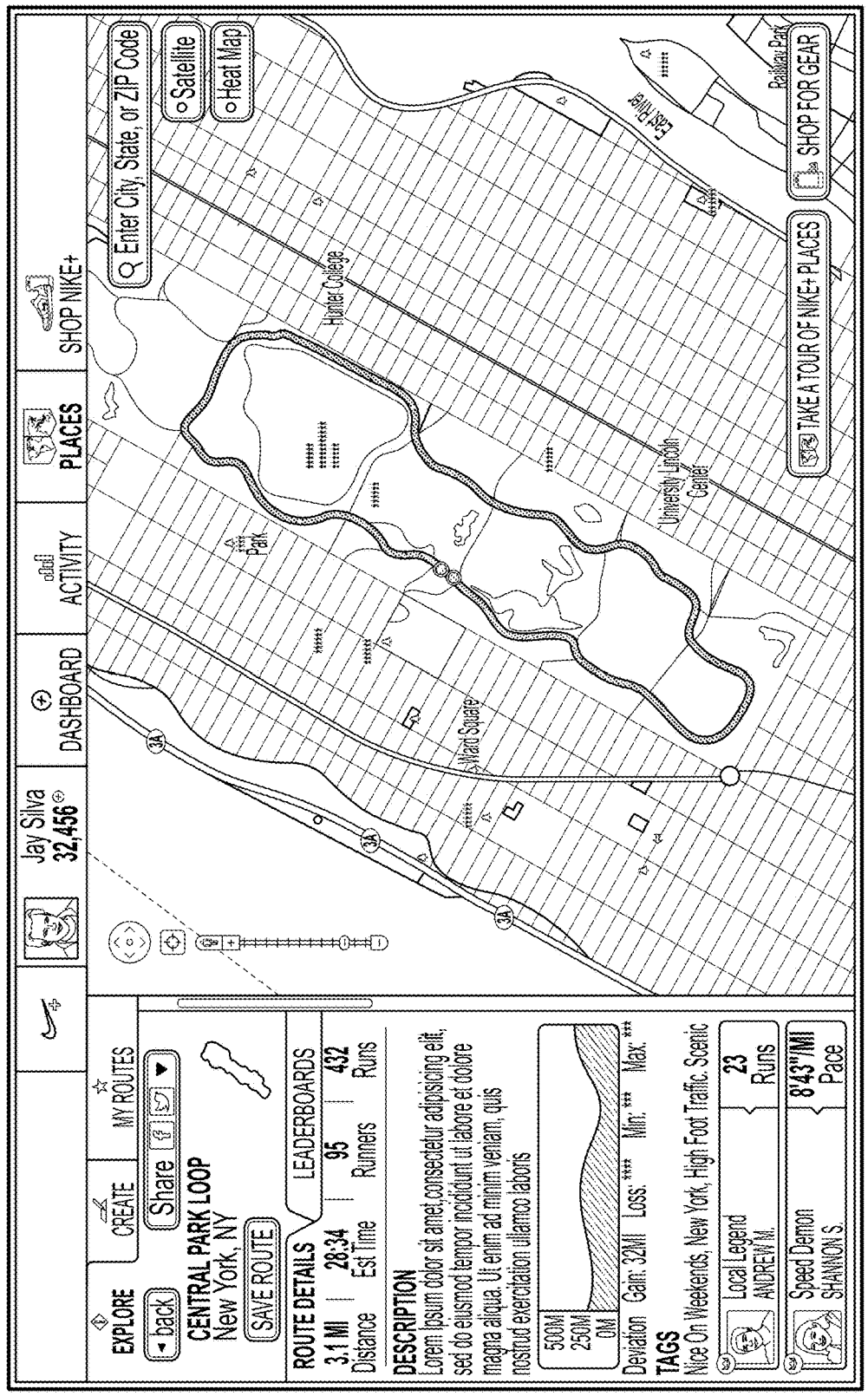
FIGS. 21, 22A and 22B illustrate example interfaces in which route details are displayed.
Figure 22A:
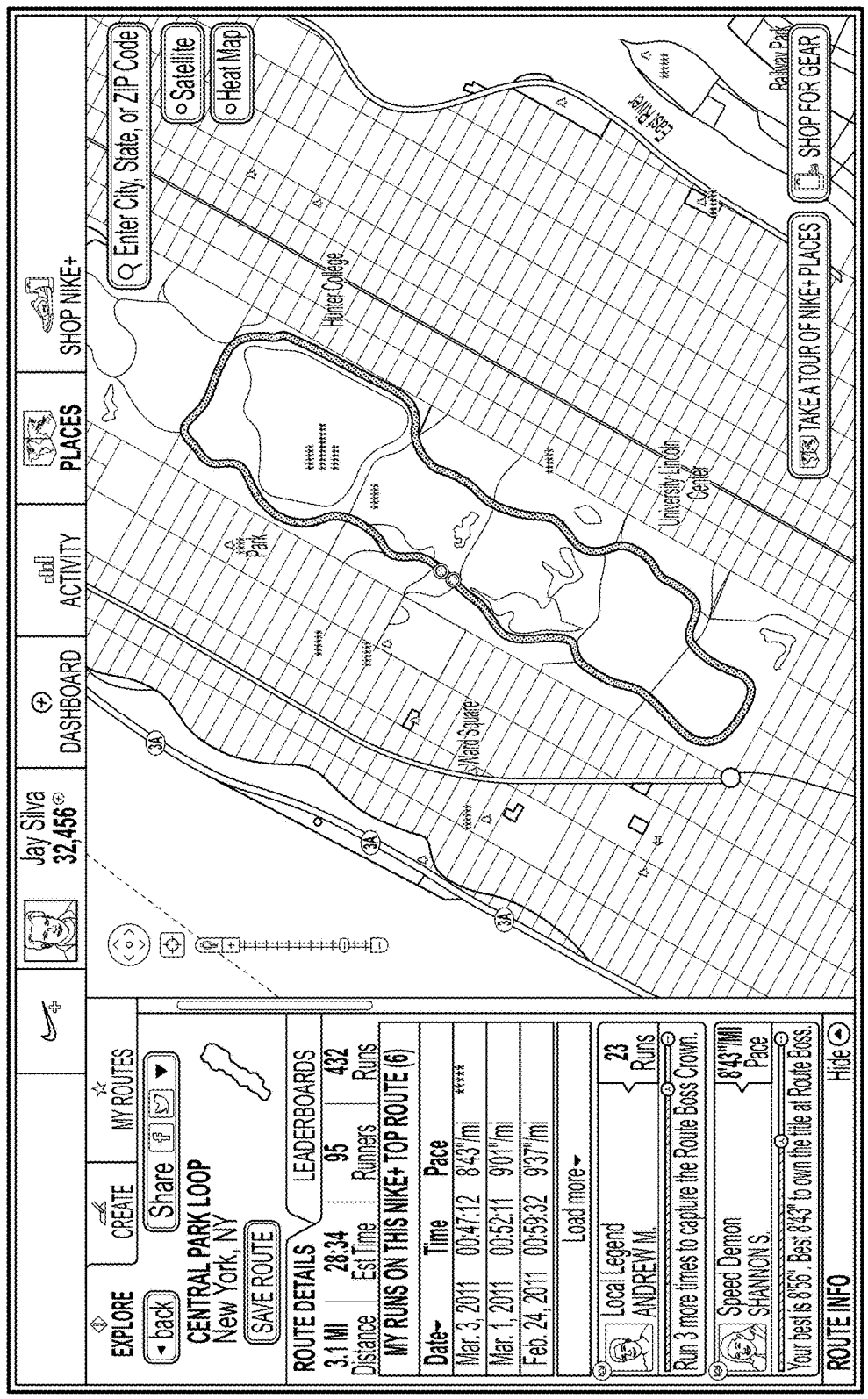
Figure 22B:
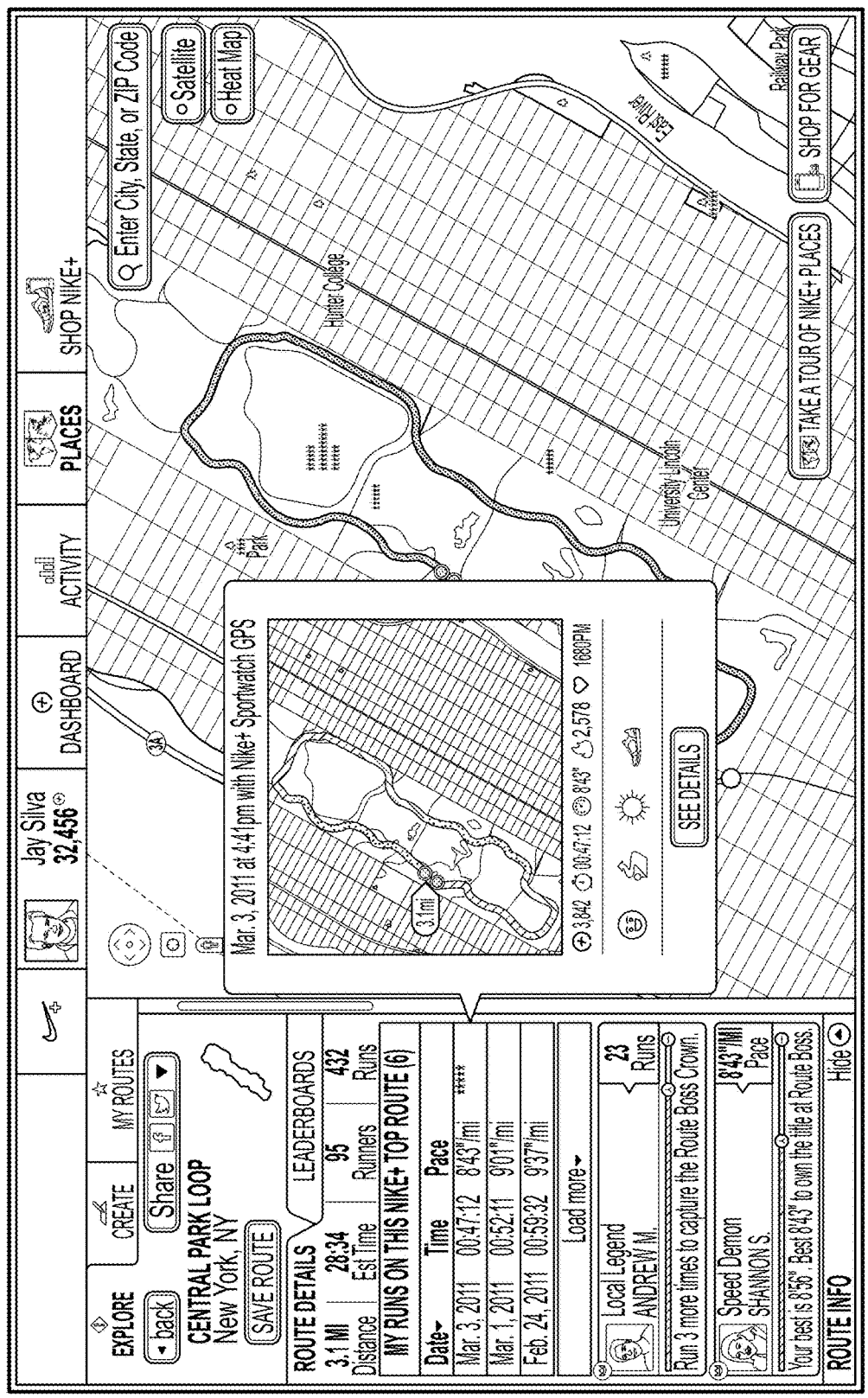

FIGS. 21, 22A and 22B illustrate interfaces in which route details are displayed. For example, if a user selects one of the routes or regimens displayed in the information bar or on the map in FIG. 20, the user may be directed to a user interface such as those shown in FIGS. 21, 22A and 22B.

In FIG. 21, for example, displays the route of a run in the map and details of the route in the information bar. In particular, information bar may provide details such as a length of the run, an estimated amount of time required for the run, a number of users that have performed the run, a number of runs performed and the like. An elevation graph may also be provided to indicate the elevation changes that are involved during the run. A description (e.g., creator defined) of the route may also be displayed. In one or more examples, the route may also be tagged with various key words submitted by users. These key words or tags may aid in searching for routes that fit a user's interest, athletic level and/or needs. The information bar may further display one or more runners that have run the route. For example, the information bar may display the fastest runner for the route as well as the runner who has run the route the most number of times along with their relevant metrics. This information may provide the user with added motivation to try to reach the top position with respect to a number of time run or fastest pace. In other examples, a system may randomly select users to display in the route details.

According to some aspects, information displayed in the information bar and/or the map may be interactive. For example, if a user hovers over or otherwise interacts with a particular segment of the elevation map, a corresponding portion of the route displayed in the map may be highlighted or otherwise indicated (e.g., a label, pointer, icon, etc.). In yet other examples, a user may hover over or otherwise interact with a portion of the route displayed in the map to cause a pop-up display to show a best or average pace at that point in the route. Additionally or alternatively, images, photographs, notes and the like provided by users may also be displayed upon interacting with a portion of the route.

FIG. 22A illustrates an example interface that may be displayed when a user has previously run the route one or more times. The interface may display metrics for one or more previous runs. The previous run information may be sorted or selected based on the best previous runs according to one or more metrics such as pace. Additionally or alternatively, the previous run information may be provided by recency of the run. The information bar, in addition to identifying the leaders in various categories for the route, may further display a comparison between the current user and the leaders. Accordingly, the user may be provided information such as a number of runs needed to exceed the current number of runs leader or a pace gap between the user and the pace leader for the route. This information may provide additional motivation to challenge the user.

FIG. 22B illustrates an interface in which a sub-interface is displayed upon selection or other interaction with one of the user's previous runs. The sub-interface may provide additional details regarding the previous run including a device with which the run was measured, metrics of the run, and tags associated with the run (e.g., weather, mood, terrain and equipment used). Additionally, the sub-interface may provide an image of the route with an indication of a particular metric of the user during the run. For example, the appearance of the route may be defined based on a heart rate or pace of the user at the corresponding points of the run. According to another example, selecting a particular run may cause the route displayed in the main interface map to change to a metric-indicative route line.

Figure 23:
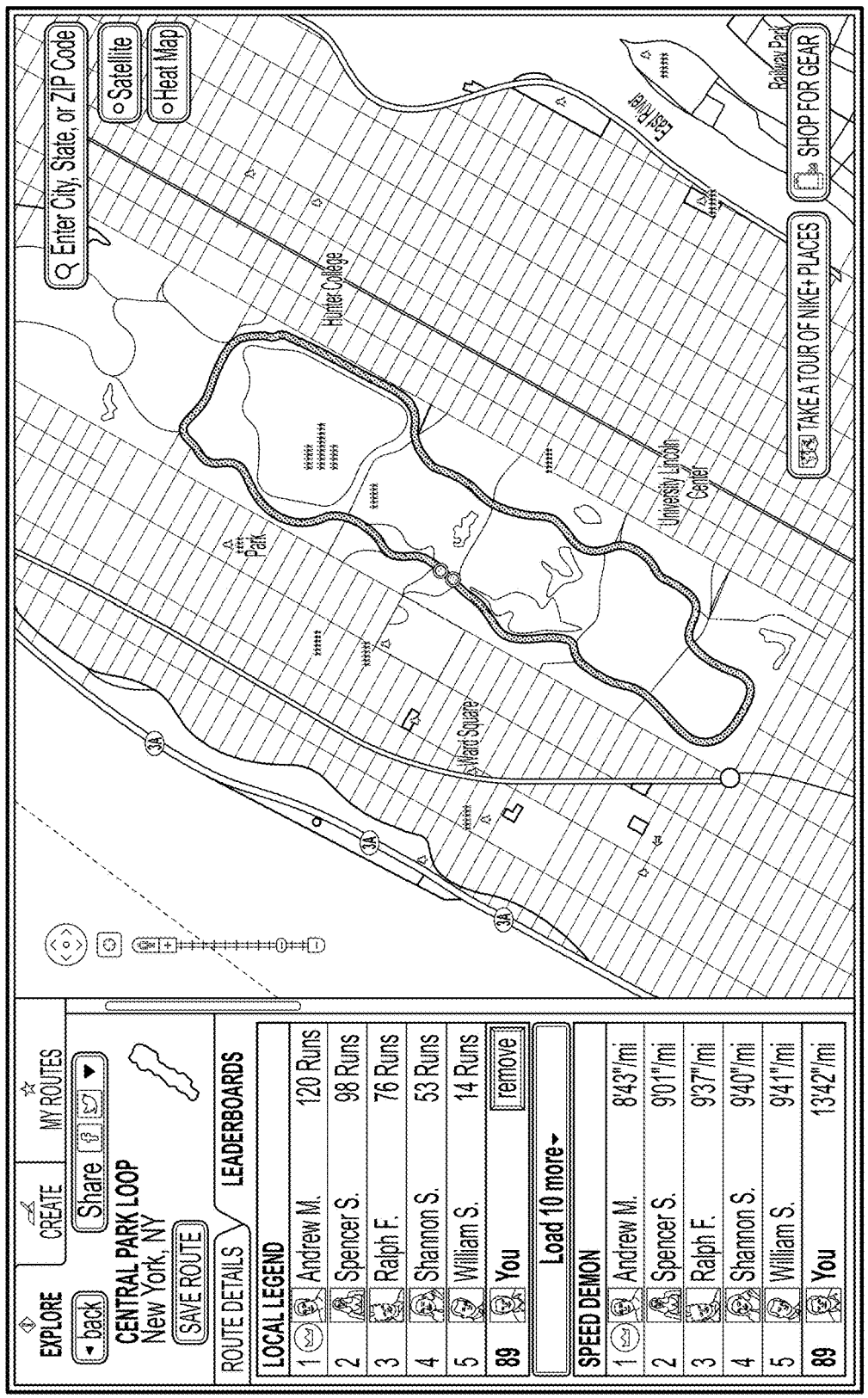
FIG. 23 illustrates another example interface showing a route map and an information bar.

FIG. 23 illustrates another example interface showing a route map and an information bar. The information bar displays a leaderboard of individuals for each of number of times run and speed/pace. The current user may always be displayed in the leaderboard regardless of their position. The user may also have the option of removing themselves from the leaderboard. Removal from the leaderboard may include removing records of the runs associated with the route. Alternatively, removal from the leaderboard might only include disassociation of the run records with the particular route. For example, the run metrics (e.g., distance, pace, etc.) might still be recorded in the user's overall running history and accumulated totals and averages. In other examples, removal may include hiding the record from the public. Accordingly, while the record may still be linked to the route when the user views the recorded run, the association might not be viewable to others.

Figure 24A:
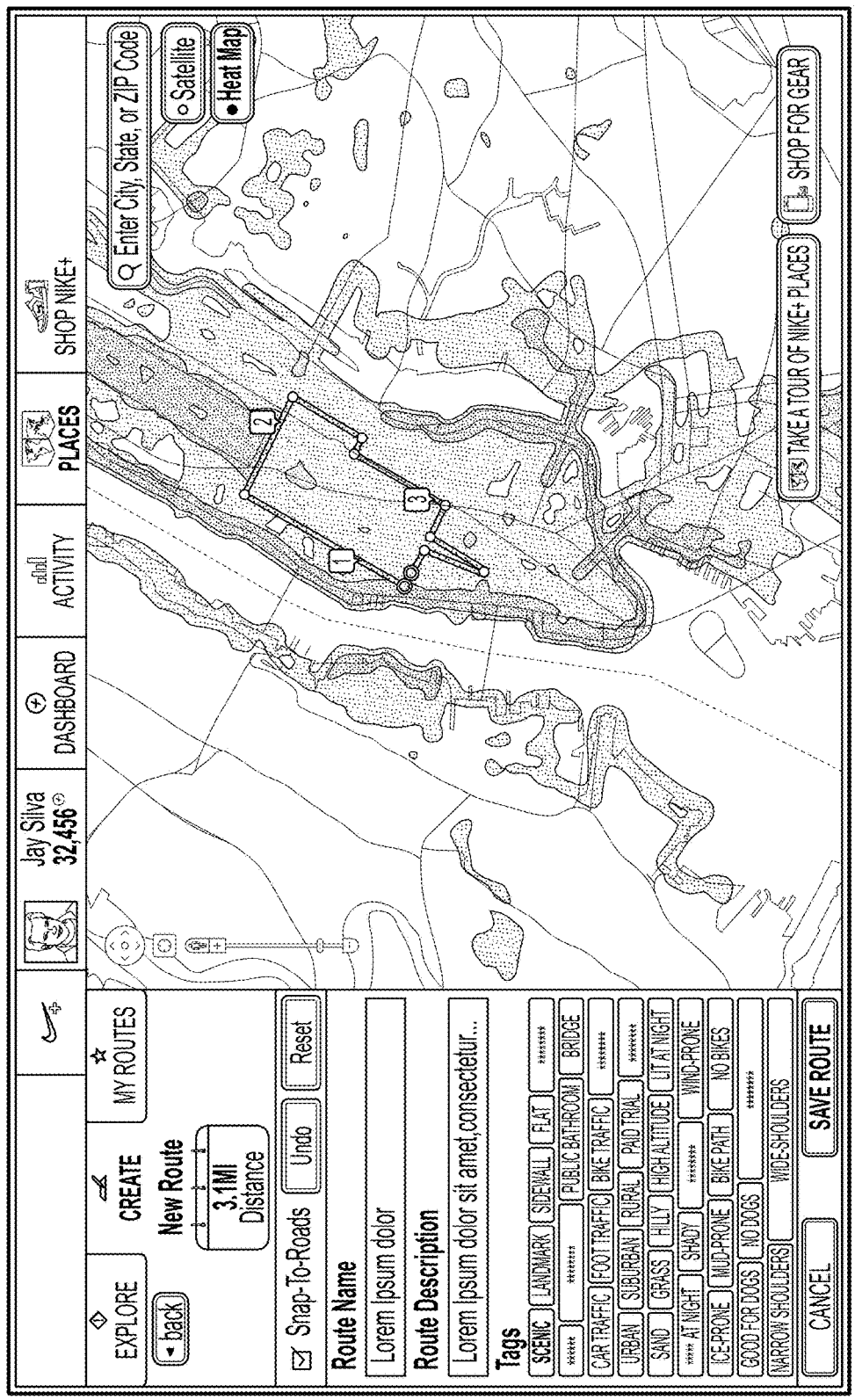
FIGS. 24A and 24B illustrate example interfaces in which routes may be created.

FIG. 24A illustrates an interface in which routes may be created. The route creation interface may allow a user to manually draw a path in the map to represent a route that is to be run. In other examples, a user may upload a route (e.g., recorded using GPS) that they have previously run and modify the route as desired. In defining the route, the user may enter a name, provide a route description and tag the route with one or more key words or phrases.

Additionally, the map display may include a heat map. The use of the heat map is not limited to route creation and may be displayed in other environments including reviewing of a user's performance and viewing available routes. The heat map may represent a level of popularity or activity for the corresponding areas of the map. The heat map may be specific to athletic activity and thus, might not include information regarding other activity that is performed in those areas. In some examples, the heat map may be configured to be specific to (e.g., only reflect data for) one or more particular types of athletic activities, activity recorded using one or more particular types of devices, one or more demographic groups, and the like and/or combinations thereof. The heat map may specify the level of activity or popularity by using varying colors or shades of colors, patterns, transparencies or other varying visual appearance. For example, a dark red color may represent high levels of activity or popularity while a lighter red color (e.g., pink) may represent low levels of activity or popularity in the corresponding area. Hovering over an area of the map may provide additional information such as a number of runs performed per day or other time period, a number of distinct runners that run in the area per day or per week or other time period, a most recent run in the area and the like. The heat map may be activated or deactivated as desired. For example, a user may return to a normal line-map or activate a satellite-map.

In one or more examples, the system may automatically generate a route based on a user specified distance, a user specified amount of time, general location (e.g., city, zip code, neighborhood, address, etc.) and/or information from a heat map. The system may generate the route by maximizing the popularity or activity level of the areas through which the route extends. In one example, a user may specify a start location and an end location and the system may automatically determine a route that maximizes popularity or activity level based on previously stored activity information. Alternatively, the system may generate a route that minimizes the popularity or activity level of the areas through which the route extends. Whether the activity level/popularity level is maximized or minimized may be user selectable. In one or more arrangements, generating the route based on a user specified amount of workout time may include analyzing a popularity or activity level of potential routes. For example, routes with higher popularity or activity level may require more time to traverse. Accordingly, the route may be shortened (e.g., relative to a route through less popular areas or areas with lower activity levels) to meet the specified amount of workout time.

Figure 24B:
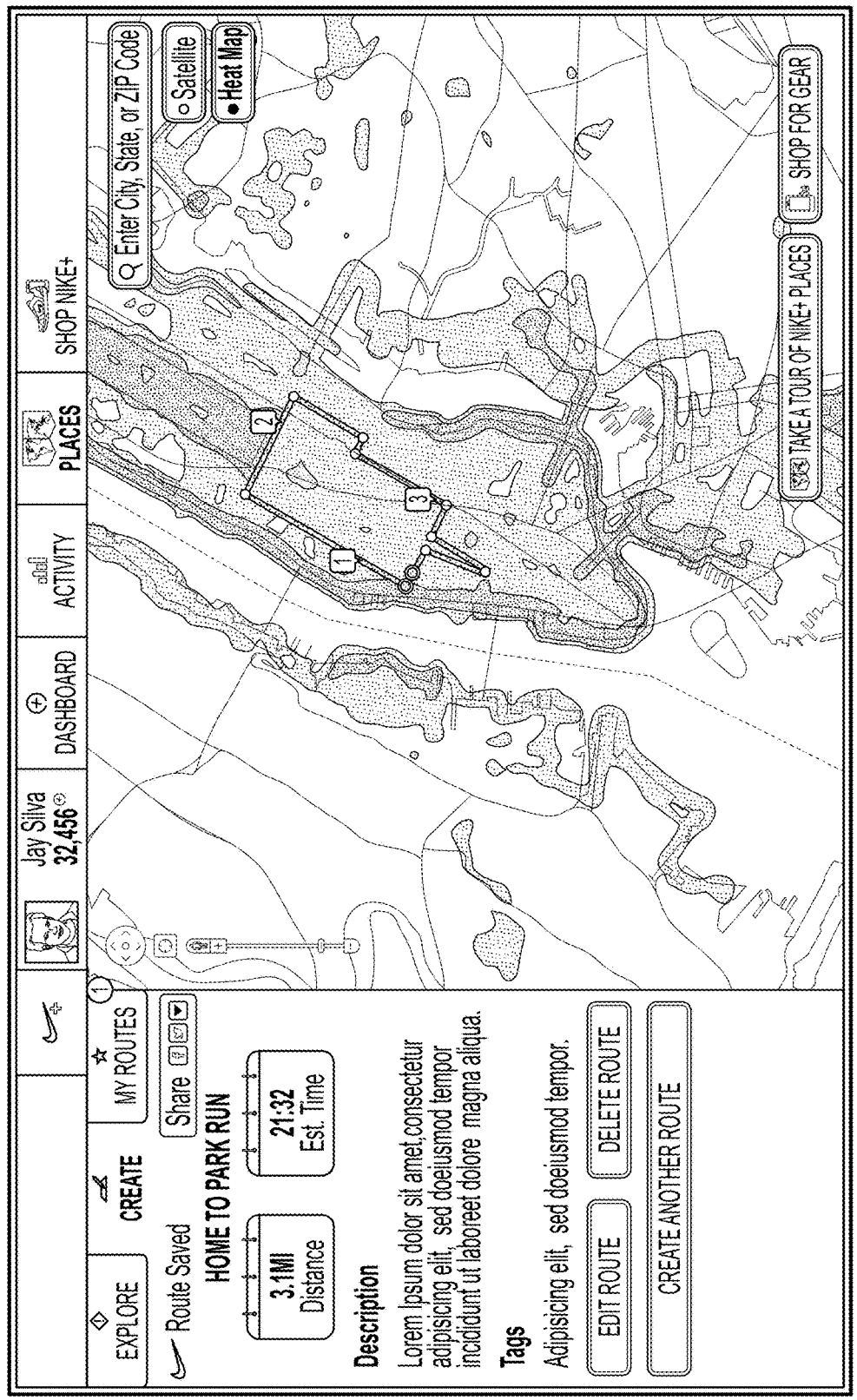

FIG. 24B illustrates another example route creation interface in which an estimated time to complete is displayed. The estimated time to complete may be calculated based on a user's average pace (total or for similar terrain, length and/or elevation).

Figure 25:
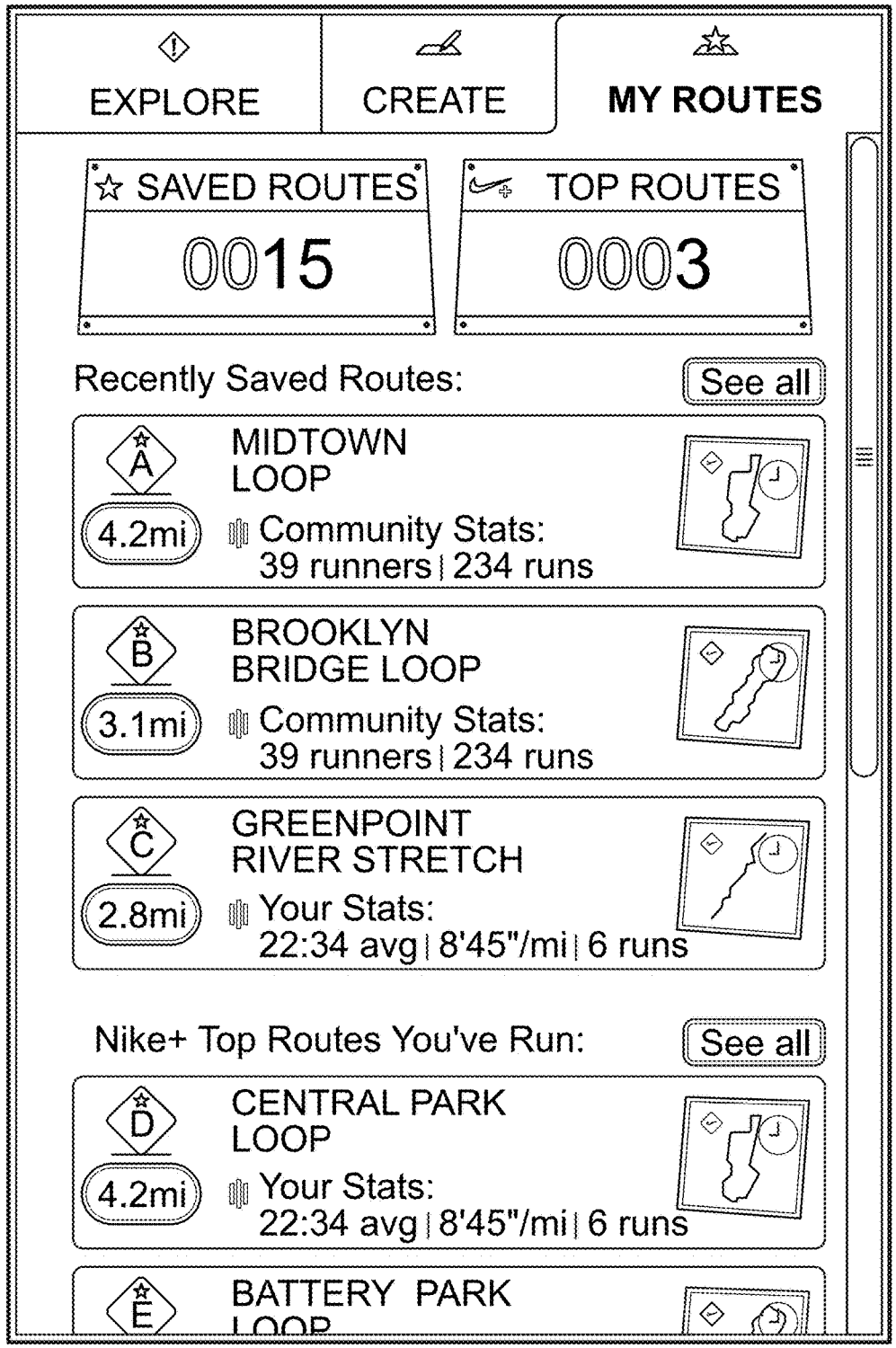
FIG. 25 illustrates an example information bar displaying recently created/saved routes and recently run routes.

FIG. 25 illustrates an example information bar displaying recently created/saved routes and recently run routes. The information bar may include a counter indicating a number of routes created or saved by the user and a number of routes that have been run by the user.

Multi-Activity Application/Device Interface

Interaction between activity monitoring devices, activity tracking services and systems, intermediary devices and other computing devices or systems and/or applications executing thereon may be conducted using a shared application protocol interface (API). For example, applications executing on a smart phone may use the API to retrieve data from and transmit data to activity monitoring devices adopting the API. Similarly, communications between an activity monitoring device and an activity tracking service or system may be conducted using the API. Communications between dedicated activity monitoring devices may also be conducted using the shared API. An example of the protocol is described in further detail below.

Activity Data Tracking and Processing

The API for activity data tracking and processing may include a variety of functions including activity deletion, activity detail requests for one or more activities, activity listing requests, activity summary retrieval, posting and deleting tags, requesting activity type-specific information, requesting activity data based on date ranges and the like. The API may be used for monitoring devices and other devices to interact with a multi-activity system as well as for the multi-activity system or other computing devices to retrieve information from and transmit information to the monitoring devices.

Activity Delete: This service may be used to delete an activity (e.g., an activity session having a particular activity session identifier). Once deleted, a user will no longer be able to view this activity, and it will no longer be used for any calculations, aggregations or challenges. For example, a number of activity points awarded for the activity may be deducted from a total activity point amount upon deletion.

Activity Detail: Devices may also be able to retrieve detail on a single activity or activity session. This service returns all the information related to a specific activity using the activity ID as parameter. Details may include raw sensor data, metrics, location information, participating individuals and the like.

Activity Detail for the Last Activity: This service returns information related to the last activity session. Accordingly, instead of having to be aware of the ID of the last activity session, the system may provide a function call that is particular to the most recent activity. The user may also specify an activity type, thus allowing a device to select a last activity session for a particular activity type. Similarly, other types of parameters may be used to further or differently distinguish between last activity sessions.

Activity List: Return a list of the user's activities. This service is useful for any application wishing to obtain a list of activities by date, time or index. For example, a device may request all activities performed between two particular dates or times. The list may further be filtered based on other parameters including activity types, device type, device ID, activity characteristics (e.g., above or below a threshold pace, a particular weather condition, a particular terrain or location, activity equipment used etc.) and the like. Retrieval using indices may refer to specifying an activity ID range and retrieving all activities within that ID range.

Activity Summary for the Specified Month: This function allows a device to retrieve a user's activity summary for a specified month. The activity summary may include statistics regarding a number of goals met, an average number of activity points earned (or other activity metric), identification of streaks of goal completion and the like, as is described in further detail below.

Activity Summary for the Specified Week: Get a user's activity summary for a week.

Activity Summary for the Specified Year: Get a user's activity summary for a specified year.

Activity Update: This service returns all the information related to a specific activity using the activity Id as parameter. In some examples, this function may include a date or time parameter specifying a last time when information relating to the specific activity was retrieved. The device or system from which this information is requested may then transmit all information that is new as of the specified date or time.

Basketball Activity Detail: As described, activity data requests may be activity type specific. Accordingly, a function may be provided to retrieve details on a single basketball activity session. This service returns all the information related to a specific activity using the activity Id as parameter.

Basketball Activity List: Return a list of the user's basketball activities.

Customized Tags: Adds user customized tags for specified user. For example, a user may be allowed to define customized characteristic tags for activity sessions. Tags may include, weather, equipment, terrain, food eaten prior to the activity session, user-specified notes and the like.

Daily Activity Point Summary Service: Gets a user's daily activity point history over an interval. Alternatively or additionally, different activity point periods may be defined for retrieval such as a weekly activity point history or a hourly activity point history.

Delete Tags: Deletes the user tags for a specified activity.

Extended Metrics: Adds user extended metrics for specified activity or gets a list of the extended metrics associated with the activity Id or deletes a list of the extended metrics. Extended metrics may refer to metrics that are not automatically synchronized. In other examples, extended metrics may refer to any metrics that are user entered/specified (e.g., not automatically detected or generated by an activity tracking device or monitoring system).

Get Datastreams for Start and End Time: Get datastreams for a start time and an end time. This service returns all the datastream information related to the user between the designated start and end time parameters. For example, the datastream may include activity data and information as well as other actions taken by the user such as updating of a profile, adding a friend, setting a goal and the like.

Get Tags: Gets the user tags for specified activity session.

Get User Events: Return list of user events to be displayed. User events may refer to actions taken by the user or achievements/goals reached.

Post Tags: Adds the user tags for specified activity.

Post Tags By Date Range: Tags all the activity sessions in the specified date range.

Running Activity Detail: This service returns all the information related to a running activity using the activity ID as parameter.

Running: My Activities: Returns a list of sport activities for running and their aggregations.

Running: My Activities v1.0: Returns activity report, activity history details and lifetime details for a user for running activities.

Running: My Activity: Returns a sport activity by activity id for a user.

Training Activity Detail: Get detail on a single activity. This service returns all the information related to a specific activity using the activity Id as parameter.

Training Activity List: Return a list of the user's activities summary for a training-type activity.

Challenges

Challenges may be issued and conducted between two users using two different devices and device types. The following provides a list of APIs that may be used to create, track and complete a challenge.

Accept Challenge: Accept a challenge.

Accept or Deny Challenge: Accept or Deny challenge will be a user's response once they have been invited to a challenge.

Add Challenge: Add a challenge with the supplied information such as an objective, a duration, participants, whether the challenge is public or private, location, name of the challenge, start time and the like. In some instances, the add challenge service allows a user to specify a predefined challenge type such as Create Daily Goal, Challenge of the Week, Head to Head, Group Fuel Goal, Group Workout, Drill Based Challenge and Team Up, as described in further detail herein. Privacy levels may also be set. For example, the following table describes example privacy levels

| Id | Description |
|---|---|
| 0 | Private. You can only join if invited by the challenge creator. Only the participants can view the results of the challenge. |
| 1 | Participants and friends of creator can view. Does not appear on searches. (Note: As the concept of friends does not exist right now on MSP, 0 and 1 are the same.) |
| 2 | Public. Appears on searches. Anybody can view the challenge details and leader board, but not join. |
| 3 | Public. Appears on searches. Anybody can join, view the challenge details and leader board. |

Create or Update Challenge: Using this service, different types of challenges can be created/updated. The business rules and required parameters depend on the type of the challenge being created. The challenge types are: Create Daily Goal, Challenge of the Week, Head to Head, Group Fuel Goal, Group Workout, Drill Based Challenge and Team Up.

Challenge of the Week: Creates a challenge of a type that can only be created once a week. The challenge of the week may include various rewards that are specific to this type of challenge.

Create or Update Daily Goal: This service is used to create/update the daily goal for a specified date. If the date supplied is today, the daily goal for today will be changed/updated. If the date supplied is any date in the future, the future daily goal value will be changed. An error will be returned if the date supplied is prior to today.

Drill Based Challenge: Challenges can be created based on a drill. This form of the service will look up the details of an existing drill and create a challenge matching the parameters of the drill. Drills may refer to a predefined sequence of physical movements at specified times. Groups may or may not be supported. The overview of this Head to Head challenge is of a non-competitive variety. A challenge of this type indicates that the creator of the challenge invites her/his friends to beat their challenge. Whether the participants beat the challenge or not, the result is sent to back to original challenge poster. That is, the participants performance are not compared with one another and is, instead, compared to the objective. Thus, multiple participants may beat the challenge.

Get Challenge Details: Gets all the details of a challenge and the associated leaderboard (e.g., a listing of participants and a current level of performance/progress). In some arrangements, this function may check whether the logged-in user has permissions to see the requested challenge details.

Get Challenge List 1.0: Get a list of the challenges past and present on which a specific user has participated either as creator or as member. The list may be ordered by the end date of the challenge with the most recent challenge listed first. This service also lists goals, which is a type of challenge (me vs me) where there are no challenge members (other than the creator/user) or leaderboard.

Get Daily Goal List: Get a list of daily goals across multiple dates for the given user.

Group Activity Point Goal: The group activity point goal is a challenge type, which is individual based (but in a team), and non-competitive. A challenge of this type involves a creator of the challenge inviting her/his friends to join in the challenge and the sum of the activity points of all of the members/participants should be larger than a predetermined amount at the end of the challenge. There may be several business rules for this challenge type. For example:

1) A user can have up to 5 challenges of this type, including created challenges and accepted challenges, e.g., if a user have already created 5 challenges, the user cannot accept other challenges.
2) Each challenge of this type may hold up to 5 users (excluding the creator), i.e., the creator of a challenge can specify at the maximum 5 friends to send invitations to.
3) Challenges of this type may always be 7 days long.
4) After a challenge ends, velocity can make a call to create a new challenge with the same parameters.
5) The invitation can be accepted at any time within the 7 days, the amount of fuel earned since the start time will be credited to the challenge.
6) A challenge is not expected to be changed after it is created.

Other rules, restrictions and the like may be defined and is not limited to the above example.

Group Workout: The group workout is a challenge type, which is individual based (but in a team), and non-competitive. A challenge of this type is that the creator of the challenge invites her/his friends or other participants to join in the challenge and each member in the challenge should do at least the predetermined amount of workout. There may be various business rules for this challenge type. For example:
1) A user can have up to 5 challenges of this type, including created challenges and accepted challenges, e.g., if a user has already created 5 challenges, the user might not be allowed to accept other challenges.
2) Each challenge of this type can hold up to 5 users (excluding the creator), i.e., the creator of a challenge can specify at the maximum 5 friends to send invitations to.
3) Challenges of this type might always be 7 days long.
4) After a challenge ends, velocity can make a call to create a new challenge with the same parameters.
5) The invitation can be accepted at any time within the 7 days, the number of workout performed since the start time will be credited to the challenge.
6) A challenge is not expected to be changed after it is created.

Other rules, restrictions and the like may be defined and is not limited to the above example.

Head to Head: Head to Head challenges are challenges in which the participants' performances are treated individually and not grouped.

Search Challenge: Challenge search will return a list of challenge objects based on the keyword provided. The challenge objects in the list may be a trimmed down version of the full challenge object.

Team Up: Team Up is a challenge type that may have the following rules:
1) There are at most 2 members.
2) Any two members can have only one active team up.
3) The challenge starts when the second person accepts.
4) The challenge ends 72 hours after the start time.
5) If the challenge hasn't started 24 hours after it is created, it expires.
6) The fuel amount is integer.
7) The challenge cannot be updated.
8) A person can have only 50 active team ups.

The Challenge Type can be:
Teamup Band Together Friend
1) The user selects a friend from the list of friends and creates a challenge.
2) The invitation is sent to the friend.
3) If the friend accepts the challenge the challenge becomes active.
4) Each member should reach the fuel target so the challenge can be considered completed.

Teamup Band Together Blind Match
1) On the blind match you select one of the preset activity point targets and proceed to create the challenge.
2) The system will match you with a random user taking the same type of challenge with the same fuel level.
3) If a match is found, the user has the right to accept or deny it.
4) If the user accepts, the start time and the end time will be updated.
5) If the user denies, both the user and the creator of the challenge are available for blind match. Basically, a separate challenge is created for the user.

Legacy API

Some services or functions may be defined to interface with legacy systems such as a legacy activity tracking and monitoring site or system.

Generate PIN Service: Retrieves a unique PIN for an empty user container.

Generate Token Service: Generates a one-time-use token with which the local software can launch a browser to a specified website or page, and automatically login the user. The token is one-time-use only as it is passed in the clear over HTTP, and therefore cannot be used to hijack a user's account.

Get PIN From Token: Get PIN from a one time access token.

Get PIN Status Service: Provides information about the user container associated with this PIN.

Sync Complete Service: Called to tell an activity tracking application that the sync session is complete. This call may have an internal delay for 10 s in order for this call to be the last in a group of activities.

Community

The multi-activity platform and system may further host a community of users seeking to track and monitor their activity levels. Communities may refer to all users registered with the system or a sub-group within the users (e.g., a group of friends, a location based group, an organization based group, age groups, device type groups, etc.). Accordingly, various services and functions may be provided to interact with community functionality.

Get Community Challenge Stats Totals: This service will provide the lifetime aggregations for any community/challenge type pair. For example, a user may request aggregation information for challenges of the week within the 25-49 male community.

Get Community Leaderboard: This service will return the requested Community Leaderboard. This service may cause the system to calculate the Leaderboard, or may only return the leaderboard if already generated/present. In one example, if the Leaderboard has not been calculated yet, an error message will be displayed. There may be multiple types of Community Leaderboards including a Seven Day Rolling and an All Time. These two types of leaderboards can be requested for each existing type of drill.

Get Community Stats: This service will provide an aggregation of existing as well as 3 new community aggregations as described below. These are example aggregations and do not represent an exhaustive list.

Existing

Community—Total/Average Fuel Today, Week, Month, Year, All Time.

Community—Average Activity Point Daily Goal for Device X users—Today Week, Month, Year, All Time.

Community—Total Device X Daily Goal Reached Today, Week, Month, Year, All Time.

Community—Total/Average Step: Today, This Week, This Month, This Year, All Time.

Community—Total/Average Calories: Today, This Week, This Month, This Year, All Time.

Community—Average Community Daily Goal.

New

Community—Total/Average Distance Today, This Week, This Month, This Year, All Time.

Community—Total/Average Calories: Today, This Week, This Month, This Year, All Time Community—Total # of Users for each vertical and entire community.

Get Community Stats Frequencies: This service will provide the History aggregations for any community/activity pair for any frequency (e.g., weekly, monthly, annual, etc.).

Get Community Stats Total Users: This service will provide the real time number of community users (e.g., all users on the site or within a more specific community).

Get Community Stats Totals: This service will provide the lifetime aggregations for any community/activity pair.

Get XYZ Community Leaderboard: This service will return the requested activity XYZ Community Leaderboard. Activity XYZ may correspond to a particular type of activity or activities performed using a particular type of tracking device or devices. This service may calculate the Leaderboard or might only return a leaderboard if already present. If the Leaderboard has not been calculated yet, an error message may be displayed in some examples. There are multiple types of Community Leaderboards including Current Week and All Time. These two types of leaderboards can be requested for each existing type of drill.

Get Friend Leaderboard: This service will calculate and return the requested Friend Leaderboard. There are two types of Friend Leaderboards, Current Week and All Time. These two types of leaderboards can be requested for each existing type of aggregation.

Get Friends Leaderboard: This service will return a Leaderboard for a specified drill that ranks the user and his/her friends only. If the user doesn't have any friends the leaderboard won't be shown.

Get Friends List All: This service allows a user to see a listing of all their friends.

Get Friends List Common: This service allows a user to see a listing of friends user has in common with another friend.

Get Friends List Most Active: This service allows a user to see a listing of the recent activity of all of a user's friends.

Get Friends List Recent Activity: This service allows a user to see a listing of most recently active friends and what they did.

Get Friends List Team Up: This service allows a user to see a listing of friends user most recently did a team up with.

Get Activity Point Friends List Service: Returns a list of the user's friends with corresponding information on their activity points (cumulative level, daily level, daily goal.) The request specifies sorting by activity, cumulative activity point level, daily activity point level, or screen name. This service is used by applications to get a list of friends with corresponding activity point levels for a user.

Get Homepage Community Stats: Returns an object representing cumulative stats over a rolling 30 day period for the given activity type and community type.

Social Share: FACEBOOK: Post/Share content to FACEBOOK that friends can see.

Social Share: TWITTER: Post/Share content to TWITTER that friends can see.

Test end point—Trigger Community Leader board calculations: This end point is used for testing purposes to trigger the calculation of Community leaderboards. This is an asynchronous call which will always return a success message. This end point will not be mapped by APOGEE and will only be available on the staging environment. There are two types of Community Leaderboards, Seven Day Rolling and All Time. These two types of leaderboards are calculated for each existing type of drill.

Device

Different devices may have different setting or setup parameters and procedures and ways in which data is to be communicated and/or stored. Accordingly, APIs may be provided for a device to retrieve needed data and/or to submit various types of information.

Device Settings: (GET) Retrieves a user's preferences for a specific device. (POST) Updates a preference for the specified User Device. UUID represents the user device id.

Device Settings (Protocol X): Sets device settings to a particular protocol such as protocol X.

Device Setup: Explanation on how devices are implemented.

When syncing a device, a device must have a serial number and type. If either of these items is not present or incorrect, the application will throw an error. If you are associating a group of devices to a user that have been synced together, then you must pass the DeviceConfigGroupId that was presented when the devices were first synced. Also if the individual device has been associated with a user, then you must also pass the DeviceId. If DeviceConfigGroupId is not sent when the devices are already associated with a user as a group, then it considers them a new group of devices and assigns a new DeviceConfigGroupId.

Serial numbers are unique identifiers. If a device with a serial number that is already associated to a user is sent (without sending in the DeviceConfigGroupId or DeviceId), then the system may return an error. The error will state that this device's serial number is already associated to another user, even if you are that user.

A Type variable may be defined as the type of device that is being associated to the user. This variable or parameter may be required in order for a system to know what kind of device is being associated. If the device passed in has an invalid type or is empty then an error will be thrown.

Devices that have not been grouped together before are considered a new group of devices. If two devices that have already been associated with a user with a brand new device are grouped, this association may constitute a new device group. Because this represents a new group of device, a DeviceConfigGroupId is not required in the communication. The DeviceIds for the old devices that have already been associated with the user may be passed to the system. When the devices are synced, a new DeviceConfigGroupId and a new Device Id may be returned.

For a first sync for new devices: devices with an unused serial number may be sent to the system without a DeviceId or DeviceConfigGroupId. The DeviceConfigConfigId will be returned along with each DeviceId for each of the devices in the order that they were passed/communicated.

For any sync after the first with the same devices: the devices' DeviceIds and the DeviceConfigGroupId are transmitted/communicated. The same DeviceConfigGroupId will be returned back, but not the DeviceIds.

For any sync after the first sync with new devices along with old devices:

DeviceIds for the old devices are communicated without DeviceIds for new devices. Do not send in a DeviceConfigGroupId since this will be a new group of devices. The new DeviceConfigGroupId will be returned to be used for future syncs of these devices. The DeviceId's of the new devices will be returned also.

Phone Device Settings (Protocol X): Sets Phone device settings to a particular protocol such as protocol X. This may also allow the device to know what protocol is to be used to communicate with the multi-activity platform.

Reset Device: Sets the User Device "delete_ind" flag to true. UUID represents the device id.

Reset LastSyncOffset and LastSyncTimestamp: Sets the device's LastSyncOffset and LastSyncTimestamp to the given values.

Retrieve, Add or Update Device: (GET) Retrieves a user device record or records. (POST/PUT) Adds or updates a user device record. UUID represents the user device id, returned in both the POST and the PUT response body.

Fitness/Workout Programs

Activity data recorded during a user's performance of a fitness or workout program may be communicated in accordance with various predefined functions and services.

Fitness: Get Pending Program Data: Retrieves all pending days in a workout program. Searches for existing workout programs by requested program ID. Returns a list of all pending days or workout sessions in the program.

Fitness: Post Program Data Capture: Adds program data into the system against a console post. If the program data already exists for the supplied program id, update the changes.

Fuel Balance Service: Retrieve the activity point balance for a user. This service is designed for experiences that need to show a user's activity point balance.

Get Activity Point Level Service: Gets the cumulative activity point level for specified time period. If no start time and end time specified the service will respond with activity points earned for a current day.

Goals—Achievements

As noted herein, users may reach achievements based on their physical activity. Achievements may be reached based on cumulative activity points, activity points for a predefined time period (e.g., less than lifetime), average activity points per time period, other metrics and the like.

Acknowledge Achievement By Achievement Id: Acknowledges that a user has seen an achievement. This service will serve as a way of indicating whether the user has triggered the 'OK/CONFIRM' on an achievement signifying that they have acknowledged the achievement. For example, once a user has acknowledged the achievement, the achievement might not be automatically displayed or provided to the user again. The user may still view or access the achievement by manually retrieving the achievement.

Acknowledge Achievement By Activity Id: Acknowledges that a user has seen all achievements associated with an activity. This service will serve as a way of indicating whether the user has triggered the 'OK/CONFIRM' on an achievement signifying that they have acknowledged the achievement.

Add Goal Resolution: Adds a goal resolution against the supplied goal id. If the goal resolution already exists for the supplied goal id, it will not add the resolution.

Copy Goal: This service is used to copy a goal for the user based on the goal associated with goalId.

Create Goal: This service is used to create a goal for the user.

Get Achievements List: Return a list of the user's achievements.

Update and Delete Goal: Update Goal: This service is used to update a goal for the user. Delete Goal: This service is used to delete a goal for the user.

User Registration/Initiation

The below services and functions may be used to register a user to an activity monitoring system Link: Link existing user based on User Id (nuid) with an external network such as FACEBOOK or TWITTER.

Login: This service is used by applications to login a user to the activity monitoring service or system. On login, an oauth (e.g., authentication) access token is provided back to the calling application that can be used for further calls that need login enabled. External network name can be supplied to login using third-party authentication. The system may proxy these login requests to the appropriate external networks.

Pin Request for Access Token: Gets the API access token and refresh token based on the DIN (Device Identification Number) that is passed.

Pin Request for Imprint: Adds a device. This will create and return a DIN (Device Identification Number) for the device.

Pin Request for Is Logged In: Checks if the user is already logged in or not.

Pre Registration Check: Check if the supplied email address and system screen name are available for a new registration. This service is useful for any application about to register a user with the system. This service is invoked prior to registration to check if the email address, screen name/tag name, dobType and dob, and locale already available with the application can be used to register the user with the system.

Register: Register user with the supplied information. This service is used by applications to register a user with the activity system.

Token Request Service: This service might only be called by a software application to get a one-time token during the initiation/imprint flow with a DIN (Device Identification Number).

User Initiation Statistics: Returns initiation statistics if the initiation period has not ended; returns initiation result if the initiation period has ended. The initiation period may be, for example, a first 24 hours in which the user is to perform an average day's worth of activity. During the initiation period, this service will respond with the current metrics or statistics of user activity. After the initiation period, this service will respond with the final metrics or statistics accumulated during the initiation period. In a particular example, when the service is called, a start_time_local parameter is loaded, and the end time of initiation period is calculated. The end time is then checked against the current time to determine if we are still in the initiation period. If so, the values of relevant columns (e.g., requested activity metrics) are returned along with a status code 1. If the initiation period has ended, check SYNC_DATE (e.g., a date when data was last synchronized) with the end time. If SYNC_DATE is past the end time, indicating data for the initiation period is up to date and ready, the status code is set to 0. Otherwise the status code is set to 2. Additionally, the values of relevant columns are returned. Below is an example table of status codes.

| Status | Description |
|---|---|
| 0 | All the values are ready |
| 1 | The initiation is in progress |
| 2 | The initiation period has ended, but not all the values are ready |

Activity Service Layer

Interfaces for the activity service layer may be used to handle all login, registration and social network/community integration.

Activity List Service: Get activity List back based on the type passed in.

Create User Service: Creates a new user through the activity monitoring system or third party provider. User gets automatically logged in after registering a user successfully. During third party login, the newly-created UPM id will be fed into the third party provider. Additionally "partner" parameters can be passed in to set partner network settings to be attached to the user. This creates another network entry for a "Partner" with the network name as specified in the service call, the unique id of that user and the screen name.

If the user is passing "Partner" parameters to store for the user the following fields are required in order for the partner information to be saved. Partner data not saving will not prevent the service from continuing normally.

partnerGuid
    partnerNetwork
    partnerScreenName

Crop Profile Image of a User: Crops and uploads the profile image of a user to permanent location Delete Profile Image of a User: Deletes the profile image of a user (soft delete)

Email Content Service: This service gets the content of an email based on app, locale, type. The user sends in the number of invitation links to be created. The service implementation will get the content for a friend invitation from a specific user and a list of links (i.e specified by the count).

External Network Friend List Service: Get a list of the user's friends in an external network. Mutual friends can be excluded from the list if an additional parameter is passed in with the request.

External Network List Service: Returns the list of external networks supported by the activity monitoring service.

External Network User Check Service: This service checks to see if an external network user already exists in the system or not. This service will perform the following based on the value of action:

1. Given an external network user's unique ID i.e. Facebook user ID the service will return an UPM ID if the user exists in the system and is linked to the external network user.

2. If there is no record found then the service will try to match based on email provided by the caller. if there is a matching email, the service will link the external network user record with the existing upm record with a new link type and return the upm id. Additionally the service will also setup the user to login using FaceBook OAuth token or FaceBook credentials (email/pwd registered with FaceBook).

3. Finally, if the above two checks do not result in a match, create a new email only user with the information provided by the caller and link it to the external network.
    action=check-->point 1 above
    action=link-->points 1 and 2 above
    action=createAndLink-->all of the above Friend Create Service: Sends a friend request invitation to another user, or accepts a pending one.

Friend External Create Service: Sends a friend request invitation to any external user (not a user of the activity monitoring service) via email.

Get User Security Status Service: Retrieves a user's security status based on the cookie sent and returns the user's security level. The security level is retrieved from the slCheck cookie and the AnalysisUserId cookie, depending on whether or not the user is logged in.

Get User Service: Returns core User profile data. User data is held in UPM service and this service provides a single view into user profile. It will also return the extended User profile information from social site. If this is called anonymously, a limited subset of data will be returned based on the requested user's privacy status.

Is Logged In Service: Checks if the current user is logged in and returns security level of user if user is logged in. It is necessary for a user to be logged in in order to use the NSL services.

Login Service: Authenticates the user credentials to allow the user to login. A user can choose to login using their system credentials or credentials registered with any other external networks like Facebook, Twitter, etc. An activity monitoring service uses the User Profile Management (UPM) service to register and maintain a user profile. It may also use any authentication provider like Facebook, Twitter (hereafter referred to as 3PP or third party providers or external network). On successful login, it provides authorization cookies required to make subsequent calls to NSL.

An additional useful feature is "remember me". It is sent as an optional parameter in the login request. This will allow the user to be logged in until he/she explicitly signs out of the application. Currently, the duration of validity for "remember me" is set as 30 days.

Also a user may login using oAuth access token when the user is already linked to some external network. Along with their credentials, users can send partner network information and it will be stored in the database. This information is not validated by NSL. When a user passes in "Partner" parameters, the partner's network settings will be attached to the user. This in turn creates a new network entry for that "Partner" with the network name as specified in the service call.

Logout Service: Logs the user out from the NSL.

Mark as Read Notification Service: Sets a specified notification's status to 'read'.

Team Activity List Service: Get team activity List back. Team activities can be filtered based on titleId or app or both.

Upload Profile Image of a User: Uploads the profile image of a user to temporary location User Activity List Service: Get user activity List back based on the filter criteria passed in. User activities can be filtered based on titleId or app or both. This service also returns activities of any user based on the userId passed in.

User Email Check: This service checks if the email has already been used in creating an account. Since email is an unique identifier, there cannot be multiple users registered with the same email.

User External Network Link: This service will link the FB/Twitter/other external network login with the existing account. This service will also allow linking through another Social Network.

User Forgot Password: This service helps the user reset their passwords. The service will accept an email and check that a user exists with that email address and sends to that address a temporary password reset URL email. The email contains a unique one time use reset key. The user's password is not reset until the user actually uses the reset key to reset the password meaning the act of sending a password reset email alone will not reset the user's password.

User Friend Activity List Service: Get user's friends activity List back based on the filter criteria passed in. User's friend activities can be filtered based on titleId or app or both. This service also returns activities of any user's friend based on the userId passed in.

User Friend List Service: Get User Friend List along with friends basic details.

User Friends Match Service: Gets user email details (passed by the caller of the service) if that email matches/exists in the system. Mutual friends can be excluded from this list if an additional parameter is passed in with the request.

User Screen Name Check: This service checks if the screen name the user is intending to take already exists or not. Since a screen name is a unique identifier there cannot be multiple users with the same screen name.

User Search: Searches for a user based on a searchstring passed in.

User Workout Cheer List Service: This service returns all the cheers (likes and comments) posted for a user's workout from an external social network (Facebook).

User Workout Create Service: Create a user Workout. Multiple workouts can be created (maximum 10).

User Workout Finish Service: This service lets a user post a message to an external social network (ex. Facebook) indicating the finish of their Workout and their desire to have friends cheer them on.

User Workout List Service: Get the list of user workouts.

User Workout Start Service: This service lets a user post a message to an external social network (Facebook) that indicates the start of their Workout and their desire to have friends cheer them on.

Synchronization

Synchronization between an activity monitoring device, a multi-activity platform system and/or an application may be facilitated through the following APIs.

Get Server Time: Get the current GMT time of the multi-activity platform servers.

Last Date and Time Sync Service: Returns the date and time of the last sync based on the AppId (e.g., an application identifier). This service is useful for any application/device that needs to know the last time when the device synchronization occurred and know if there are new items to synchronize.

Last Sync LSO (Last Sync Offset) and LSTS (Last Sync Timestamp)—

This service is used to get the last LSO (Last Sync Offset) and LSTS (Last Sync Timestamp) back as user does a sync on the device.

Last Sync Service: This service is to get the last sync details. User login and get the last sync detail by hitting the endpoint. This service is used to get the last sync delta back as user does a sync on the device.

Sync Service (Basketball): Syncs basketball user activities to an activity monitoring service back end.

Sync Service (Device X): This service is useful for any application wishing to sync user's activities between a particular device such as Device X and an activity monitoring service back end. The actual metrics being synced will have to be negotiated with the activity monitoring service for an optimal user experience.

Sync Service (Running): Syncs running user activities to an activity monitoring service back end. This service is useful for any application wishing to sync user's activities to an activity monitoring service backend. The actual metrics being synced will have to be negotiated with activity monitoring service for optimal User experience.

Sync Service (Device Y): Syncs user activities between another particular device such as Device Y to an activity monitoring service back end.

Sync Service (Training): Syncs training user activities to an activity monitoring service backend.

Sync Service (Fitness/Workouts): Syncs fitness/workout program user activities to an activity monitoring service backend.

Sync Service v2.0: Syncs user activities to an activity monitoring service back end.

Sync Status: Get the status of the recent sync activity, indicating if the back end processing is complete.

User-Oriented Information, Events and Settings

Various services and functions may be defined for defining, configuring, sharing and retrieving user profile information. Additionally, user events may be communicated using various API services. User events may include reaching activity goals, reaching various activity achievements, warnings messages, workout reminders, other alerts and the like.

Create Event Service: Send a user event to the event service. This service is useful for any application wishing to send a user event to be displayed on a user's home page or landing page of his or her account.

Delete Event Service: Send a user event to the event service. This service is useful for any application wishing to send and delete a user event to be displayed on a user's home page or landing page of his or her account.

Delete User Data: This perform a hard-delete of user data. Cache data will also be cleared. Response should be success or failure. For example, user data on any number of protocol-compliant devices including a multi-activity system, an activity monitoring device, an intermediary device and the like may be deleted in this manner.

Get and Update Privacy: Get information about the authenticated user's privacy settings. Update the authenticated user's privacy settings. Any user that uses the multi-activity platform has a profile in the multi-activity system. The GET version of this service returns the profile privacy setting associated with the authenticated user.

Get Athlete Information: Return information about an athlete.

Get Drill: Return the drill information.

Get Drill Metadata: This service will be used periodically to get drill metadata from the multi-activity system. The drill metadata is a list of prepared drills and their associated properties.

Get Friends Me Profile: Get information about the authenticated user's friend's ME profile. Any user that uses the multi-activity platform has a profile in the multi-activity system. The GET version of this service returns all the profile information associated with the authenticated user. The "Friend's" upmId should be passed through the url.

Get Insights: Get a list of insights on a user, based on a rule based system. It is possible that no insights are returned. Insights may include recommendations for the user, identification of areas for improvement, words of encouragement and the like.

Get Me Profile: Get information about the authenticated user's ME profile. Any user that uses the multi-activity platform has a profile in the multi-activity system. The GET version of this service returns all the profile information associated with the authenticated user.

Get Me Profile Basketball: Get basketball information about the authenticated user's ME profile. Any user that uses the multi-activity platform has a profile in the multi-activity system. The GET version of this service returns all the profile information associated with the authenticated user.

Get Me Profile Training: Get training information about the authenticated user's ME profile. Any user that uses the multi-activity platform has a profile in the multi-activity system. The GET version of this service returns all the profile information associated with the authenticated user.

Get Me Profile User Header: Get information about the authenticated user's Header information. The GET version of this service returns all the profile information associated with the authenticated user.

Get Mobile App Summary: Returns the user's profile data, lifetime totals, achievements, and last 30 activities for the appid given in the request header. For example, different application may be configured to consume or detect different activities. Accordingly, only those activities consumable by the application identified by the appid may be returned.

Get Multi-Activity Profile: Get information about the authenticated user's multi-activity profile. Any user that uses the multi-activity platform has a profile in multi-activity system. The GET version of this service returns all the profile information associated with the authenticated user across all verticals. If a specific mobile application (for example Basketball) is calling the multi-activity profile, then the calling application's specific records are returned in the response. In some arrangements, the sorting of the returned records must be done by the calling application.

Get Profile and Update Profile: Get information about the authenticated user's profile. Update the profile of the authenticated user. The PUT version of this service will update the profile with the provided information. If an item is included in the request body, the value of the item will be updated; if the value is null, the item will be removed. If an item is not included in the request body, it will be ignored. However, if the item is required, an error will be thrown. This service might not update a UPM database. The GET version of this service returns all the profile information associated with the authenticated user.

Get Trainers and Athletes Metadata Information: Return the list of all athletes/trainers/celebs along with their details.

Initial Assessment: Login the user into the multi-activity system.

List Athletes: Return a list of athletes.

List Drills: Returns a list of drills.

Post Athlete Information: Post athletes' information to multi-activity system back end.

Post Drill Information: Post information about a drill to the multi-activity system backend.

Update Event Service: Send a user event to the event service. This service is useful for any application wishing to send and update a user event to be displayed on the home page.

Utilities

Cache Clearing Service: Clears the specified cache.

Cache Refresh Service: Posts a request to refresh the cache with a specific entity.

Event Service: Creates/Updates/Deletes an event to the Unified Event Stream (UES).

Activity Multiplier Service: Retrieve the fuel multiplier for a given fuel source.

Get Calendar: Return list of user events & user goals to be displayed on the Calendar.

Get Notifications: This service is used to get notifications. The GET returns a list of notifications based upon the request type.

List Supported External Networks: Return a list of supported networks for login to the activity monitoring service/community. The activity monitoring service/community itself may be returned as a possible network that can be used for login. Image formats can be returned in either JPG or PNG format.

List Supported Locales: Returns a list of supported locales and corresponding age limits for login to the activity monitoring system/service. This service is useful for any application wishing to pass locale information during registration, to query and obtain the list of locales supported by the system/service and the corresponding age limits.

Manual Share: Retrieves a Manual Share record of a user.

Notification Preferences 1.0: (POST) This service is used to add the notification preferences of a user to the activity monitoring system/service. (GET) This service is used to get the notification preferences of a user.

Notification Preferences 2.0: (POST) This service is used to add the notification preferences of a user to the activity monitoring system/service. (GET) This service is used to get the notification preferences of a user.

Refresh Device Token 1.0: When an iphone application wants to use push notifications, it must call this service every time it is opened in order to keep the device token assigned by apple (which can change over time) up to date on the backend.

Refresh Device Token 2.0: When an iphone application wants to use push notifications, it must call this service every time it is opened in order to keep the device token assigned by apple (which can change over time) up to date on the backend.

Remove Device Token 1.0: When a smart phone (e.g., iPhone) application turns off push notifications or unlinks the user account on the device, it must call this service to remove the record of that device token from the backend.

Remove Device Token 2.0: When a smart phone (e.g., iPhone) application turns off push notifications or unlinks the user account on the device, it must call this service to remove the record of that device token from the backend.

Server Time Request: Get the current GMT time of the muti-activity servers.

Time Zone Ids: Gets a list of valid time zone ids.

CONCLUSION

While many of the aspects and features described herein relate to activity, similar processes, functions, systems and the like may be applied to inactivity. For example, a monitoring device may be configured to detect inactivity and such information may also be synchronized or otherwise transmitted to a multi-activity platform and system to affect a user's activity level and profile. In some examples, inactivity may be determined by the multi-activity platform and system to determine an amount of activity points that are to be deducted as a result of the inactivity.

Further features of the multi-activity system, platform, method, API and the like are further described in the attached Appendix.

Additionally, while the invention has been described with respect to specific examples including presently preferred modes of carrying out the invention, those skilled in the art will appreciate that there are numerous variations and permutations of the above described systems and methods. For example, various aspects of the invention may be used in different combinations and various different subcombinations of aspects of the invention may be used together in a single system or method without departing from the invention. In one example, software and applications described herein may be embodied as computer readable instructions stored in computer readable media. Also, various elements, components, and/or steps described above may be changed, changed in order, omitted, and/or additional elements, components, and/or steps may be added without departing from this invention.

The invention claimed is:

1. A system comprising:
one or more processors;
a plurality of tracking devices; and
memory storing computer readable instructions that, when executed, cause the system to:
determine, based on activity data obtained from the plurality of tracking devices, a first set of athletic activity data associated with a plurality of users;
determine, by the one or more processors, a plurality of parameters indicating a synchronization status with the plurality of tracking devices;
synchronize, based on the plurality of parameters, the first set of athletic activity data with the plurality of tracking devices;
receive, from the plurality of tracking devices, a second set of athletic activity data associated with the plurality of users, wherein a first user, of the plurality of users, is associated with multiple tracking devices of the plurality of tracking devices, and wherein the first user, of the plurality of users, performed different athletic activities with each of the multiple tracking devices of the plurality of tracking devices:
provide data used to generate a display of a user interface comprising at least a map and information regarding athletic activity performed in an area displayed in the map;
receive user input selection from the first user indicating a workout time period;
receive user input identifying a tracking device type;
receive user input identifying a first piece of athletic equipment;
after receiving the first user's input selection of an interface element that displays a heat map via the user interface, determine, based on the synchronized first set of athletic activity data and the second set of athletic activity data, a popularity level and an activity level for a plurality of sub-areas of the area displayed in the map, wherein the activity level corresponds to a number of activity points accumulated by the plurality of users, and wherein the popularity level indicates a number of times one or more users, of the plurality of users, have previously traversed a route extending through the plurality of sub-areas;
transmit, for display via the user interface, an indication of the activity level for one or more sub-areas in the plurality of sub-areas;
provide data used to generate, based on the synchronized first set of athletic activity data and the second set of athletic activity data, a display of a first route extending through one or more sub-areas in the plurality of sub-areas, wherein providing the data used to generate the first route comprises selecting the one or more sub-areas based on the workout time period, the activity level, and the popularity level, and wherein providing the data used to generate the first route comprises providing data obtained from the identified tracking device type;
determine, by the one or more processors, one or more users of the plurality of users that have previously used the first route;
transmitting for display via the user interface, activity statistics for at least a first activity performance of the one or more users corresponding to the first route;
generate a first search tag based on information received from the first user;
assign, by the one or more processors, the first search tag to the first route; and
associate the first piece of athletic equipment with the first route.

2. The system of claim 1, wherein the computer readable instructions, when executed further cause the system to provide data used to generate, based on the synchronized first set of athletic activity data and the second set of athletic activity data, a second route extending through a first sub-area and a second sub-area, wherein providing the data used to generate the second route includes selecting the first sub-area and the second sub-area to maximize at least one of: an overall popularity level and an overall activity level of the second route.

3. The system of claim 1, wherein the computer readable instructions, when executed further cause the system to provide data used to generate, based on the synchronized first set of athletic activity data and the second set of athletic activity data, a second route extending through a first sub-area and a second sub-area, wherein providing the data used to generate the second route includes selecting the first sub-area and the second sub-area to minimize at least one of: an overall popularity level and an overall activity level of the second route.

4. The system of claim 1, wherein the popularity level includes at least one of a number of user comments and votes received for a corresponding area.

5. The system of claim 1, wherein providing the data used to generate the user interface includes providing data used to generate one or more interaction options that creates an athletic activity route on the heat map.

6. The system of claim 1, wherein the computer readable instructions, when executed further cause the system to filter a plurality of routes available to the first user based on a level of difficulty.

7. The system of claim 6, wherein the level of difficulty is defined based at least in part on a first performance metric associated with the plurality of routes.

8. The system of claim 7, wherein the computer readable instructions, when executed further cause the system to filter a plurality of routes available to the first user based on previous athletic activity of the first user.

9. The system of claim 7, wherein the computer readable instructions, when executed further cause the system to:
receive user input selection indicating a goal time period; and
determine, by the one or more processors, a number of consecutive goal time periods that the first user achieved a first activity goal.

10. The system of claim 1, wherein the computer readable instructions, when executed further cause the system to:
determine a first activity level progression based at least in part on a first amount of activity performed by the first user during the workout time period.

11. The system of claim 10, wherein the computer readable instructions, when executed further cause the system to:

43 determine that a first activity metric for the first user decreases during the workout time period; and indicate a regression in the first activity level progression for the first user.

12. The system of claim 11, wherein the first activity metric comprises an average amount of activity performed per day.

13. A method comprising:

determining, by one or more processors, a first set of athletic activity data associated with a first user;

determining, by the one or more processors, a plurality of parameters indicating a synchronization status with one or more activity tracking devices of a plurality of tracking devices associated with the first user;

synchronizing, based on the plurality of parameters, the first set of athletic activity data with the one or more tracking devices;

receiving, from the one or more tracking devices, a second set of athletic activity data for the first user, wherein a first portion of the second set of athletic activity data is obtained from a first tracking device and a second portion of the second set of athletic activity data is obtained from a second tracking device;

generating a user interface comprising at least a map and information regarding athletic activity performed by a plurality of users in an area displayed in the map;

receiving, via the user interface and from the first user, input indicating a workout time period;

receiving, via the user interface and from the first user, input identifying a tracking device type;

receiving, via the user interface and from the first user, input identifying a first piece of athletic equipment;

after receiving, via the user interface, the first user's input selection of an interface element for displaying a heat map, determining, by the one or more processors and based on the synchronized first set of athletic activity data and the second set of athletic activity data, a popularity level and an activity level for a plurality of sub-areas of the area displayed in the map, wherein the activity level corresponds to a number of activity points accumulated by the plurality of users, and wherein the popularity level indicates a number of times one or more users, of the plurality of users, have previously traversed a route extending through the plurality of sub-areas;

displaying, via the user interface, an indication of the activity level for one or more sub-areas in the plurality of sub-areas;

generating, via the user interface and based on the synchronized first set of athletic activity data and the second set of athletic activity data, a first route extending through one or more sub-areas in the plurality of sub-areas, wherein generating the first route includes selecting the one or more sub-areas based on the workout time period, the activity level and the popularity level, and wherein generating the first route comprises displaying, via the heat map, data obtained from the identified tracking device type;

determining, by the one or more processors, one or more users of the plurality of users that have previously used the first route;

displaying, via the user interface, activity statistics for at least a first activity performance of the one or more users corresponding to the first route;

generating a first search tag based on information received from the first user;

44 assigning, by the one or more processors, the first search tag to the first route; and associating the first piece of athletic equipment with the first route.

14. The method of claim 13, further comprising generating, via the user interface and based on the synchronized first set of athletic activity data and the second set of athletic activity data, a second route extending through a first sub-area and a second sub-area, wherein generating the second route includes selecting the first sub-area and the second sub-area to maximize at least one of: an overall popularity level and an overall activity level of the second route.

15. The method of claim 13, further comprising generating, via the user interface and based on the synchronized first set of athletic activity data and the second set of athletic activity data, a second route extending through a first sub-area and a second sub-area, wherein generating the second route includes selecting the first sub-area and the second sub-area to minimize at least one of: an overall popularity level and an overall activity level of the second route.

16. The method of claim 13, further comprising:

detecting that the first user is interacting with a first portion of the user interface; and in response to the detecting, generating, based on a location of the first portion, a sub-interface displaying athletic activity metrics on the heat map.

17. The method of claim 16, wherein the athletic activity metrics include a number of users of the plurality of users that perform athletic activities within a sub-area of the map associated with the location of the first portion during a predetermined time period.

18. A system comprising:

one or more processors; and memory storing computer readable instructions that, when executed, cause the system to:

determine, by the one or more processors, a plurality of tracking devices associated with a plurality of users;

determine, by the one or more processors, a first set of athletic activity data obtained from the plurality of tracking devices;

for each tracking device:

determine one or more parameters indicating a synchronization status with the tracking device;

synchronize, based on the one or more parameters, at least a portion of the first set of athletic activity data with the tracking device; and obtain, from the tracking device, a second set of athletic activity data associated with the plurality of users;

provide data used to generate a display of a user interface comprising a map and information regarding athletic activity performed in an area displayed by the map;

receive user input identifying a tracking device type;

after receiving a first user's input selection of an interface element that displays a heat map via the user interface, determine, based on the synchronized first set of athletic activity data and the obtained second set of athletic activity data, a popularity level and an activity level for a plurality of sub-areas of the area displayed in the map, wherein the activity level corresponds to a number of activity points accumulated by the plurality of users, and wherein the popularity level indicates a number of times one or more users, of the plurality of users, have previously traversed a route extending through the plurality of sub-areas;

providing data used to generate, via the user interface and based on the synchronized first set of athletic activity data and the obtained second set of athletic activity data, a display of a first route extending through one or more sub-areas in the plurality of sub-areas, wherein providing the data used to generate the first route comprises selecting the one or more sub-areas based on a workout time period, the activity level, and the popularity level, and wherein providing the data used to generate the first route further comprises providing data obtained from the identified tracking device type;

determine one or more users, of the plurality of users, that have previously used the first route; and transmit, for display via the user interface, activity statistics for at least a first activity performance by the one or more users corresponding to the first route.

19. The system of claim 18, wherein a first parameter, of the one or more parameters, comprises a memory location identifier indicating an offset into a memory of the tracking device to initiate synchronization of the portion of the first set of athletic activity.

20. The system of claim 19, wherein the computer readable instructions, when executed further cause the system to:

receive, from a tracking device of the plurality of tracking devices, a request for the first parameter; and updating the first parameter upon synchronizing the portion of the first set of athletic activity data with the tracking device.

* * * * *